(12) United States Patent
Moon et al.

(10) Patent No.: US 12,221,974 B2
(45) Date of Patent: Feb. 11, 2025

(54) TURBO COMPRESSOR

(71) Applicant: LG ELECTRONICS INC., Seoul (KR)

(72) Inventors: Changgook Moon, Seoul (KR); Junchul Oh, Seoul (KR); Byeongchul Lee, Seoul (KR); Taeyang Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 82 days.

(21) Appl. No.: 17/893,508

(22) Filed: Aug. 23, 2022

(65) Prior Publication Data
US 2023/0193917 A1 Jun. 22, 2023

(30) Foreign Application Priority Data

Dec. 21, 2021 (KR) .................. 10-2021-0184156

(51) Int. Cl.
*F04D 17/12* (2006.01)
*F04D 25/06* (2006.01)
(Continued)

(52) U.S. Cl.
CPC ............. *F04D 29/20* (2013.01); *F04D 17/12* (2013.01); *F04D 25/0606* (2013.01);
(Continued)

(58) Field of Classification Search
CPC ...... F04D 29/05; F04D 29/053; F04D 29/054; F04D 29/043; F04D 29/044; F04D 29/20; F04D 29/624; F04D 25/06; F04D 25/0606
See application file for complete search history.

(56) References Cited

U.S. PATENT DOCUMENTS 5,936,324 A  8/1999 Montagu
8,821,136 B2 * 9/2014 Komatsu ............. F04D 25/0606
                                                        417/423.12
(Continued)

FOREIGN PATENT DOCUMENTS

CN    110332019 A  * 10/2019  ............. F01D 15/08
JP    06-031356       4/1994
(Continued)

OTHER PUBLICATIONS

CN_110332019 translation (Year: 2019).*
(Continued)

*Primary Examiner* — Brian P Wolcott
(74) *Attorney, Agent, or Firm* — KED & ASSOCIATES

(57) ABSTRACT

A turbo compressor is disclosed. The turbo compressor may have an assembly-type rotational shaft where a permanent magnet is inserted into a connecting sleeve, at least one first locking projection formed on either an inner periphery of the connecting sleeve or an outer periphery of the permanent magnet facing the inner periphery of the connecting sleeve, and at least one first locking groove formed on the other. Thus, the permanent magnet constituting a rotor may be easily coupled into the rotational shaft, and the permanent may be effectively prevented from slipping. Moreover, a magnet embedded in the rotational shaft may be securely fixed so that it is held in a position where it is assembled, thus providing an advantage in concentrically aligning the magnet.

7 Claims, 26 Drawing Sheets

(51) Int. Cl.
*F04D 25/16* (2006.01)
*F04D 29/053* (2006.01)
*F04D 29/20* (2006.01)
*F04D 29/58* (2006.01)
*F04D 29/62* (2006.01)

(52) U.S. Cl.
CPC ........... *F04D 25/16* (2013.01); *F04D 29/053* (2013.01); *F04D 29/5806* (2013.01); *F04D 29/624* (2013.01)

(56) References Cited

U.S. PATENT DOCUMENTS

| | | | |
|---|---|---|---|
| 8,876,500 B2 * | 11/2014 | Brown | E21B 4/006 417/423.6 |
| 8,931,304 B2 | 1/2015 | Beers et al. | |
| 11,261,854 B2 * | 3/2022 | Clingman | F04D 29/054 |
| 2007/0228847 A1 * | 10/2007 | Kim | H02K 9/06 310/156.28 |
| 2014/0175929 A1 | 6/2014 | Horng et al. | |
| 2019/0249682 A1 | 8/2019 | Bonnefoi et al. | |
| 2020/0400155 A1 | 12/2020 | Sun et al. | |
| 2022/0029487 A1 * | 1/2022 | Sugiura | H02K 15/03 |

FOREIGN PATENT DOCUMENTS

| | | | | |
|---|---|---|---|---|
| JP | 2008295214 A | * | 12/2008 | |
| JP | 2015-211612 | | 11/2015 | |
| JP | 2019-110679 | | 7/2019 | |
| KR | 10-2020-0043747 | | 4/2020 | |
| KR | 20200043747 A | * | 4/2020 | ............. F25B 1/053 |
| KR | 10-2021-0119834 | | 10/2021 | |
| KR | 20210138900 A | * | 11/2021 | ......... F04D 29/4233 |
| KR | 20230172887 A | * | 12/2023 | ............. F04D 17/12 |
| WO | WO 2007/072536 | | 6/2007 | |
| WO | WO 2020/134424 | | 7/2020 | |
| WO | WO 2020/209051 | | 10/2020 | |
| WO | WO 2021/099057 | | 5/2021 | |

OTHER PUBLICATIONS

JP_2008295214 translation (Year: 2008).*
KR_20200043747 translation (Year: 2020).*
KR_20210138900 translation (Year: 2021).*
KR_20230172887 translation (Year: 2023).*
Korean Office Action issued in Application No. 10-2021-0184156 dated Aug. 10, 2023.
European Search Report dated Dec. 22, 2022 issued in EP Application No. 22186814.4.
European Office Action issued in Application No. 22186814.4 dated Jun. 7, 2024.

* cited by examiner

TURBO COMPRESSOR

CROSS-REFERENCE TO RELATED APPLICATION(S)

Pursuant to 35 U.S.C. § 119(a), this application claims the benefit of the earlier filing date and the right of priority to Korean Patent Application No. 10-2021-0184156, filed in Korea on Dec. 21, 2021, the contents of which are incorporated by reference herein in their entirety.

BACKGROUND

1. Field

A turbo compressor is disclosed herein.

2. Background

Generally, compressors are largely divided into positive displacement compressors and turbo compressors. A positive displacement compressor is a system that draws in, compresses, and discharges a fluid using a piston or a vane, as in a reciprocating or rotary compressor. On the other hand, a turbo compressor is a system that draws in, compresses, and discharges a fluid using a rotational element.

The positive displacement compressor determines a compression ratio by properly adjusting a ratio between intake volume and discharge volume, in order to obtain a desired discharge pressure. Accordingly, the positive displacement compressor has constraints in making the overall size of the compressor smaller in comparison to capacity.

The turbo compressor is similar to a turbo blower, but has a higher discharge pressure and lower flow rate than the turbo blower. The turbo compressor increases the pressure on a continuously flowing fluid, and may be classified as an axial compressor when the fluid flows in an axial direction or a centrifugal compressor when the fluid flows in a radial direction.

Unlike positive displacement compressors, such as reciprocating compressors or rotary compressors, it is difficult to obtain a high pressure ratio as desired by compressing a fluid only once, due to various factors, such as processability, mass productivity, and durability, even if the shape of blades of a rotating impeller is optimally designed. In this regard, there is a well-known multi-stage turbo compressor which has a plurality of impellers in the axial direction and compresses a fluid in multiple stages.

The multi-stage turbo compressor compresses a fluid in multiple stages by a plurality of impellers mounted to a rotational shaft on one side of a rotor or by a plurality of impellers mounted to face each other on both ends of the rotational shaft. For convenience of explanation, the former may be classified as a one side-type, and the latter may be classified as a both end-type.

The one side-type turbo compressor may prevent a decrease in compression efficiency by shortening a pipeline or fluid passage connecting a plurality of impellers. However, in the case of the one side-type turbo compressor, the impellers on both sides may generate thrust in the same direction (axial), and accordingly, axial turbulence increases, which may increase a size of a thrust bearing and making the overall size of the compressor too large. Also, as a load on a drive unit during high-speed operation increases, the drive unit may be overheated.

In the case of the both end-type turbo compressor, the impellers on both sides may generate thrust in opposite directions, and accordingly, axial turbulence may be prevented to a certain extent, which may decrease the size of the thrust bearing and enhancing motor efficiency. However, the both end-type turbo compressor requires a complicated and long pipeline or fluid passage to connect a plurality of impellers, which makes the compressor structure complicated and causes a pressure loss in a process in which a fluid compressed by the impeller on one side moves to the impeller on the other side through a long flow path, thereby lowering compression efficiency.

U.S. Pat. No. 8,931,304 (hereinafter "Patent Document 1"), which is hereby incorporated by reference, discloses a both end-type turbo compressor. The both end-type turbo compressor disclosed in Patent Document 1 provides a refrigerant path in which a refrigerant compressed in a first stage by a first compressor portion is directed to a motor chamber, and a drive motor and a bearing are cooled with the first-stage compressed refrigerant directed to the motor chamber and then drawn into a second compressor portion.

The turbo compressor having the above refrigerant flow path has limitations in effectively cooling motor heat and frictional heat as a high-temperature, first-stage compressed refrigerant passes through the drive motor and the bearing. Moreover, refrigerant that is preheated as it passes through the motor chamber is drawn into the second compression portion, which may increase a specific volume of the refrigerant and causing volume loss, thereby lowering a compression efficiency at the second compressor portion.

In addition, the turbo compressor has a thrust runner which constitutes an axial bearing on one end or both ends of the rotational shaft, as described before. As the thrust runner is provided in the shape of a flange on an outer periphery of the rotational shaft, a large amount of waste is produced from processing of a base material because of the thrust runner, if the rotational shaft is combined with the thrust runner. In this regard, U.S. Patent Publication No. 2019/0249682 (hereinafter "Patent Document 2"), which is hereby incorporated by reference, discloses a turbo compressor having an assembly-type rotational shaft. Patent Document 2 discloses an example in which a rotor (permanent magnet) and a rotor cover covering the rotor are fixed to a cylindrical connection sleeve by press-fitting. In this case, however, members may be moved apart from one another due to centrifugal expansion because the rotational shaft rotates at a high speed (for example, 40,000 rpm or higher), thus making it difficult to ensure reliability.

Korean Laid-Open Patent No. 10-2020-0043747 (hereafter "Patent Document 3"), which is hereby incorporated by reference, discloses an example in which an axial portion is coupled to a sleeve using a fixing pin on an assembly-type rotational shaft. However, this requires using a separate part, such as a fixing pin, and accordingly, increases the number of parts and the number of assembly processes, thus leading to a rise in manufacturing costs.

Besides Patent Document 2 and Patent Document 3, U.S. Patent Publication No. 2020/0400155 (hereinafter "Patent Document 4"), which is hereby incorporated by reference, discloses a rotational shaft with an embedded magnet, into which a permanent magnet constituting a rotor is inserted. In these documents, however, the permanent magnet is press-fitted into a cylindrical sleeve and supported in an axial direction, but is not mechanically supported in a circumferential direction. This means that, if the sleeve is made of a material having a higher thermal expansion coefficient than the permanent magnet, the permanent magnet may be separated from the sleeve due to heat generated during operation of the compressor. This may place limitations in keeping the permanent magnet in an assembled position in the rotational shaft.

BRIEF DESCRIPTION OF THE DRAWINGS

Embodiments will be described in detail with reference to the following drawings in which like reference numerals refer to like elements, and wherein.

DETAILED DESCRIPTION

Hereinafter, a turbo compressor according to embodiments and a refrigeration cycle apparatus having a turbo compressor will be described with reference to the accompanying drawings. The embodiments will be described, for example, with respect to a turbo compressor which is both a one side-type and a both end-type, in which a first impeller and a second impeller are mounted to both ends of a rotational shaft, and an outlet of a first compressor portion including the first impeller connects to an inlet of a second compressor portion, but is not necessarily limited to this. For example, an intake sealing portion and a discharge sealing portion described hereinafter may be equally applied to a single-sided turbo compressor having at least one impeller on one end of a rotational shaft.

Moreover, a turbo compressor according to an embodiment will be described with respect to an example that applies to a chiller system that supplies chilled water to where it is needed, but its applicability is not limited to the chiller system. For example, a turbo compressor according to an embodiment is equally applicable to a refrigeration cycle system using refrigerant.

In addition, in the description of a turbo compressor according to an embodiment, a lengthwise direction of a rotational shaft is defined as an axial direction, a thickness direction of the rotational shaft is defined as a radial direction, an intake side of each impeller (or compressor portion) on an axial line is defined as a front, a discharge side of each impeller is defined as a rear, and a front side is defined as a first side, and a rear side is defined as a second side.

Figure 1:
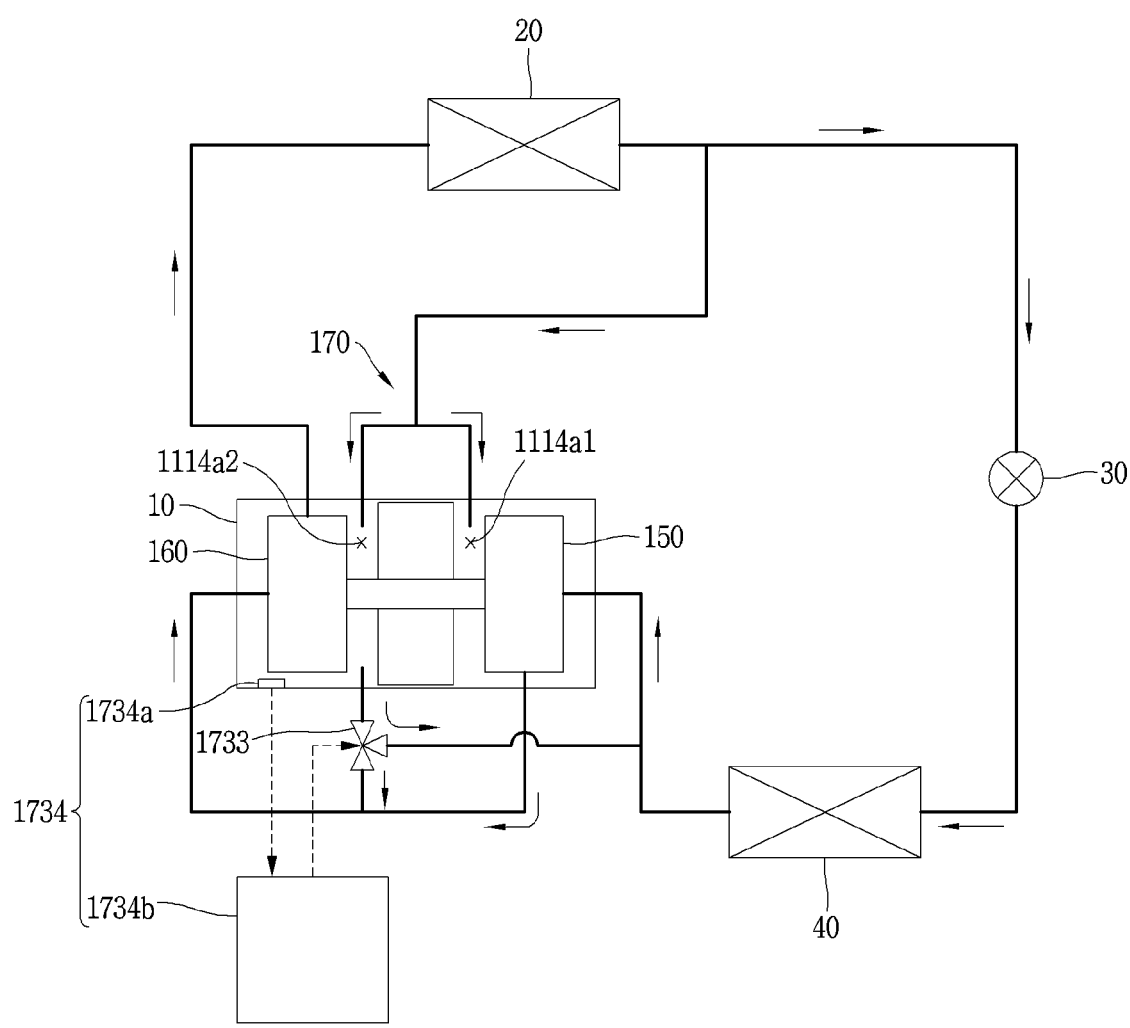
FIG. 1 is a schematic diagram of a refrigeration cycle including a turbo compressor according to an embodiment.

FIG. 1 is a system diagram of a refrigeration cycle including a turbo compressor according to an embodiment. Referring to FIG. 1, a refrigeration cycle apparatus to which a turbo compressor according to an embodiment is applied is configured in such a way that a compressor 10, a condenser 20, an expander 30, and an evaporator 40 constitute a closed loop. That is, the condenser 20, the expander 30, and the evaporator 40 are sequentially connected to a discharge side of the compressor 10, and an outlet of the evaporator 40 is connected to an intake side of the compressor 10. Thus, a sequence of processes is repeated, in which a refrigerant compressed in the compressor 10 is discharged toward the condenser 20, and this refrigerant passes through the expander 30 and the evaporator 40 sequentially and is then drawn back into the compressor 10.

Figure 2:
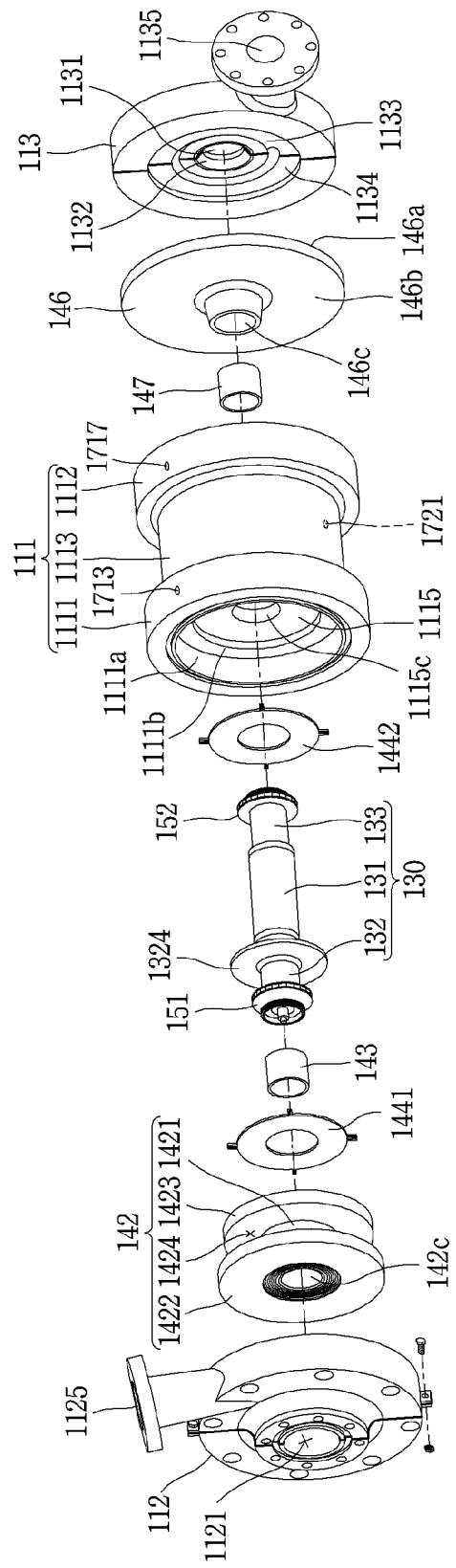
FIG. 2 is an exploded perspective view of a turbo compressor according to an embodiment.
Figure 3:
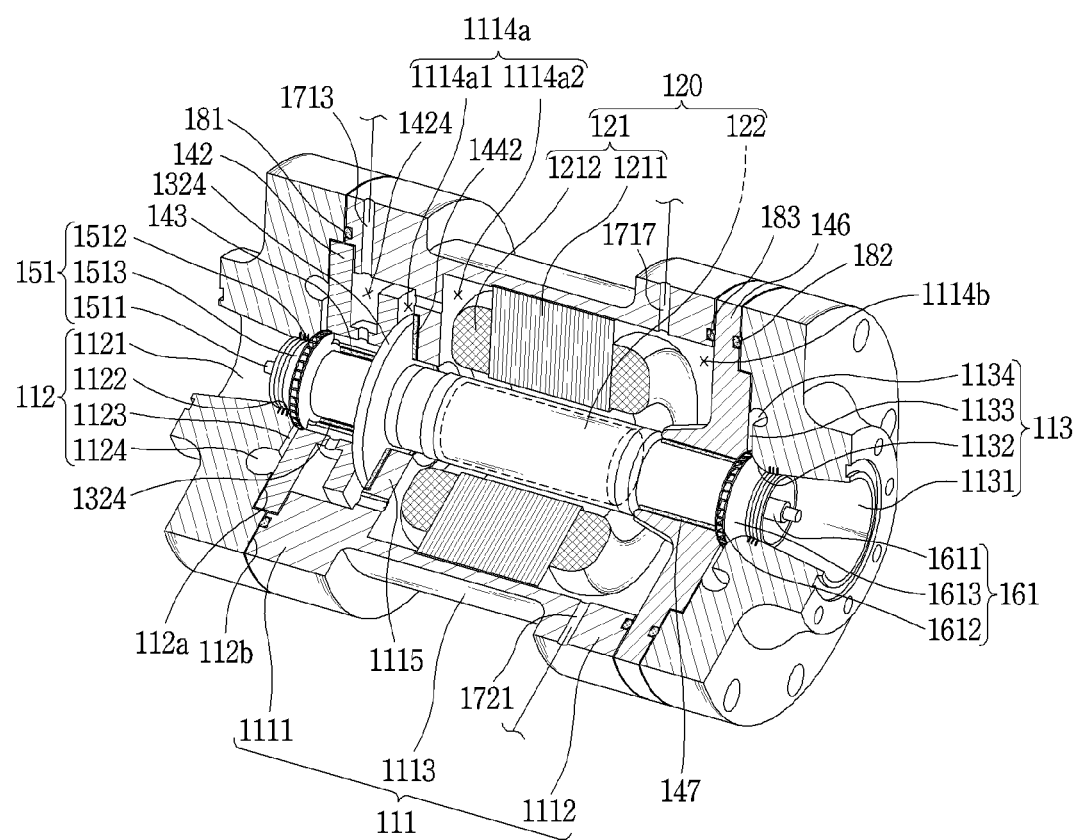
FIG. 3 is an assembled perspective view of an inside of the turbo compressor of FIG. 2.
Figure 4:
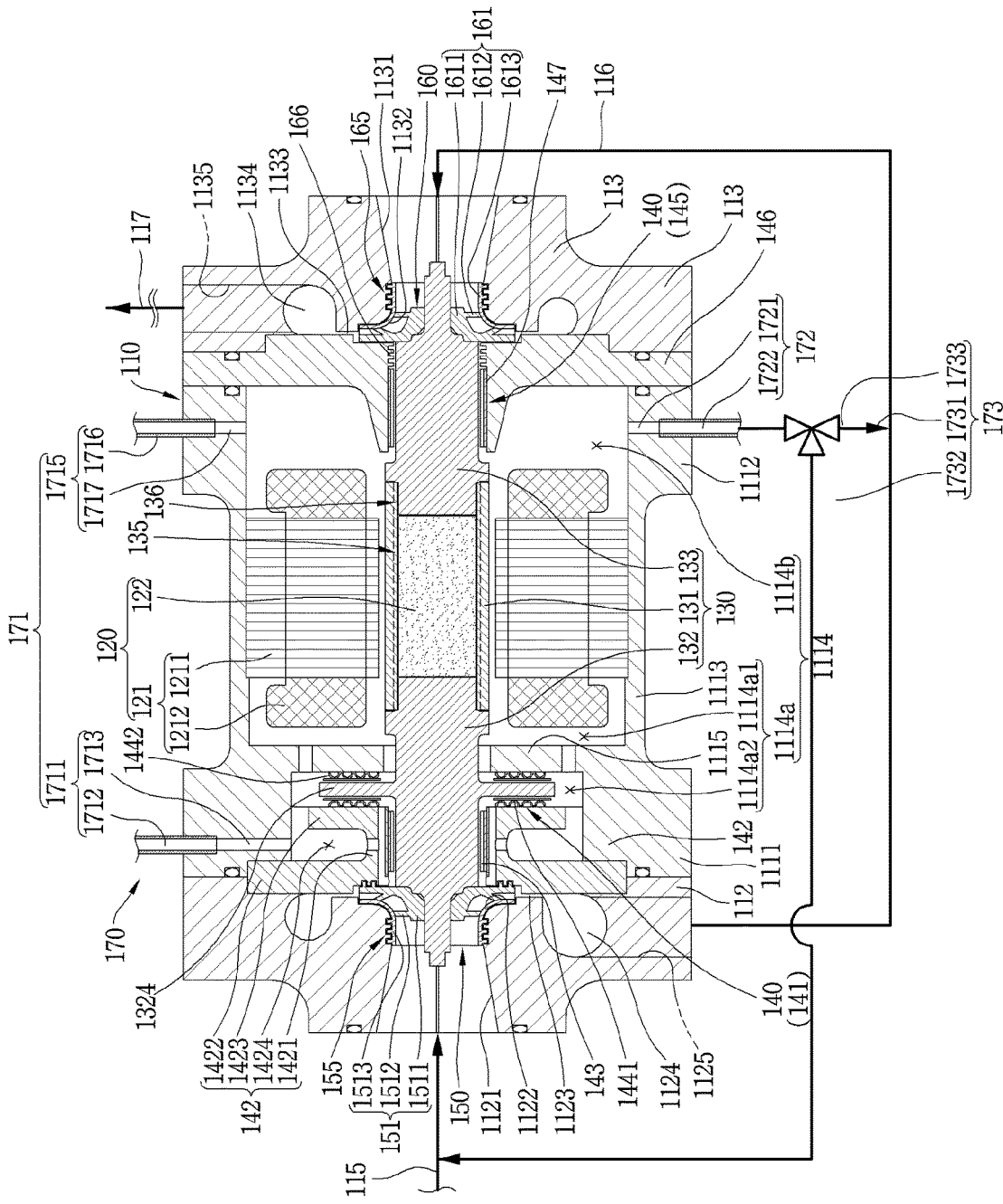
FIG. 4 is a cross-sectional view of the inside of the turbo compressor of FIG. 3.
Figure 5:
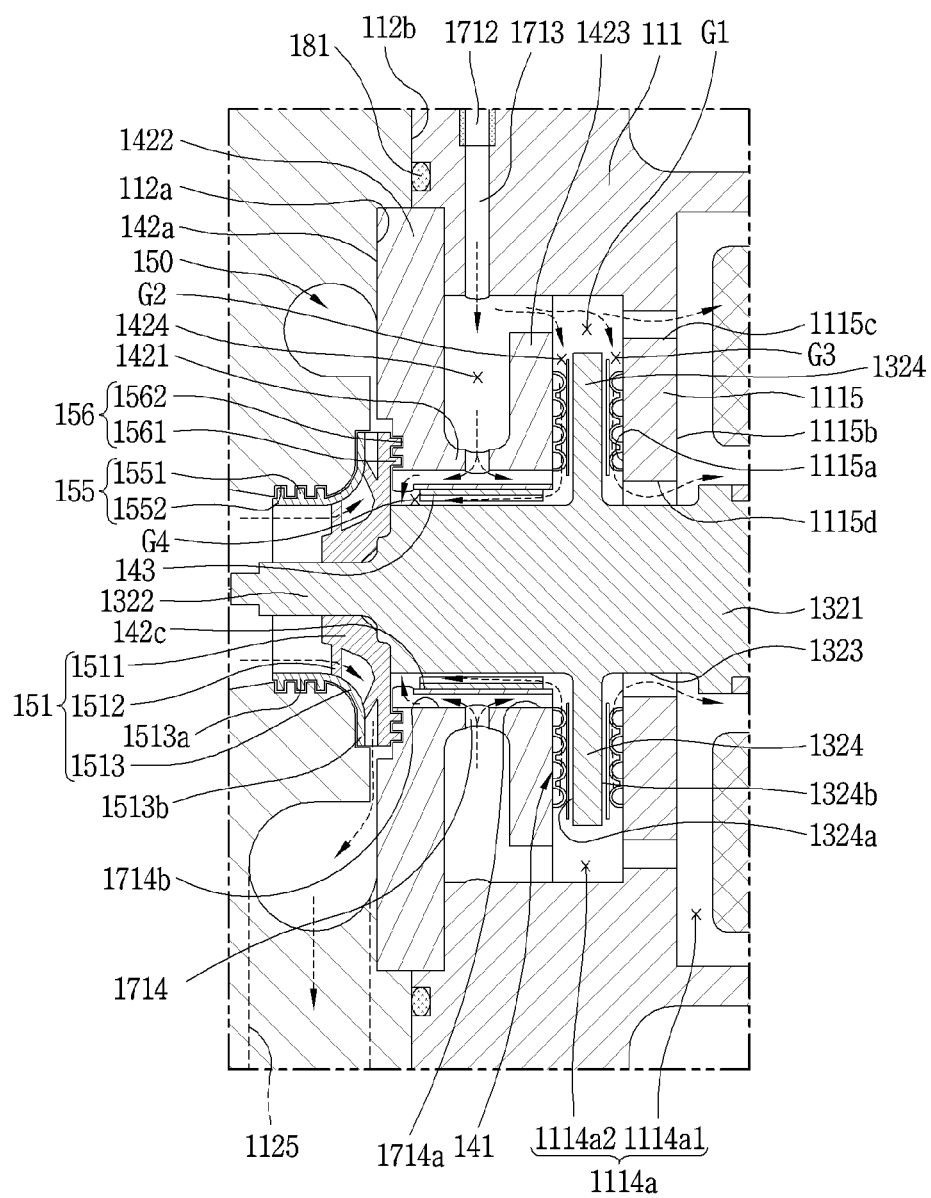
FIG. 5 is an enlarged cross-sectional view of a first compressor portion in FIG. 4.
Figure 6:
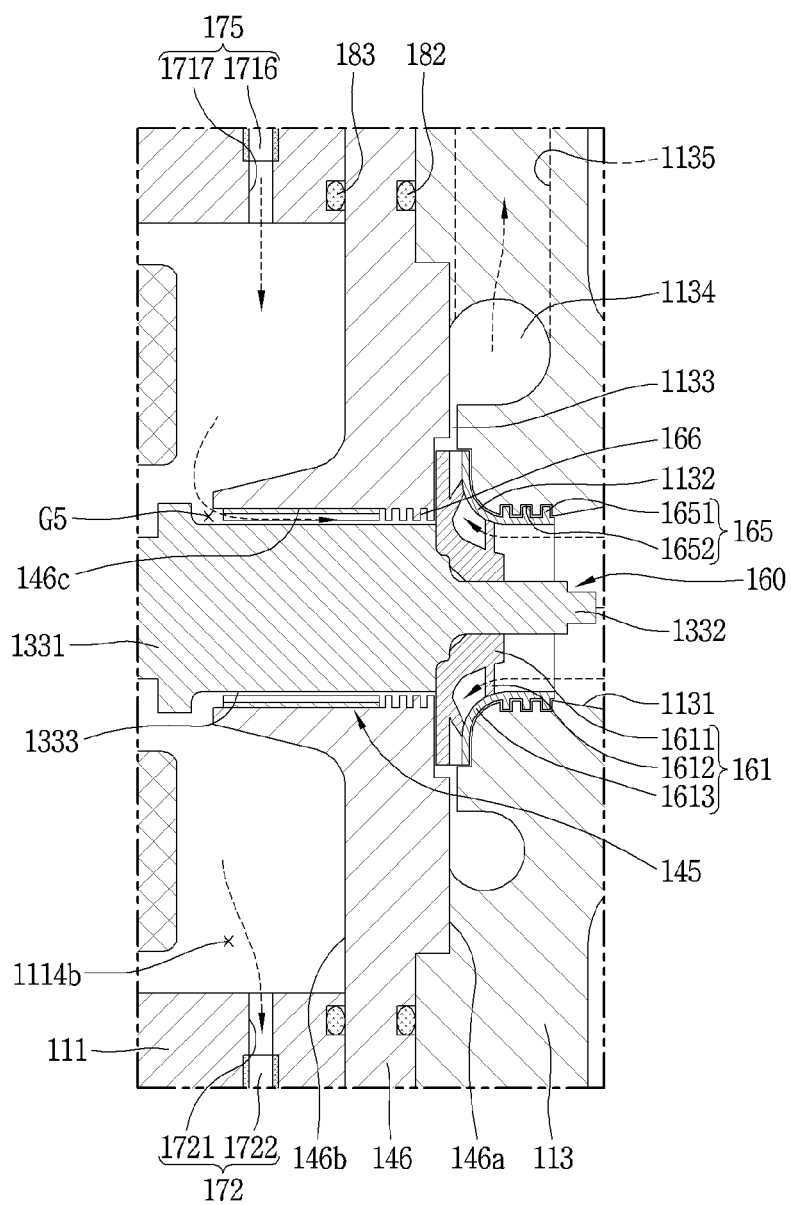
FIG. 6 is an enlarged cross-sectional view of a second compressor portion in FIG. 4.

FIG. 2 is an exploded perspective view of a turbo compressor according to an embodiment. FIG. 3 is an assembled perspective view of an inside of the turbo compressor of FIG. 2. FIG. 4 is a cross-sectional view of the inside of the turbo compressor of FIG. 3. FIG. 5 is an enlarged cross-sectional view of a first compressor portion in FIG. 4. FIG. 6 is an enlarged cross-sectional view of a second compressor portion in FIG. 4.

Referring to these drawings, the turbo compressor 10 according to this embodiment may include a housing 110, an electrically-driven portion 120 constituting a drive motor, a rotational shaft 130, a bearing portion 140, a first compressor portion (first compressor or first-stage compressor portion) 150, a second compressor portion (second compressor or second-stage compressor portion) 160, and a refrigerant passage portion 170. Referring to FIGS. 2 to 4, the housing 110 according to this embodiment may form an exterior of the compressor 10, and include a motor housing 111, a first impeller housing 112, and a second impeller housing 113.

The motor housing 111 may be formed in the shape of a cylinder opposite axial ends of which are open. It should be noted that a first flange portion 1111 and a second flange portion 1112 may formed respectively on opposite ends of the motor housing 111, which extend radially so as to be fastened to a first impeller housing 112 and a second impeller housing 113 described hereinafter, and a recessed portion 1113 formed by recessing a central outer periphery of the motor housing 111 may be formed between the first flange portion 1111 and the second flange portion 1112. Thus, opposite ends of the motor housing 111 may be formed to be thick, thereby ensuring fastening strength, whereas its center may be formed to be thin so that motor heat generated from the electrically-driven portion 120 may be quickly released.

The first flange portion 1111 may be formed with a ring-shaped, bearing shell seating groove 1111a, into which a portion of a first bearing shell 142 described hereinafter may be inserted, and a radially stepped bearing shell seating surface 1111b formed on an inner periphery of the bearing shell seating groove 1111a. A bearing support portion 1115 described hereinafter may be formed to extend radially from one side of the bearing shell seating surface 1111b. The bearing support portion 1115 will be described hereinafter.

A depth of the bearing shell seating groove 1111a may be equal to or slightly smaller than a thickness of the first bearing shell 142. Thus, a portion of a first side 142a of the first bearing shell 142 seated on the bearing shell seating surface 1111b may be supported radially by being inserted into a bearing shell receiving groove 1112a formed in the first impeller housing 112 which is described hereinafter.

The second flange portion 1112 may be formed in a similar manner to the first flange portion 1111, with a stator 112 located midway between them. It should be noted that a second side 146a of a second bearing shell 146 described hereinafter may be tightly fastened to an end face of the second flange portion 1112.

A motor chamber 114 may be formed within the motor housing 111. The motor chamber 1114 may be, for example, press-fitted by shrink-fitting the stator 121 described hereinafter at a center thereof. Thus, the motor chamber 1114 may be segmented into a first chamber 1114a on a side of the first compressor portion 150 and a second chamber 1114b on a side of the second compressor portion 160, with respect to the stator 121 described hereinafter.

The first chamber 1114a may be open toward the first compressor portion 150 but sealed off by the first impeller housing 112, more precisely, the first bearing shell 142, and the second chamber 1114b may be open toward the second compressor portion 160 but sealed off by the second impeller housing 113, more precisely, the second bearing shell 146. The first chamber 1114a and the second chamber 1114b may substantially communicate with each other through a gap between a stator core 1211 constituting the stator 121 of the electrically-driven portion 120 and a stator coil 1212 or through a gap between the stator 121 and a connecting sleeve 131 surrounding a permanent magnet 122. Accordingly, refrigerant in the motor chamber 1114 may move smoothly between the two spaces 1114a and 1114b depending on a pressure difference.

The bearing support portion 1115 constituting a portion of a first bearing portion 141, which is described hereinafter, may be formed midway through the first chamber 1114a. Thus, the first chamber 1114a may be divided into a motor receiving space 1114a1 and a bearing receiving space 1114a2 with respect to the bearing support portion 1115.

Referring to FIGS. 4 and 5, the bearing support portion 1115 may extend radially from an inner periphery of the motor housing 111 constituting the first chamber 1114a toward the rotational shaft 130. However, the bearing support portion 1115 may be, for example, press-fitted to the inner periphery of the motor housing 111 or fastened with a fastening member (not shown), such as a bolt. The bearing support portion 1115 according to this embodiment is illustrated as extending integrally from the inner periphery of the motor housing 111.

As the bearing support portion 1115 is formed in the first chamber 1114a, the stator 121 may be, for example, press-fitted in a direction from the second flange portion (second edge) 1111 of the motor housing 111 toward the first flange portion (first edge) 1112. Accordingly, a stator fixing ridge (not shown) may be formed on the inner periphery of the motor housing 111 which constitutes an edge of the first chamber 1114a, thereby limiting a depth to which the stator 121 may be press-fitted.

Although not shown, in a case in which the bearing support portion 1115 is formed in the second chamber 1114b, the stator 121 may be press-fitted in a direction from the first flange portion 1111 toward the second flange portion 1112. In this case, a stator fixing ridge (not shown) may be formed on the inner periphery of the motor housing 111 which constitutes an edge of the second chamber 1114b.

Although not shown, in a case in which the bearing support portion 1115 is post-assembled, the stator 121 may be press-fitted in either of the two directions. In this case, the stator 121 may be fixed using the bearing support portion 1115.

The bearing support portion 1115 may be formed in the shape of annular disc. For example, a first through hole 1115c may be formed in a center of the bearing support portion 1115 to penetrate opposite axial sides 1115a and 1115b. The first through hole 1115c may radially support an end of the rotational shaft 130 on the side of the first compressor portion, as a first radial bearing 143 is provided on the rotational shaft 130.

The first through hole 1115c may be formed with an inner diameter that allows the rotational shaft 130 to extend therethrough. For example, the first through hole 1115c may be larger than an outer diameter of a first impeller shaft 132 described hereinafter and smaller than an outer diameter of a thrust runner 1324 described hereinafter. Thus, when assembling the rotational shaft 130, the first impeller shaft 132 may be inserted through the first through hole 1115c of the bearing support portion 1115, axially from the first flange portion 1111 of the motor housing 111 to the second flange portion 1112, and then a second side 1324b of the thrust runner 1324 may be axially supported on the first side 1115a of the bearing support portion 1115 which axially faces the second side 1324b, thereby forming a second axial bearing 1442 described hereinafter. This will be described hereinafter with respect to the bearing portion.

The bearing support portion 1115 may have a refrigerant through hole 1115d penetrating opposite axial sides, between the first through hole 1115c constituting an inner periphery of the bearing support portion 1115 and a root end constituting the inner periphery of the motor housing 111. A plurality of the refrigerant through hole 1115d may be formed around a circumference thereof. Accordingly, the motor receiving space 1114a1 and the bearing receiving space 1114a2 may communicate with each other by the first through hole 1115c and the refrigerant through hole 1115d.

The bearing receiving space 1114*a*2 may be formed on the opposite side of the stator 121, with the bearing support portion 1115 located in the middle between them. The bearing receiving portion 1114*a*2 may be formed by an inner space of the above-described first flange portion 1111, that is, by an inner periphery of the bearing shell seating surface 1111*a*, the first side 1115*a* of the bearing support portion 1115, and the first impeller housing 112 described hereinafter.

The bearing receiving space 11142 may be formed as a generally sealed space, except for the first through hole 1115*c* and refrigerant through hole 1115*d* of the bearing support portion 1115 and a first shaft hole 142*c* of the first bearing shell 142 described hereinafter. It should be noted that, in this embodiment, a first inlet passage portion 1711 described hereinafter may be formed so as to supply liquid refrigerant passed through the condenser 20 to the bearing receiving space 1114*a*2.

The first inlet passage portion 1711 may be connected to an outlet of the condenser 20 through a first refrigerant inlet pipe 1712. Accordingly, the liquid refrigerant passed through the condenser 20 may be introduced into the bearing receiving space 1114*a*2 constituting a portion of the first chamber 1114*a*, and this liquid refrigerant may be introduced into the first radial bearing 143 provided on an inner periphery of the first bearing shell 142, a first axial bearing 1441 provided on a second side 142*b* of the first bearing shell 142, and a second axial bearing 1442 provided on the first side 115*a* of the bearing support portion 1115. Accordingly, the liquid refrigerant as a working fluid produces a bearing force on an end of the first compressor portion of the rotational shaft 130 by supporting the bearings 143, 1441, and 1442 constituting the first bearing portion 141, and at the same cools the bearings 143, 1441, and 1442 constituting the first bearing portion 141 and the rotational shaft 130 facing them.

The second chamber 1114*b* substantially communicates with the first chamber 1114*a* as discussed above. However, it should be noted that a second refrigerant inlet pipe 1716 may be connected to the motor housing 111 constituting the second chamber 1114*b*. Like the first refrigerant inlet pipe 1712, the second refrigerant inlet pipe 1716 may be connected to the outlet of the condenser 20. Thus, a portion of the liquid refrigerant passed through the condenser 20 may be introduced into the second chamber 1114*b*, and this liquid refrigerant may be introduced into a second radial bearing 147 communicating with the second chamber 1114*b*. Accordingly, the liquid refrigerant as the working fluid produces a bearing force on a second end of the rotational shaft by supporting a bump foil constituting the second radial bearing 147, and at the same time, cools the second radial bearing 147 and the rotational shaft facing it.

Referring to FIGS. 2 to 5, a second side of the first impeller housing 112 facing the motor housing 111 may be tightly attached and fastened with a bolt to the first flange portion 1111 of the motor housing 111, and the first impeller housing 112 may be formed roughly in the shape of a disc.

A first sealing member 181, such as a gasket or an O-ring, may be provided between the second side of the first impeller housing 112 and the first flange portion 1111 of the motor housing 111 facing it, so that the first chamber 1114*a* of the motor housing 111, more precisely, the bearing receiving space 1114*a*2, may be tightly sealed. For example, the bearing shell receiving groove 112*a* may be formed on the second side of the first impeller housing 112 and wider than an outer diameter of a first volute 1124 described hereinafter, and an annular, first housing fastening surface 112*b* may be formed outside of the bearing shell receiving groove 112*a* and stepped from the bearing shell receiving groove 112*a*. The first housing fastening surface 112*b* may be tightly attached and fastened with a bolt to the first flange portion 1111 of the motor housing 111, with the first sealing member 181 interposed between them.

The first impeller housing 112 according to this embodiment may include a first intake port 1121, a first impeller receiving portion 1122, a first diffuser 1123, a first volute 1124, and a first discharge port 1125. The first intake port 1121 may be formed in such a direction as to penetrate opposite axial sides at the center of the first impeller housing 112. For example, the first intake port 1121 may be open on a front side (first side) of the first impeller housing 112 and extend axially. The first intake port 1121 may be formed in the shape of a truncated cone, with a wide entrance end to which a refrigerant intake pipe 115 may be connected, and a narrow exit end to which the first impeller receiving portion 1122 may be connected. Therefore, a flow rate and flow velocity of refrigerant drawn in through the first intake port 1121 may be increased.

The first impeller receiving portion 1122 may extend from an exit end of the first intake port 1121 toward an outer periphery of the first impeller 151, and the first impeller 151 may be rotatably inserted into the first impeller receiving portion 1122. Thus, the first impeller receiving portion 1122 may be defined as a first stationary side shroud, an inner periphery of the first impeller receiving portion 1122 may be curved along the shape of an outer side of the first impeller 151.

The first impeller receiving portion 1122 may be formed in such a way that its inner periphery is separated from an outer side of the first impeller 151 by as small a gap as possible. Therefore, refrigerant passed through the first impeller 151 may be kept from flowing back to the intake side of the first impeller 151 from the discharge side thereof through an outside of the first impeller 141, that is, through a gap between the inner periphery of the first impeller receiving portion 1122 and the outer periphery of the first impeller 151. This prevents an intake loss in the first compressor portion which occurs when first-stage compressed refrigerant flows back to the intake side of the first impeller 151 which is at a relatively low temperature and low pressure.

The first intake sealing portion 155 or a portion of the first intake sealing portion 155 may be formed on the inner periphery of the first impeller receiving portion 1122. For example, a first outer sealing portion 1551 constituting the first intake sealing portion 155 may be formed on the inner periphery of the first impeller receiving portion 1122.

The first outer sealing portion 1551 may be corrugated in the axial direction, and together with a first inner sealing portion 1552 described hereinafter, may constitute a labyrinth seal. This makes it more effective to prevent refrigerant from leaking to the intake side from the discharge side, between the inner periphery of the first impeller receiving portion 1122 and the outer periphery of the first impeller 151. The first intake sealing portion 155 including the first outer sealing portion 1551 will be described hereinafter.

The first diffuser 1123 may extend from a trailing edge of the first impeller receiving portion 112. For example, the first diffuser 1123 may be formed as a space between the first side 142*a* of the first bearing shell 142 and the second side (not shown) of the first impeller housing 112 facing it.

The first diffuser 1123 may include spiral protrusions from the first side 142*a* of the first bearing shell 142 which are formed around a circumference at preset or predetermined intervals. The first diffuser 1123 also may be formed as a space between the first bearing shell 142 and the first impeller housing 112 facing it, from which the above-mentioned spiral protrusions are excluded. Due to centrifugal force, refrigerant passing through the first diffuser 1123 has a higher pressure as it becomes closer to the first volute 1124.

The first volute 1124 may be formed by being connected to a trailing edge of the first diffuser 1123. For example, the first volute 1124 may be recessed from an axial rear side of the first impeller housing 112. The first volute 1124 may be formed in the shape of a ring to cover an outer periphery of the first diffuser 1123 in such a way that its cross-sectional area increases toward the first discharge port 1125 described hereinafter.

The first discharge port 1125 may be formed by penetrating an outer side of the first impeller housing 112, midway along a circumference of the first volute 1124. Accordingly, an entrance end of the first discharge port 1125 may be connected to the first volute 1124, and an exit end thereof may be connected to a second intake port of the second impeller housing 113 via a refrigerant connecting pipe 116 described hereinafter.

Referring to FIGS. 4 and 6, a second side of the second impeller housing 113 facing the motor housing 111 may be tightly attached to the second flange portion 1112 of the motor housing 111. While the first impeller housing 112 is inserted and fastened into the motor housing 111, the second impeller housing 113 may be tightly fastened to an end face of the motor housing 111. Accordingly, an outer diameter of the second impeller housing 113 may be made larger than an inner diameter of the motor housing 111.

The second impeller housing 113 may be made almost similar to the first impeller housing 112. For example, the second impeller housing 113 according to this embodiment may include a second intake port 1131, a second impeller receiving portion 1132, a second diffuser 1133, a second volute 1134, and a second discharge port 1135. The second intake port 1131 may be made almost identical to the first intake port 1121, the second impeller receiving portion 1132 may be made almost identical to the first impeller receiving portion 1122 (which may be defined as a second stationary side shroud), the second diffuser 1133 may be made almost identical to the first diffuser 1123, the second volute 1134 may be made almost identical to the first volute 1124, and the second discharge 1135 may be made almost identical to the first discharge 1125. A description of the second impeller housing 113 will be replaced with the description of the first impeller housing 112.

Moreover, a portion of the second intake sealing portion 165 or the second intake sealing portion 165 may be formed on an inner periphery of the second impeller receiving portion 1132. This makes it more effective to prevent refrigerant from leaking to the intake side from the discharge side, between the inner periphery of the second impeller receiving portion 1132 and an outer periphery of the second impeller 161. The second intake sealing portion 165 will be described hereinafter.

Referring to FIGS. 2 to 4, the electrically-driven portion 120 according to this embodiment may include a stator 121 and a permanent magnet 122 constituting a rotor. The stator 121 may include a stator core 1211 fixed to the motor housing 111 by, for example, press-fitting, and a stator coil 1212 wound on the stator core 1211.

The stator core 1211 may be formed in the shape of a cylinder, and one axial end of the stator core 1211 may be axially supported on a stator fixing ridge (not shown) provided on the inner periphery of the motor housing 111. A plurality of teeth may be formed around a circumference thereof to radially protrude from an inner periphery of the stator core 1211, with slots between them.

The stator coil 1212 may be wound around the teeth through the slots. Accordingly, a circumferential gap may be created between both sides of the stator coil 1212 in the slots, and this circumferential gap may serve as a refrigerant passage through which the first chamber 1114*a* and second chamber 1114*b* of the motor housing 111 communicate with each other.

The permanent magnet 122 constituting the rotor may be spaced apart from an inner periphery of the stator 121 so as to be rotatable within the stator 121. The permanent magnet 122 may be inserted into and coupled to the rotational shaft 130.

The permanent magnet 122 may be formed in the shape of a circular bar, and is divided into halves: an N pole and an S pole. The rotor may be made not only of a permanent magnet alone, but also with a permanent magnet buried in a circular bar constituting a rotor core as well. This embodiment is illustrated with an example in which the permanent magnet 122 is inserted into the rotational shaft 130 and a portion of the rotational shaft 130 constitutes the rotator core (not shown). Therefore, in this embodiment, a connecting sleeve 131 described hereinafter may be understood as a kind of rotator core.

Referring to FIGS. 3 and 4, the rotational shaft 130 according to this embodiment may include connecting sleeve 131, a first impeller shaft 132, and a second impeller shaft 133. The connecting sleeve 131 may be formed in the shape of a cylinder, and rotatably inserted into the stator 121. For example, a length of the connecting sleeve 131 may be greater than or equal to an axial length of the stator 121, and the connecting sleeve 131 may be coupled in such a way that its axial center and an axial center of stator 121 may be on the same line in the radial direction.

A magnet receiving portion 1311 may be formed within the connecting sleeve 131, and the permanent magnet 122 constituting the rotor may be inserted into the magnet receiving portion 1311. The connecting sleeve 131 may be made of a non-conductive material or a conductive material, for example. If the connecting sleeve 131 is made of a non-conductive material, motor efficiency and rigidity of the rotational shaft 130 may be lowered. Thus, the connecting sleeve 131 in this embodiment may be made of a conductive and rigid material, for example, a copper material. Accordingly, the connecting sleeve 131 constitutes a portion of the rotational shaft 130 and at the same time, along with the permanent magnet 122, constitutes a portion of the rotor.

The magnet receiving portion 1311 is almost identical in shape to an outer periphery of the permanent magnet 122, and an inner diameter of the magnet receiving portion 1311 may be almost similar to an outer diameter of the permanent magnet 122. In other words, the permanent magnet 122 may be shrink-fitted and fixed to the permanent receiving portion 1311. Accordingly, the permanent magnet 122 inserted into the magnet receiving portion 1311 may be kept in its position as much as it can be.

However, if the connecting sleeve 131 according to this embodiment is made of a material with a higher thermal expansion coefficient than the permanent magnet 122, the permanent magnet 122 may be separated from an inner periphery of the connecting sleeve 131, that is, the permanent receiving portion 1311, during operation of the compressor. This may make it difficult to ensure reliability of the permanent magnet 122 as the rotational shaft 130 rotates at a high speed (for example, 40,000 rpm or higher). In this regard, this embodiment may further provide a permanent magnet locking portion (hereinafter, first locking portion) 135 that mechanically locks a clearance between the connecting sleeve 131 and the permanent magnet 122 in the circumferential direction. The first locking portion 135 will be described hereinafter.

Although not shown, a magnet fixing ridge (not shown) axially supporting one end of the permanent magnet 122 may be formed with a difference in level, on the inside of the connecting sleeve 131, that is, on one end of an inner periphery of the magnet receiving portion 1311. Accordingly, the permanent magnet 122 may be placed easily at the center of the stator when the permanent magnet 122 is assembled, and the permanent magnet 122 also may be kept in its position more stably at the center of the stator even if the rotational shaft 130 rotates at a high speed.

The first impeller shaft 132 may include a first shaft fixing portion 1321, a first impeller fixing portion 1322, a first bearing surface portion 1323, and a thrust runner 1324. The first shaft fixing portion 1321 may extend axially from the first bearing surface portion 1323 towards the second impeller shaft 133, and be smaller than an outer diameter of the first bearing surface portion 1323. Thus, the first shaft fixing portion 1321 may be inserted into and fixed to an end (hereinafter, "first end") of the connecting sleeve 131 on the side of the first compressor portion. For example, the first shaft fixing portion 1321 may be welded and coupled to the first end of the connecting sleeve 131 while being press-fitted thereto.

However, an impeller shaft locking portion (hereinafter, "second locking portion") 136 may be provided between the first shaft fixing portion 1321 of the first impeller shaft 132 and the first end of the connecting sleeve 131 to prevent the first impeller shaft 132 from idling with respect to the connecting sleeve 131. In other words, the second locking portion 136 may be provided to mechanically lock a clearance between the connecting sleeve 131 and the first impeller shaft 132 facing it in the circumferential direction. The second locking portion 136 will be described hereinafter.

The first impeller fixing portion 1322 may extend axially from the first bearing surface portion 1323 toward the first impeller 151 which is opposite the first shaft fixing portion 1321. The first impeller fixing portion 1322 may be smaller than an outer diameter of the first shaft fixing portion 1321, as well as the outer diameter of the first bearing surface portion 1323, and may be inserted into and coupled to a first hub 1511 of the first impeller 151 described hereinafter.

The first impeller fixing portion 1322 may be angular or have a D cut shape. Thus, the first impeller fixing portion 1322, while being inserted in the first impeller 151, may transmit torque of the electrically-driven portion 120 without slip.

The first bearing surface portion 1323 may be formed in the shape of a circular bar or a cylinder between the first shaft fixing portion 1321 and the first impeller fixing portion 1322. The first bearing surface portion 1323 is a portion that is inserted into the first radial bearing 143 described hereinafter and radially supported by it. An outer periphery of the first bearing surface portion 1323 may be formed in the shape of a smooth tube so as not to produce rotational resistance to the first radial bearing 143.

Referring to FIGS. 3 to 5, the thrust runner 1324 may be formed in the shape of a disc as it extends like a flange between the first shaft fixing portion 1321 and the first impeller fixing portion 1322, in other words, on the outer periphery of the first bearing surface portion 1323. The thrust runner 1324 may be provided between the bearing support portion 1115 and the first bearing shell 142 and supported on both sides of the axis between the bearing support portion 1115 and the first bearing shell 142. In other words, the thrust runner 1324 may form an axial moving side support portion (moving side support portion), and the bearing support portion 1115 and the first bearing shell 142 each may form an axial stationary support portion (stationary side support portion). Accordingly, the rotational shaft 130 may be supported on both sides of the axis, along with the first impeller 151 and second impeller 161 coupled to both ends of the rotational shaft 130.

The bearing support portion 1115 and the first bearing shell 142 constituting the stationary side support portion form the second chamber 1115b, with the thrust runner 1324 interposed between them. Thus, the first bearing shell 142 may be defined as a first partition wall, and the bearing support portion 1115 may be defined as a second partition wall.

The thrust runner 1324 may be formed in such a way that an outer periphery thereof is separated from an inner periphery of the bearing receiving space 114a2. An outer diameter of the thrust runner 1324 may be smaller than an inner diameter of the bearing receiving space 1114a2, and an outer periphery of the thrust runner 1324 and a first gap G1 may be formed between the inner periphery of the bearing receiving space 114a2 which are radially separated by a preset or predetermined distance.

The first gap G1 may communicate with a second gap G2 described hereinafter where the first axial bearing 1441 is provided and a third gap G3 described hereinafter where the second axial bearing 1442 is provided. In other words, an outer periphery of the second gap G2, which constitutes the space between a first side 1324a of the thrust runner 1324 and the second side 142b of the first bearing shell 142 facing it, may communicate with an inner periphery of the first gap G1, and an outer periphery of the third gap G3, which constitutes the space between the second side 1324b of the thrust runner 1324 and the first side 1115a of the bearing support portion 1115 facing it, may communicate with the inner periphery of the first gap G1.

Accordingly, refrigerant may be introduced into the first gap G1 constituting the bearing receiving space 1114a2 through a first refrigerant inlet 1713, and this refrigerant may be introduced into the second gap G2 and the third gap G3 as it moves through the first gap G1 in the circumferential direction. As this refrigerant moves from the outer periphery of the second gap G2 and third gap G3 to an inner periphery thereof, it is radially supplied to the first axial bearing 1441 and the second axial bearing 1442, and therefore the first axial bearing 1441 and the second axial bearing 1442 each may maintain uniform bearing force.

The first shaft hole 142c of the first bearing shell 142 constituting a fourth gap G4 may communicate with an inner periphery of the second gap G2, and the first through hole 1115c of the bearing support portion 1115 may communicate with the inner periphery of the third gap G3. Accordingly, refrigerant moving from the outer periphery of the second gap G2 to the inner periphery thereof may be introduced into the first shaft hole 142c, and this refrigerant may be supplied from one end of the first radial bearing 143 provided in the first shaft hole 142c to the other end thereof, and therefore the first radial bearing 143 may maintain uniform bearing force. Refrigerant moving from the outer periphery of the third gap G3 to an inner periphery thereof passes through the first through hole 1115c and moves to the motor receiving space 1114a1.

Although not shown, the first axial bearing 1441 may be provide on the first side 1324a of the thrust runner 1324, and the second axial bearing 1442 may be provided on the second side 1324b of the thrust runner 1324. In this case, both the first axial bearing 1441 and the second axial bearing 1442 may be installed on the rotational shaft 130, thereby making easier installation and assembly of the first axial bearing 1441 and the second axial bearing 1442. The first axial bearing 1441 and the second axial bearing 1442 will be described hereinafter.

Referring to FIG. 4, the second impeller shaft 133 may be inserted into and fixed to an end (hereinafter, "second end") of the connecting sleeve 131 on the side of the second compressor portion. For example, like the first impeller shaft 132, the second impeller shaft 133 may be welded and coupled to the second end of the connecting sleeve 131 while being press-fitted thereto.

The second impeller shaft 133 and the first impeller shaft 132 may be made symmetrical with respect to the connecting sleeve 131, and the thrust runner 1324 may be excluded as a second bearing portion 145 has no axial bearing. That is, the second impeller shaft 133 may include a second shaft fixing portion 1331, a second impeller fixing portion 1332, and a second bearing surface portion 1333. However, in some cases, the second impeller shaft 133 may have the thrust runner 1324 by including an axial bearing at the second bearing portion 145 as well.

The bearing portion 140 according to this embodiment may include the first bearing portion 141 and the second bearing portion 145. The first bearing portion 141 may be provided between the electrically-driven portion (or drive motor) 120 and the first compressor portion 150, and the second bearing portion 145 may be provided between the electrically-driven portion (or drive motor) 120 and the second compressor portion 160.

Referring to FIGS. 4 and 5, the first bearing portion 141 may include a first bearing shell 142, a first radial bearing 143, a first axial bearing 1441, and a second axial bearing 1442. The first radial bearing 143 may be located on an inner periphery of the first bearing shell 142, the first radial bearing 1441 may be located on the second side 142b of the first bearing shell 142, and the second axial bearing 1442 may be located on the first side 1115a of the bearing support portion 1115.

The first bearing shell 142 may be fastened with bolts to the motor housing 111 between the bearing support portion 1115 and the first impeller housing 112. For example, the first bearing shell 142 may be inserted into the bearing shell seating groove 1111a, and the second side 142b of the first bearing shell 142 which is opposite the first compressor portion may be fastened with a bolt to the bearing shell seating surface 1111b while being tightly attached thereto.

However, in some cases, no fastening bolt may be provided, and both sides of the first bearing shell 142 may be tightly attached and fixed to the bearing shell seating surface 1111b of the motor housing 111 and the impeller shell receiving groove 112a of the first impeller housing 112, respectively. In this case, as there is no separate fastening member for fastening the first bearing shell 142, the first bearing shell 142 may be easily assembled at low cost.

The first bearing shell 142 may be shaped like a ring that has roughly the shape of a U-shaped cross-section, with its outer periphery recessed. For example, the first bearing shell 142 may include an inner wall portion 1421, a first sidewall portion 1422, a second sidewall portion 1423, and a refrigerant receiving portion 1424.

The inner wall portion 1421 may be formed in the shape of a ring that covers an outer periphery of the rotational shaft 130 in the circumferential direction, and an inner diameter of an inside thereof may be larger than an outer diameter of the rotational shaft 130. Accordingly, a first shaft hole 142c separated from the outer periphery of the rotational shaft 130 may be formed through an inner periphery of the inner wall portion 1421, and a first radial bearing 143 may be provided on the inner periphery of the inner wall portion 1421. The first radial bearing 143 may be formed as a gas foil bearing, as in the previous embodiments.

The first sidewall portion 1422 may be formed in the shape of a ring that extends radially from one side of an outer periphery of the inner wall portion 1421, more precisely, an outer periphery on the front facing the first impeller 151 which corresponds to one of two axial ends of the first sidewall portion 1422. An outer diameter of the first sidewall portion 1442 may be almost similar to an inner diameter of the bearing shell receiving groove 112a provided on the first impeller housing 112. Accordingly, an outer periphery of the first sidewall portion 1422 may be tightly attached to an inner periphery of the bearing shell receiving groove 112a and supported in the radial direction. Thus, it is possible to stably support the first bearing shell 142 while reducing the number of bolts, when the first bearing shell 142 is fastened with bolts to the motor housing 111. Also, a position at which the first bearing shell 142 is to be assembled may be determined using the bearing shell receiving groove 112a, so that no separate reference pin is required, thereby reducing manufacturing costs.

A rear sealing portion 1562 may be formed in a center of a front side of the first sidewall portion 1422. The rear sealing portion 1562, together with a front sealing portion 1561 described hereinafter, may form a first discharge sealing portion 156 constituting a labyrinth seal. For example, the rear sealing portion 1562 may be formed with annular projections of a preset or predetermined height and annular grooves of a preset or predetermined depth that alternate with each other.

The second sidewall portion 1423 may be formed in the shape of a ring, which extends radially from the other side of the outer periphery of the inner wall portion 1421. The second sidewall portion 1423 may be shorter than the first sidewall portion 1422. For example, an outer diameter of the second sidewall portion 1423 may be smaller than the inner diameter of the motor housing 111. Accordingly, the first gap G1 may be formed between an outer periphery of the second sidewall portion 1423 and the inner periphery of the motor housing 111 radially facing it.

However, in some cases, the outer diameter of the second sidewall portion 1423 may be almost similar to the inner diameter of the motor housing 111. In this case, a separate refrigerant passage (not shown) which is at least one hole or groove may be formed in the second sidewall portion 1423.

The refrigerant receiving portion 1424 may be formed between the first sidewall portion 1422 and the second sidewall portion 1423. More specifically, the refrigerant receiving portion 1424 may be defined as a space shaped like a ring, by a second side of the first sidewall portion 1422 and a first side of the second sidewall portion 1423. Thus, an inner peripheral side of the refrigerant receiving portion 1424 facing the rotational shaft 130 may be sealed by the inner wall portion 1421, and an outer peripheral side thereof facing the inner periphery of the motor housing 111 may be at least partially open.

The refrigerant receiving portion 1424 may be radially overlap the first refrigerant inlet 1713. For example, an exit of the first refrigerant inlet 1713 may be located between the first sidewall portion 1422 and the second sidewall portion 1423.

The inner wall portion 1421 may be formed with a refrigerant intake passage 1714. The refrigerant intake passage 1714 may include a single passage with one entrance and one exit or may include a dual passage with one entrance and a plurality of exits. The refrigerant intake passage according to this embodiment is illustrated as a dual passage.

For example, the refrigerant intake passage 1714 may include a first intake passage 1714a and a second intake passage 1714b whose exits are separated from each other. An entrance of the first intake passage 1714a and an entrance of the second intake passage 1714b may communicate with each other and be open toward the refrigerant receiving portion 1424 midway through the outer periphery of the inner wall portion 1421. The exit of the first intake passage 1714a may be open to the second side 142b of the inner wall portion 1421, and the exit of the second intake passage 1714b may be open to the inner periphery of the inner wall portion 1421.

Although not shown, the exit of the first intake passage 1714a may be formed to be open to a side of the second sidewall portion 1423 extending from the inner wall portion 1421. However, this variation is caused by how ranges of the inner wall portion 1421 and the second sidewall portion 1423 are specified, and in fact, it can be said that the exit of the first intake passage 1714a is open to a side of the inner wall portion 1421 facing the thrust runner 1324.

Only one refrigerant intake passage 1714 may be formed, or a plurality of refrigerant intake passages 1714 may be formed at preset or predetermined intervals in the circumferential direction. This embodiment is illustrated with an example in which a plurality of refrigerant intake passages 1714 is formed at equal intervals along a circumference of the inner wall portion 1421. Accordingly, refrigerant is uniformly supplied to each bearing through the plurality of refrigerant intake passages 1714, thereby providing a uniform supply of refrigerant to the first radial bearing 143 and the first and second axial bearings 1441 and 1442. Thus, the first radial bearing 143 and the first and second axial bearings 1441 and 1442 may maintain uniform bearing force, thereby stably supplying the rotational shaft 130.

In a case in which the refrigerant receiving portion 1424 is formed in the shape of a ring on the outer periphery of the first bearing shell 142, as in this embodiment, refrigerant entering the bearing receiving space 1114a2 may be directly introduced toward the refrigerant receiving portion 1424 of the first bearing shell 142 and received in it, and this refrigerant may be uniformly distributed throughout the refrigerant receiving portion 1424 as it moves in the circumferential direction. Consequently, the first bearing shell 142 including the refrigerant receiving portion 1424 may be quickly and uniformly cooled by the refrigerant received in the refrigerant receiving portion 1424.

Moreover, as the refrigerant receiving portion 1424 is recessed to a preset or predetermined depth, from the outer periphery of the first bearing shell 142 toward the inner periphery thereof, the first intake passage 1714a or second intake passage 1714b constituting the exit of the refrigerant intake passage 1714 may be sloped. Accordingly, the exit of the refrigerant intake passage 1714 may be formed as close to the rotational shaft 130 as possible, thereby increasing a mass flow of refrigerant. In addition, with the exit of the refrigerant intake passage 1714 being formed as close to the rotational shaft 130 as possible, it is possible to extend a radial length of the first axial bearing 1441 while ensuring enough radial thickness for the first radial bearing 1441. As such, the first axial bearing 1441 is able to provide bearing force.

The rear sealing portion 1562 constituting a portion of the first discharge sealing portion 156 may be provided on a front side of the first bearing shell 142, that is, on the first side 142a of the first sidewall portion 1422 facing the first impeller 151. The rear sealing portion 1562 may be made into an annular labyrinth seal with at least one corrugation along the radius. Accordingly, the first discharge sealing portion 156 including the rear sealing portion 1562 forms a radial sealing portion.

In this case, the first discharge sealing portion 156 may be made up solely of the rear sealing portion 1562. Otherwise, the front sealing portion 1561 may be provided on a rear side of the first impeller 151, so that the first discharge sealing portion 156 is made up of a combination of the front sealing portion 1561 and the rear sealing portion 1562.

For example, if the first discharge sealing portion 156 is made up of a combination of the front sealing portion 156 and the rear sealing portion 1562, the two sealing portions 1561 and 1562 may be formed symmetrically, so that projections of the front sealing portion 1561 are inserted to a preset or predetermined dept into the grooves of the rear sealing portion 1561, and the projections of the rear sealing portion 1562 are inserted to a preset or predetermined depth into grooves of the front sealing portion 1561. Accordingly, the first discharge sealing portion 156 is formed in a zigzag pattern and therefore has a narrow and long sealing flow path. Thus, it is possible to keep refrigerant from leaking to the motor chamber 1114 through a gap between the front side of the first bearing shell 142 and the rear side of the first impeller 151.

The first discharge sealing portion 156 including the rear sealing portion 1562 may be formed in a position at which it axially overlaps the first impeller 151. Thus, it is possible to minimize leakage of refrigerant passing through the first diffuser 1123 past the first impeller 151 through the gap between the rear side (second side) of the first impeller 151 and the front side (first side) of the first bearing shell 142, thereby increasing compression efficiency.

In this case, however, the first radial bearing 143 and the first and second axial bearings 1441 and 1442, which are described hereinafter, are not supplied with sufficient amounts of refrigerant as the working fluid, which may lead to a delay in the formation of bearing force in the bearings or overheating of the bearings. In this regard, as in this embodiment, the first radial bearing 143 and the first and second axial bearings 1441 and 1442 maybe formed with a separate refrigerant flow path described hereinafter, so that refrigerant is supplied to each of the bearings. Consequently, refrigerant leakage in the first compressor portion 150 may be reduced, and therefore compression efficiency may be increased, thereby increasing reliability of the bearings 143, 1441, and 1442 and preventing overheating thereof. This will be described hereinafter.

A first radial bearing 143 described hereinafter may be provided on an inner periphery of the first shaft hole 142c of the first bearing shell 142, and the first axial bearing 1441 may be provided on the second side 142b of the first bearing shell 142 facing the thrust runner 1324. Although not shown, the first radial bearing 143 may be provided on the outer periphery (first bearing surface portion) of the rotational shaft 130, and the first axial bearing 1441 may be provided on the first side 142a of the thrust runner 1324.

The first radial bearing 143 may be formed as a gas foil bearing. For example, the first radial bearing 143 may include a corrugated bump foil (not shown) and an arc-shaped top foil (not shown).

The first radial bearing 143 may be provided on an inner periphery of the first bearing shell 142 so as to radially face the outer periphery of the rotational shaft 130, more precisely, the first bearing surface portion 1323. Thus, when the rotational shaft 130 rotates, refrigerant as the working fluid is introduced into the first radial bearing 143, forming a kind of fluid film and radially supporting the rotational shaft 130. As the gas foil bearing is universally known, detailed description thereof has been omitted.

it should be noted that, in the first radial bearing 143 according to this embodiment, the bump foil may bulge outward in the radial direction and be corrugated along the circumference, and that the top foil may be separated from the outer periphery of the rotational shaft 130 by a preset or predetermined distance. Consequently, the first radial bearing 143 may be formed with an axial refrigerant passage opposite axial ends of which are open.

In view of this, in this embodiment, the refrigerant intake passage 1714 described hereinafter may be formed in such a way as to be positioned outside of a range of an axis of the first radial bearing 143. Accordingly, refrigerant entering the bearing receiving space 1114a2 may be introduced from one axial end of the first radial bearing 143 to the other axial end, so that a fluid film is formed uniformly between the rotational shaft 130 and the first radial bearing 143. The refrigerant intake passage 1714 will be described hereinafter in the description of the refrigerant passage portion.

As described previously, the first axial bearing 1441 may be fixed and installed to the second side 142b of the first bearing shell 142. The first axial bearing 1441 may have the shape of a disc, and be formed as a gas foil bearing just like the first radial bearing 143.

For example, the first axial bearing 1441 may include a first bump foil (not shown) having a corrugated shape and a first top foil (not shown) having an arc plate shape, and be disposed in such a way that the second side 142b of the first bearing shell 142 faces the first side 1324a of the thrust runner 1324. Likewise, as the gas foil bearing is universally known, detailed description thereof has been omitted.

It should be noted that, in the first axial bearing 1441 according to this embodiment, the first bump foil (not shown) may bulge outward in the axial direction and be corrugated along the circumference, and that the first top foil (not shown) may be separated from the thrust runner 1324 by a preset or predetermined distance. Consequently, a radial refrigerant passage opposite axial ends of which are open may be formed in the radial direction of the first axial bearing 1441.

In view of this, in this embodiment, the refrigerant intake passage 1714 described hereinafter may be formed in such a way as to be positioned outside of a range of a radius of the first axial bearing 1441. Accordingly, refrigerant entering the bearing receiving space 1114a2 may be introduced from one radial end of the first axial bearing 1441 to the other radial end, so that a fluid film is formed uniformly between the first side 1324a of the thrust runner 1324 and the first axial bearing 1441.

The second axial bearing 1442 has basically the same construction and operational effects as the first axial bearing 1441, except for the installation position. For example, the second axial bearing 1442 may be provided on the first side 1115a of the bearing support portion 1115 facing the second side 1324a of the thrust runner 1324. Accordingly, refrigerant entering the bearing receiving space 1114a2 causes a fluid film to be formed uniformly between the second side 1324b of the thrust runner 1324 and the second axial bearing 1442.

Referring to FIGS. 4 and 6, the second bearing portion 145 according to this embodiment may include the second bearing shell 146 and the second radial bearing 147. The second radial bearing 147 may be provided in a second shaft hole 146c constituting an inner periphery of the second bearing shell 146.

The second bearing shell 146 may be provided between the motor housing 111 and the second impeller housing 113. For example, a first side 146a of the second bearing shell 146 facing the second compressor portion 160 may be tightly attached and fastened to the second impeller housing 113, with a second sealing member 182 interposed between them, and a second side 146b of the second bearing shell 146 which is axially opposite the first side 146a may be tightly attached and fastened to the second flange portion 1112 of the motor housing 111, with a third sealing member 183 interposed between them. Although not shown, the second bearing shell 146 may be inserted into the second flange portion 1112 of the motor housing 111 and fixed thereto as it is pressed against the motor housing 111 and the second impeller housing 113. In this case, a separate fastening member for fastening the second bearing shell 146 is not required, thereby simplifying an assembly process of the second bearing shell 146.

The second bearing shell 146 may be formed in the shape of a ring inner and outer peripheries of which are blocked. For example, the second bearing shell 146 may have a preset or predetermined axial length, and be formed in the shape of a ring a center of which is axially penetrated by the second shaft hole 146.

An inner diameter of the second shaft hole 146c may be larger than the outer diameter of the rotational shaft 130, more precisely, an outer diameter of the second bearing surface portion 1333 provided on the second impeller shaft 133. Accordingly, a front end of the second impeller shaft 133 constituting the rotational shaft 130 may be coupled to the second impeller 161 described hereinafter after passing through the second shaft hole 146c of the second bearing shell 146.

A second discharge sealing portion 166 may be provided on an inner periphery of the second shaft hole 146c. The second discharge sealing portion 166 may be made into an annular labyrinth seal with grooves formed at preset or predetermined intervals along the axis. Thus, it is possible to minimize leakage of refrigerant passing through the second diffuser 1133 past the second impeller 161 through a fifth gap G5 between the outer periphery of the second impeller shaft 133 and the inner periphery of the second bearing shell 146, thereby increasing compression efficiency.

The second radial bearing 147 may be provided on one side of the second discharge sealing portion 166, that is, on a side of the inner periphery of the second shaft hole 146c adjacent to the electrically-driven portion 120. The second radial bearing 147 may be formed a gas foil bearing, just like the first radial bearing 143. Description of the second radial bearing 147 will be replaced with the description of the first radial bearing 143.

It should be noted that, as described above, the second radial bearing 147 is provided to face and communicate with the motor chamber (more precisely, the second chamber) 1114, thus enabling liquid refrigerant injected into the motor chamber 1114 to be supplied directly to the second radial bearing 147. Accordingly, the space between the second compressor portion 160 and the motor chamber (more precisely, the second chamber) 1114 is sealed by the second discharge sealing portion 166, thereby increasing compression efficiency in the second compressor portion 160, enabling the second radial bearing 147 to provide quick bearing force by the refrigerant introduced into the second chamber 1114b, and cooling the second radial bearing 147 and the rotational shaft 130.

Referring to FIGS. 4 and 5, the first compressor portion 150 according to this embodiment may include a first impeller 151, a first diffuser 1123, and a first volute 1124. However, description of the first diffuser 1123 and the first volute 1124, among the components of the first compressor portion 150, is identical to the previous description of the first impeller housing 112. That is, the first diffuser 1123 may be formed between the first impeller housing 112 and the first bearing shell 142, and the first volute 1124 may be formed on the first impeller housing 112. Thus, the first compressor portion 150 will be described hereinafter with respect to the first impeller 151.

The first impeller 151 may include a first hub 1511, a first blade 1512, and a first shroud 1513. As described previously, the first impeller 151, together with the first diffuser 1123 and the first volute 1124, form the first compressor portion 150 which is the first-stage compressor portion in a functional sense. Accordingly, the intake side of the first impeller 151 may be connected to the refrigerant intake pipe 115, and the discharge side of the first impeller 151 may be connected by the refrigerant connecting pipe 116 to the intake side of the second impeller 161 which constitutes a portion of the second-stage compressor portion (second compressor portion).

The first hub 1511 is a portion coupled to the rotational shaft 130 to receive torque, and the first impeller shaft 132 of the rotational shaft 130 may be inserted into and coupled to the center of the first hub 1511. The first hub 1511 may have a same diameter in the axial direction. The first hub 1511 may be formed in the shape of a truncated cone, an outer diameter of which increases toward the rear away from the front, as in this embodiment. Accordingly, refrigerant may be compressed as it moves smoothly from the front to the rear along an outer periphery of the first hub 1511.

A front sealing portion 1561 constituting a portion of the above-described first discharge sealing portion 156 may be formed on one side of the first hub 1511, that is, on a second side thereof facing the first bearing shell 142. The front sealing portion 1561 may form a labyrinth seal by interlocking with the rear sealing portion 1562 provided on the first side 142a of the first bearing shell 142. Thus, it is possible to keep refrigerant passing through the first diffuser 1123 from leaking to the first chamber 1114a constituting the motor chamber 1114.

The first blade 1512 may include a plurality of blades spaced at equal intervals along a circumference of the first hub 1511. The first blade 1512 including a plurality of blades may radially extend from the outer periphery of the first hub 1511 and be formed in a spiral shape along the axis. Accordingly, refrigerant axially drawn in through the first intake port 1121 of the first impeller housing 112 moves toward the first diffuser 1513 as it is wound in a spiral form while passing through the first blade 1512 of the first impeller 151. This further increases flow velocity of the refrigerant passing through the first diffuser 1513, thereby further increasing a first pressure at the first compressor portion 150.

The first shroud 1513 may cover an outer side of the first blade 1512. For example, the first shroud 1513 may be formed in the shape of a hollow cylinder, that is, in the shape of a truncated cone so as to correspond to an imaginary shape connecting to the outer side of the first blade 1512.

The first shroud 1513 may be formed to extend integrally from the outer side of the first blade 1512 by, for example, 3D printing or powder metallurgy, or may be manufactured separately and post-assembled. This embodiment is illustrated with an example in which the first shroud 1513 is post-assembled and welded. Although not shown, the first shroud 1513 may cover only a portion of the first blade 1512 or be formed on a current side rather than on the first blade 1512.

Referring to FIGS. 4 and 5, the first shroud 1513 may include a first entrance portion 1513a and a first exit portion 1513b. The first entrance portion 1513a may be formed in the shape of a cylinder which has a single diameter, and the first exit portion 1513b may be formed in the shape of a cone which has multiple diameters. A first end of the first exit portion 1513b may be connected to a second end of the first entrance portion 1513a and formed integrally with it. An inner periphery of the first entrance portion 1513a may be formed in the shape of a smooth tube, and the first inner sealing portion 1552 constituting the above-described first intake sealing portion 155 may be formed on an outer periphery of the first entrance portion 1513a.

More specifically, the first intake sealing portion 155 may be formed only of either the first outer sealing portion 1551 or the first inner sealing portion 1552 or a combination of the first outer sealing portion 1551 and the first inner sealing portion 1552. For example, the first outer sealing portion 1551 may include first outer annular projections 1551a and first outer annular grooves 1551b which make an inner periphery of the first impeller receiving portion 1122 corrugated, and the first inner sealing portion 1552 may include first inner annular grooves 1552b and first inner annular projections 1552a which make the outer periphery of the first impeller 151 corrugated. The first outer annular projections 1551a are rotatably inserted into the first inner annular grooves 1552b, and the first inner annular projections 1552a are rotatably inserted into the first outer annular grooves 1551b. Accordingly, the first outer sealing portion 1551 and the first inner sealing portion 1552 form a labyrinth seal. This creates a narrow and long sealing flow path in the first intake sealing portion 155, and effectively prevents refrigerant compressed in a first stage while passing through the first impeller 151 from flowing back and leaking through the space between the inner periphery of the first impeller receiving portion 1122 and the outer periphery of the first impeller 151. Consequently, intake loss in the first compressor portion may be reduced, thereby improving compressor performance. More particularly, compression efficiency in the first compressor portion may be improved by effectively reducing the intake loss at the first compressor portion.

However, it should be noted that, if the first outer sealing portion 1551 and the first inner sealing portion 1552 are corrugated to engage with each other, the first outer annular projections 1551a constituting the first outer sealing portion 1551 and the first outer annular projections 1552a constituting the first inner sealing portion 1552 may overlap each other. This may cause sides of the projections on one of the two sealing portions to be caught in sides of the projections (inner sides of the grooves) of the other sealing portion when the first impeller housing 112 is assembled to the motor housing 111 by being pushed in the axial direction, thus keeping the first impeller housing 112 from being assembled to the motor housing 111.

In view of this, in a case in which the first outer sealing portion 1551 and first inner sealing portion 1552 constituting the first intake sealing portion 155 engage each other to form a labyrinth seal, the first impeller housing 112 may be divided into two separate housing blocks (not shown) on left and right or lateral sides which are assembled together. For example, the two separate housing blocks (not shown) may be assembled to form the first impeller housing 112, and the first impeller housing 112 may be fastened with bolts to the flange portion 1111 of the motor housing 111.

This is also true of the second intake sealing portion 165 provided in a periphery of the second entrance portion (not shown). This will be replaced with the description of the first intake sealing portion.

Inner and outer peripheries of the first exit portion 1513*b* may be formed in the shape of a smooth tube. In some cases, however, annular projections such as on the above-described first inner sealing portion 1552 may be formed on the outer periphery of the first exit portion 1513*b*. In this case, annular projections such as on the above-described first outer sealing portion 1551 may be formed on the inner periphery of the first impeller receiving portion 1122 of the first impeller housing 112 facing the first exit portion 1513*b*. In this instance, the first inner sealing portion 1552 and the first outer sealing portion 1551 are slanted with respect to the axial direction, thereby forming an oblique labyrinth seal. Accordingly, it is possible to more effectively prevent refrigerant compressed in a first stage in the first impeller 151 from flowing back from the discharge side to the intake side and leaking through a gap between the first impeller 151 and the first impeller housing 112 by a pressure difference.

Referring to FIGS. 4 to 6, the second compressor portion 160 according to this embodiment may include a second impeller 161, a second diffuser 1133, and a second volute 1134. However, description of the second diffuser 1133 and the second volute 1134, among the components of the second compressor portion 160, is identical to the previous description of the second impeller housing 114. That is, the second diffuser 1133 may be formed between the second impeller housing 113 and the second bearing shell 146, and the second volute 1144 may be formed on the second impeller housing 114. Thus, the second compressor portion 160 will be described below with respect to the second impeller 161.

The second impeller 161 may include a second hub 1611, a second blade 1612, and a second shroud 1613. As described previously, the second impeller 161, together with the second diffuser 1133 and the second volute 1134, form the second compressor portion 160 which is the second-stage compressor portion in a functional sense. Accordingly, the intake side of the second impeller 161 may be connected to the discharge side of the first impeller 151 by the refrigerant connecting pipe 116, and the discharge side of the second impeller 161 may be connected to an entrance side of the condenser 20 by the refrigerant discharge pipe 117.

The second impeller 161 may be made smaller than a diameter of the first impeller 151, and its overall shape may be almost identical to that of the first impeller 151. Hence, description of the shape of the second impeller 161 will be replaced with the description of the first impeller 151.

For example, a second intake sealing portion 165 may be formed on the outer periphery of the second impeller 161 and the inner periphery of the second impeller receiving portion 1132 of the second impeller housing 113 facing that outer periphery. The second intake sealing portion 165 may include a second outer sealing portion 1651 provided on the inner periphery of the second impeller receiving portion 1132 and a second inner sealing portion 1652 provided on the outer periphery of the second impeller 161. However, it should be noted that no sealing portion may be formed on the second side of the second impeller 161, unlike the first impeller 151, as the second discharge sealing portion 166 is formed between the second bearing shell 146 and the rotational shaft 130.

Referring to FIGS. 2 to 6, the refrigerant passage portion 170 according to this embodiment may include an inlet passage portion (inlet passage) 171, an outlet passage portion (outlet passage) 172, and a connecting passage portion (connecting passage) 173. The inlet passage portion 171 is a passage that directs refrigerant from the refrigeration cycle apparatus to the motor chamber 1114 of the motor housing 111, the outlet passage portion 172 is a passage through which the refrigerant in the motor chamber 114 leaves the motor housing 111, and the connecting passage portion 173 is a passage that directs the refrigerant from the motor housing 111 to the second compressor portion 160 or the first compressor portion 150 depending on an operation mode.

The inlet passage portion 171 may include a first inlet passage portion 171 and a second inlet passage portion 1715. The first inlet passage portion 1711 is a passage that directs refrigerant to the first chamber 1114*a* of the motor housing 1114*a*, and the second inlet passage portion 1715 is a passage that directs refrigerant to the second chamber 1114*b* of the motor housing 111. Thus, the first inlet passage portion 1711 and the second inlet passage portion 1715 may include a parallel pipeline in which multiple exits branch off from a single entrance, or a serial pipeline having respective inlets and outlets. This embodiment will be described with respect to the parallel pipeline.

For example, an entrance end of the first inlet passage portion 1711 and an entrance end of the second inlet passage portion 1715 may be separated at the exit of the condenser 20 and connected in parallel, and an exit end of the first inlet passage portion 1711 may be connected to the first chamber 1114*a* of the motor housing 111, and an exit end of the second inlet passage portion 1715 may be connected to the second chamber 1114*b* of the motor housing 111. Accordingly, liquid refrigerant passed through the condenser 20 may be injected into the first chamber 1114*a* through the first inlet passage portion 1711 and into the second chamber 1114*b* through the second inlet passage portion 1715, respectively.

Referring to FIGS. 4 and 5, the first inlet passage portion 1711 may include a first refrigerant inlet pipe 1712, a first refrigerant inlet port 1713, and a refrigerant inlet passage 1714. One end of the first refrigerant inlet pipe 1712, together with a second refrigerant inlet pipe 1716 described hereinafter, may be branched midway through the refrigeration cycle apparatus, that is, at the exit of the condenser 20, and the other end may be inserted into and coupled to the first refrigerant inlet port 1713 which penetrates the space between the outer and inner peripheries of the motor housing 111 constituting the first chamber 1114*a* of the motor chamber 1114.

The first refrigerant inlet pipe 1712 may be smaller or larger than an inner diameter of a refrigerant circulation pipe constituting the refrigerant cycle apparatus, the refrigerant circulation pipe being positioned between the condenser 20 and the expander 30. Thus, it is possible to prevent refrigerant circulating through the refrigerant cycle apparatus from entering the motor housing 111 of the compressor 10 in excessive amounts.

One end of the first refrigerant inlet port 1713 may be connected to the first refrigerant inlet pipe 1712, and the other end of the first refrigerant inlet port 1713 may be connected to the refrigerant inlet passage 1714. Therefore, the first refrigerant inlet pipe 1712 and the first refrigerant inlet port 1713 may communicate with the first chamber 1114*a* of the motor housing 111.

For example, an entrance end of the refrigerant inlet passage 1714 may be open to the outer periphery of the first bearing shell 142, in a position at which it at least partially overlaps the first bearing shell 142 in the radial direction, and the other end of the refrigerant inlet passage 1714 may be open to the second side 142*b* of the first bearing shell 142 facing the thrust runner 1324. Accordingly, refrigerant introduced into the refrigerant inlet passage 1714 through the first refrigerant inlet pipe 1712 and the first refrigerant inlet port 1713 cools the first bearing shell 142 while passing through the inside of the first bearing shell 142. Thus, it is possible to prevent overheating of the first radial bearing 143 and first axial bearing 1441 provided on the first bearing shell 142.

The refrigerant inlet passage 1714 may be formed in the shape of a single hole an inner diameter between two ends of which is almost the same. This makes formation of the refrigerant inlet passage 1714 easy, and allows for quick injection of refrigerant into a desired position in the bearing receiving space 1114*a*2.

The exit end of the refrigerant inlet passage 1714 may be open to the second side 142*b* of the first bearing shell 142, and the refrigerant inlet passage 1714 may be formed in such a way that its exit end is positioned within the range of the radius of the thrust runner 1324. For example, the exit end of the refrigerant inlet passage 1714 may be formed in a position at which it at least partially overlaps the first gap G1 in the axial direction, which is formed between the inner periphery of the motor housing 111 and the outer periphery of the thrust runner 1324 radially facing that inner periphery, but does not overlap the first axial bearing 1441 in the axial direction. In other words, the exit end of the refrigerant passage 1714 may be positioned outside of the range of the radius of the first axial bearing 1441. Accordingly, refrigerant injected into the bearing receiving space 1114*a*2 is supplied to an outer periphery of the first axial bearing 1441, and this refrigerant passes through an inside of the first axial bearing 1441, from the outer periphery to an inner periphery, thereby enabling the first axial bearing 1441 to provide uniform bearing force.

Moreover, the first inlet passage portion 1711 may be larger than or the same size as the second inlet passage portion 1715. In other words, a cross-sectional area of the pipeline of the first inlet passage portion 1711 may be equal to a cross-sectional area of the pipeline of the second inlet passage portion 1715, or the cross-sectional area of the pipeline of the first inlet passage portion 1711 may be larger than the cross-sectional area of the pipeline of the second inlet passage portion 1715.

For example, an inner diameter of the first refrigerant inlet pipe 1712 constituting the first inlet passage 1711 or an inner diameter of the first refrigerant inlet port 1713 may be larger than an inner diameter of the second refrigerant inlet pipe 1716 constituting the second inlet passage portion 1715 described hereinafter or an inner diameter of a second refrigerant inlet port 1717. Consequently, a large amount of liquid refrigerant may be introduced toward the first chamber 1114*a*, more precisely, toward the bearing receiving space 1114*d*2, so that the different bearings 143, 1441, and 1442 received in the bearing receiving space 1114*d*2 operate more quickly and be cooled.

Referring to FIGS. 4 and 6, the second inlet passage portion 1715 may include the second refrigerant inlet pipe 1716 and the second refrigerant inlet port 1717. One end of the second refrigerant inlet pipe 1716, together with the first refrigerant inlet pipe 1712, may be branched midway through the refrigeration cycle apparatus, and the other end may be inserted into and coupled to the second refrigerant inlet port 1717 which penetrates the space between the outer and inner peripheries of the motor housing 111 constituting the second chamber 1114*b* of the motor chamber 1114.

The second refrigerant inlet pipe 1716 may be smaller or larger than the inner diameter of the refrigerant circulation pipe constituting the refrigerant cycle apparatus. Thus, it is possible to prevent refrigerant circulating through the refrigerant cycle apparatus from entering the motor housing 111 of the compressor 10 in excessive amounts.

The second refrigerant inlet port 1717 may be formed to lie on roughly the same axial line as the first refrigerant inlet port 1713. Accordingly, the first refrigerant inlet port 1713 and the second refrigerant inlet port 1717 may be positioned farthest from a refrigerant outlet port 1721 described hereinafter, so that refrigerant may stay for a long time in the first chamber 1114*a* and second chamber 1114*b* of the motor chamber 1114, thereby effectively cooling the bearings and the electrically-driven portion.

Although not shown, the inlet passage portion 171 may be made up of one inlet passage portion. In this case, the inlet passage portion 171, like the above-described first inlet passage portion 1711, may be formed to communicate with the first chamber 1114*a* of the motor chamber 1114, as the axial bearings 1441 and 1442 are provided in the first chamber 1114*a*.

Referring to FIGS. 4 and 6, the outlet passage portion 172 may include a refrigerant outlet port 1721 and a refrigerant outlet pipe 1722. The refrigerant outlet port 1721 may be formed by penetrating the space between the inner and outer peripheries of the motor housing 111 in the second chamber 1114*b* of the motor chamber 1114. The refrigerant outlet port 1721 may be formed in the circumferential direction, in a position spaced apart from the second refrigerant inlet port 1717, for example, in a position at which it has a phase difference of around 180° from the second refrigerant inlet port 1717. Accordingly, the refrigerant outlet port 1721 is positioned farthest from the second refrigerant inlet port 1717 in the circumferential direction, so that refrigerant introduced into the second chamber 1114*b* stays for a long time in the second chamber 1114*b*, thereby effectively cooling the electrically-driven portion and the second radial bearing 147.

One end of the refrigerant outlet pipe 1722 may be inserted into and coupled to the refrigerant outlet port 1721, and the other end of the refrigerant outlet pipe 1722 may be connected to the intake side of the first compressor portion 150 or the intake side of the second compressor portion 160 through a refrigerant control valve 1733 described hereinafter. Although not shown, the other end of the refrigerant outlet pipe 1722 may be connected to the refrigerant circulation pipe of the refrigeration cycle apparatus. For example, the other end of the refrigerant outlet pipe 1722 may be connected to a space (hereinafter, "first position") between an exit of the expander 30 and an entrance of the evaporator 40 or to a space (hereinafter, "second position") between an exit of the evaporator and an entrance (first intake port) of the compressor.

In these cases, however, it may be desirable that the refrigerant outlet pipe 1722 is connected to the second position rather than the first position, because a refrigerant passed through the motor chamber 1114 turns from liquid refrigerant to gaseous refrigerant.

Referring to FIG. 4, the connecting passage portion 173 according to this embodiment may include a first connecting pipe 1731, a second connecting pipe 1732, a refrigerant control valve 1733, and a valve control portion 1734. The first connecting pipe 1731 may be connected to the outlet passage portion 172 and the intake side of the second compressor portion 160, and the second connecting pipe 1732 may be connected between the outlet passage portion 172 and the intake side of the first compressor portion 150.

More specifically, the first connecting pipe 1731 may be connected between the refrigerant outlet pipe 1722 and the refrigerant connecting pipe 116, and the second connecting pipe 1732 may be connected midway between the refrigerant outlet pipe and the refrigerant intake pipe. Thus, refrigerant discharged through the refrigerant outlet pipe 1722 may move to the intake side of the second compressor portion 160 through the first connecting pipe 1731 or move to the intake side of the first compressor portion 150 through the second connecting pipe 1732. In other words, during a high-load operation, refrigerant supplied to the motor chamber 1114 through the inlet passage portion 171 may move to the second compressor portion 160 and be compressed in a second stage, and during a low-load operation, may move to the first compressor portion 150 and lower the cooling force of the first compressor portion 150.

The refrigerant control valve 1733 may be installed at a point at which the refrigerant outlet pipe 1722, the first connecting pipe 1731, and the second connecting pipe 1732 meet. For example, the refrigerant control valve 1733 may be configured as a 3-way valve, and the other end of the refrigerant outlet pipe may be connected to a first opening of the refrigerant control valve 1733, one end of the first connecting pipe 1731 may be connected to a second opening, and one end of the second connecting pipe 1732 may be connected to a third opening.

An opening and closing direction of the refrigerant control valve 1733 may be controlled by the valve control portion 1734 described hereinafter. For example, a high-load operation may be controlled such that the space between the refrigerant outlet pipe 1722 and the first connecting pipe 1731 is opened and the space between the refrigerant pipe 1722 and the second connecting pipe 1732 is closed, and a low-load operation may be controlled such that the space between the refrigerant outlet pipe 1722 and the second connecting pipe 1732 is opened and the space between the refrigerant pipe 1722 and the first connecting pipe 1731 is closed.

Although not shown, the refrigerant control valve 1733 may be installed midway through the refrigerant outlet pipe 1722, midway through the first connecting pipe 1731, and midway through the second connecting pipe 1732, separately. In this case, the refrigerant control valve 1733 may be configured as a 2-way valve, and a direction of refrigerant flow depending on load is the same as in the previous embodiment.

Referring to FIGS. 1 and 4, the valve control portion 1734 may select whether to discharge refrigerant injected into the motor housing 111 midway through the refrigerant cycle apparatus to the intake side of the second compressor portion 160 or to the intake side of the first compressor portion 150, and may include a measurement portion 1734a and a control portion 1734b. The measurement portion 1734a may include a pressure sensor, a temperature sensor, and a flow rate sensor so as to measure a state of refrigerant, for example, pressure P, temperature T, and heat quantity Q of the refrigerant.

The control portion 1734b may calculate a change ΔQ in flow of refrigerant supplied to a motor chamber 1114 of the motor housing 111 through the inlet passage portion 171, calculate a range of operation based on the change in flow to determine whether a required load is out of the range of operation, and control the refrigerant control valve 1733 so as to fix the refrigerant control valve 1733 if the required load is within the range of operation or to adjust the flow based on the required load if the required load is out of the range of operation.

The above-described turbo compressor according to this embodiment operates as follows.

That is, when power is applied to the electrically-driven portion 120, a torque is generated by an inductive current between the stator 121 and the permanent magnet 122 constituting the stator, and the rotational shaft 130 rotates together with the permanent magnet 122 by this torque. Then, the torque from the electrically-driven portion 120 is transferred to the first impeller 151 and the second impeller 161 by the rotational shaft 130, and the first impeller 151 and the second impeller 161 rotate simultaneously in their respective impeller receiving portions 1122 and 1232. Refrigerant passed through the evaporator 40 of the refrigerant cycle apparatus is introduced into the first impeller receiving portion 1122 through the refrigerant intake pipe 115 and the first inlet port 1121, and this refrigerant moves while whirling around the first blade 1512 of the first impeller 151, which increases the static pressure and at the same time causes the refrigerant to pass through the first diffuser 1123 with a centrifugal force.

Then, kinetic energy of the refrigerant passing through the first diffuser 1123 leads to an increase in pressure head by the centrifugal force in the diffuser 1123, and the centrifugally compressed, high-temperature, high-pressure refrigerant is collected in the first volute 1124 and discharged from the first compressor portion 150 through the first discharge port 1125. The refrigerant discharged from the first compressor portion 150 is directed to the second intake port 1131 of the second impeller housing 113 constituting the second compressor portion 160 through the refrigerant connecting pipe 116, and this refrigerant moves while whirling around the second blade 1612 of the second impeller 161, which increases the static pressure again and at the same time causes the refrigerant to pass through the second diffuser 113 with a centrifugal force.

The refrigerant passing through the second diffuser 1133 is compressed to a desired pressure by centrifugal force, and the second-stage compressed, high-temperature, high-pressure refrigerant repeats a sequence of processes in which it is collected in the second volute 1134 and discharged to the condenser 20 through the second discharge port 1135 and the refrigerant discharge pipe 117. In this instance, the first impeller 151 and the second impeller 161 are subjected to a thrust force, which the refrigerant drawn in through the first inlet port 1121 and the second inlet port 1131 of the impeller housings 112 and 113 exerts to push the impellers 151 and 161 backward. However, in the case of a so-called both-end type turbo compressor in which the first impeller 151 and the second impeller 161 are disposed against each other, a thrust generated from the first impeller 151 and a thrust generated from the second impeller 161 may cancel each other because they act in opposite directions.

Nonetheless, even in the case of such a both-end type turbo compressor, a thrust generated from the first compressor portion 150 and a thrust generated from the second compressor portion 160 may not be equal or constant. Due to this, the rotational shaft 130 may be axially pushed toward the first compressor portion 150 or the second compressor portion 160, and in ordinary circumstances, the axial bearings 1441 and 1442 may be installed on the first compressor portion 150 or/and the second compressor portion 160.

Moreover, the radial bearings 143 and 147 may be provided inside of the housing 110 and support the rotational shaft 130 radially with respect to the housing 110. The radial bearings 143 and 147 may be provided on opposite axial sides of the rotational shaft 130, that is, on the first compressor portion 150 and the second compressor portion 160.

High-temperature friction heat is generated between the above-described axial bearings 1441 and 1442 and radial bearings 143 and 147 and the rotational shaft 130 as the rotational shaft 130 rotates at high speed (approximately, 40,000 rpm). The electrically-driven portion 120 creates a high-speed torque, thereby generating high-temperature motor heat. Accordingly, the motor chamber 1114 of the motor housing 111 may be overheated due to friction heat and motor heat, which may lower the compressor performance. In view of this, a separate cooling fluid, other than the above-described refrigerant, may be supplied to the motor housing 111 to cool the heat generated from the motor chamber 1114, or as explained previously, a portion of the refrigerant passed through the condenser 20 may be supplied to the motor housing 111 to cool the heat generated from the motor chamber 1114.

In this embodiment, one end of the first refrigerant inlet pipe 1712 and one end of the second refrigerant inlet pipe 1716 may be connected in parallel to the exit of the condenser 20, and the other end of the first refrigerant inlet pipe 1712 and the other end of the second refrigerant inlet pipe 1716 may be connected respectively to the first refrigerant inlet port 1713 and second refrigerant inlet pipe 1716 penetrating the motor housing 111 and communicate respectively with the first chamber 1114*a* and second chamber 1114*b* constituting the motor chamber 1114. Accordingly, liquid refrigerant passed through the condenser 20 may be injected into the first chamber 1114*a* and the second chamber 1114*b*, and this refrigerant evaporates by exchanging heat with the bearings 143, 147, 1441, and 1442 provided in the first chamber 1114*a* and the second chamber 1114*b*, thereby cooling these bearings and the electrically-driven portion.

For example, a portion of liquid refrigerant introduced into the first chamber 1114*a*, more specifically, the bearing receiving space 1114*a*2, through the first refrigerant inlet pipe 1713 passes through the second gap G2 which is formed between the first side 1324*a* of the thrust runner 1324 and the second side 142*b* of the first bearing shell 142 facing it. In this instance, the refrigerant cools the first axial bearing 1441, the second side 142*b* of the first bearing shell 142 facing the first axial bearing 1441, and the first side 1324*a* of the thrust runner 1324, while moving from the outer periphery of the first axial bearing 1441 to the inner periphery thereof.

Moreover, a portion of liquid refrigerant introduced into the first chamber 1114*a*, more specifically, the bearing receiving space 1114*a*2, through the first refrigerant inlet pipe 1713 passes through the second gap G2 which is formed between the second side 1324*b* of the thrust runner 1324 and the first side 1115*a* of the bearing support portion 1115 facing it. In this instance, the refrigerant cools the second axial bearing 1442, the first side 1115*a* of the bearing support portion 1115 facing the second axial bearing 1442, and the second side 1324*b* of the thrust runner 1324, while moving from an outer periphery of the second axial bearing 1442 to an inner periphery thereof.

In addition, a portion of the refrigerant introduced into the second gap G2 is introduced into the fourth gap G4 provided between the first axial hole 142*c* of the first bearing shell 142 and the rotational shaft, and serves as a working fluid for the first radial bearing 143 provided in the fourth gap G4 and at the same time cools the first radial bearing 143 and the rotational shaft 130. Also, another portion of the liquid refrigerant which is introduced into the bearing receiving space 1114*a*2 moves toward the second axial bearing 1442 through the first gap G1 formed between the inner periphery of the motor housing 111 and the outer periphery of the thrust runner 1324, and this refrigerant moves from the outer periphery of the second axial bearing 1442 to the inner periphery thereof and the second axial bearing 1442, the second side 1324*b* of the thrust runner 1324 facing the second axial bearing 1442, and the first side 1115*a* of the bearing support portion 1115.

This refrigerant moves to the motor receiving space 1114*a*1 of the first chamber 1114*a* through the first through hole 1115*c* and refrigerant through hole 1115*d* provided in the bearing support portion 1115, and this refrigerant axially passes through a gap (not shown) in the electrically-driven portion 120 and moves to the second chamber 1114*b*. In this instance, the electrically-driven portion 120 makes contact with the refrigerant passing through the gap in the electrically-driven portion 120 and the refrigerant introduced into the second chamber 1114*b*.

A portion of the refrigerant that has moved to the second chamber 1114*b*, together with a portion of the refrigerant supplied to the second chamber 1114*b* through the second refrigerant inlet pipe 1716 and the second refrigerant inlet port 1717, is introduced into the second axial hole 146*c* of the second bearing shell 146, and this refrigerant serves as a working fluid for the second radial bearing 147 and at the same time cools the second radial bearing 147 and the rotational shaft 130. The refrigerant introduced into the second chamber 1114*b* circulates through the second chamber 1114*b* and then leaves the motor housing 111 through the refrigerant outlet port 1721 and the refrigerant outlet pipe 1722, and this refrigerant may be supplied to the intake side of the second compressor portion 160 or the intake side of the first compressor portion 150 through a pipeline to which the refrigerant outlet pipe 1722 is connected via the refrigerant control valve 1733. In this instance, the valve control portion 1734 may improve compression efficiency by performing a load-dependent operation in which the opening and closing direction of the refrigerant control valve 1733 is controlled in real time.

Figure 7A:
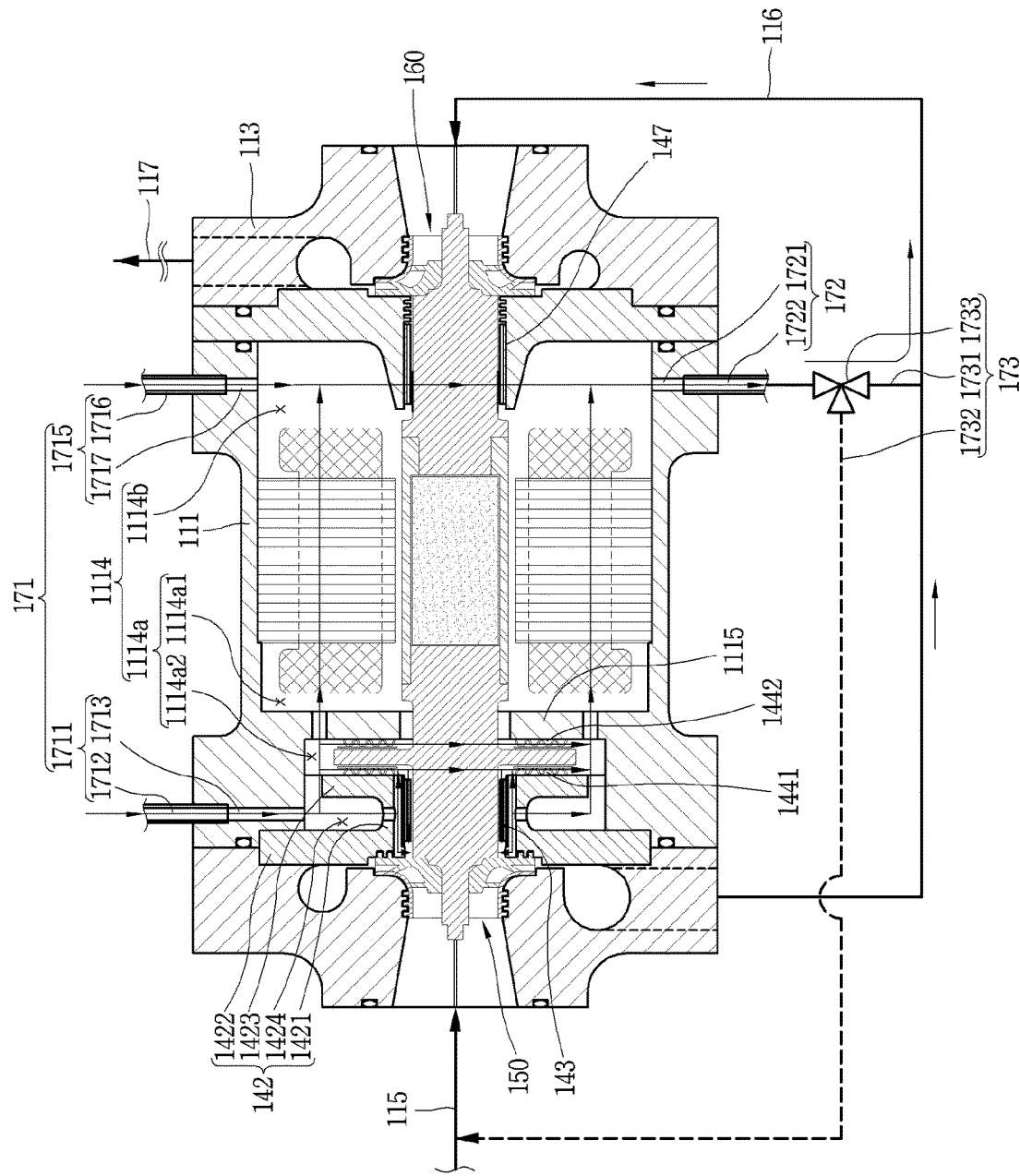
FIGS. 7A and 7B are schematic views depicting a refrigerant flow for each operation mode in a turbo compressor according to an embodiment.
Figure 7B:
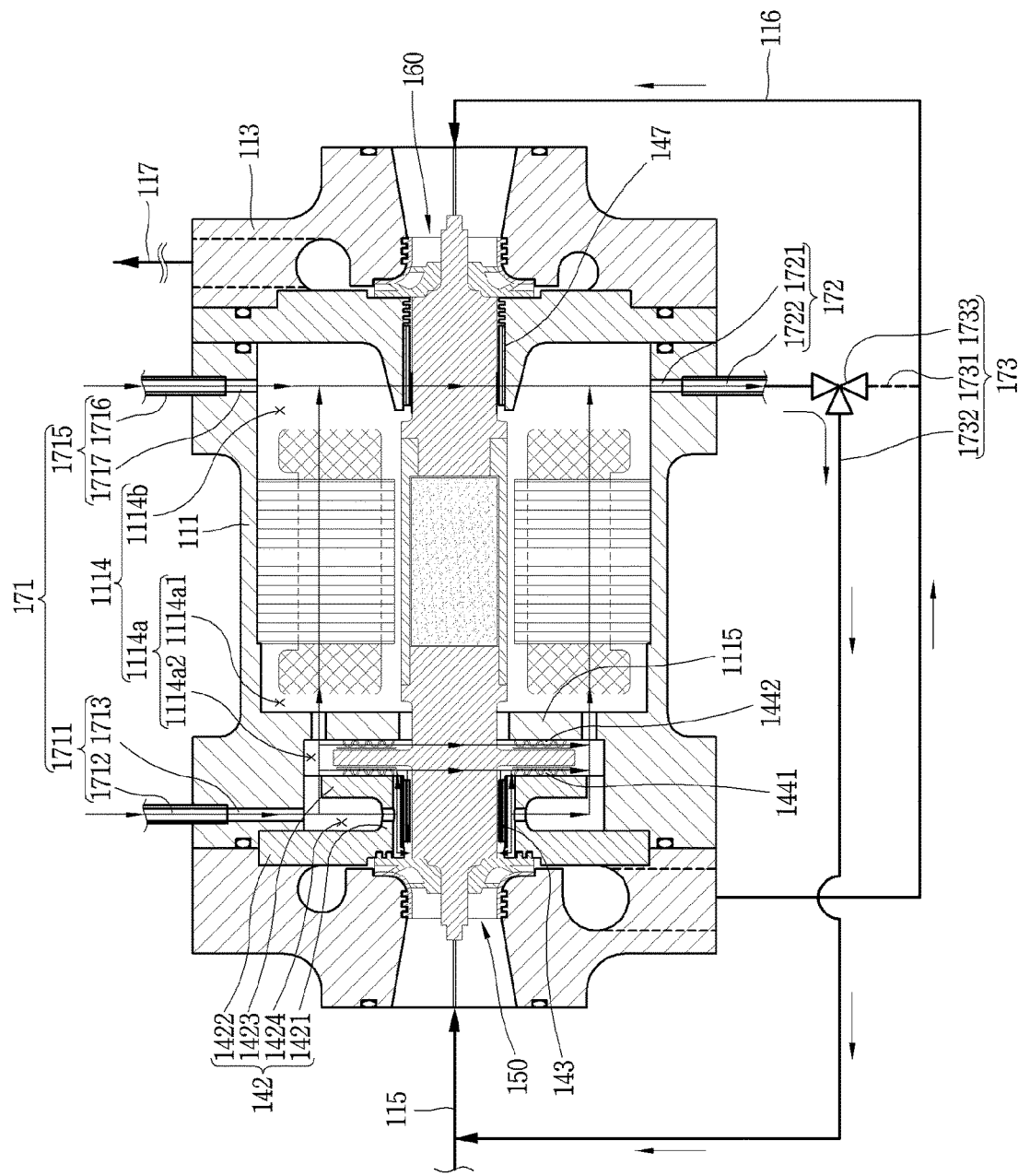
Figure 8:
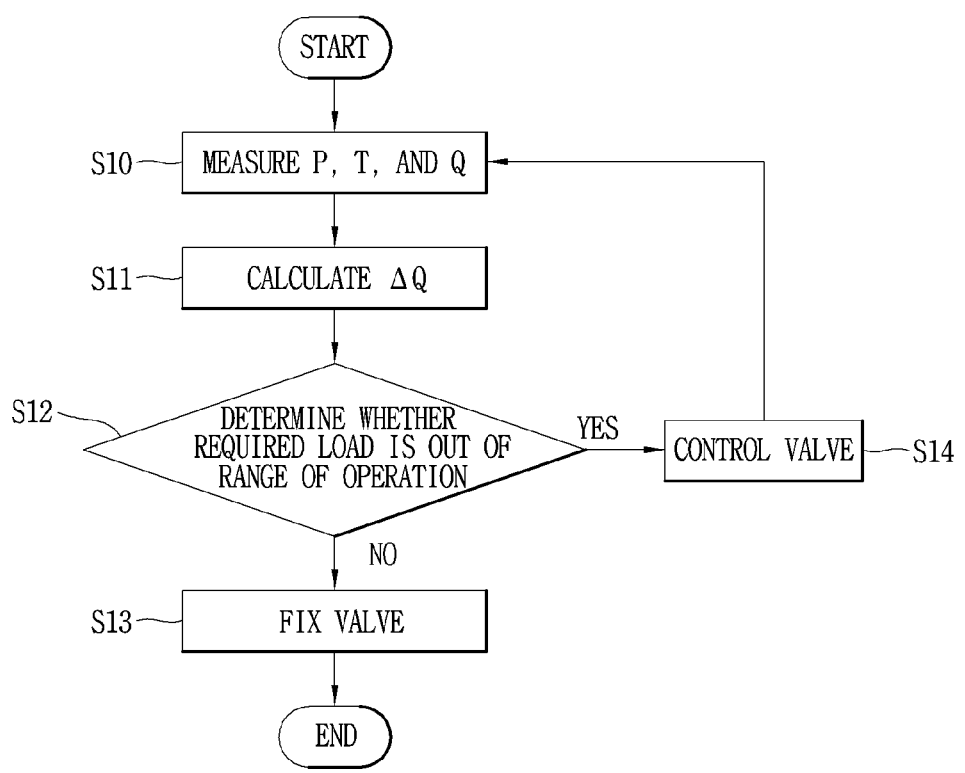
FIG. 8 is a flowchart illustrating a process of controlling a direction of flow of refrigerant in a turbo compressor according to an embodiment.

FIGS. 7A and 7B are schematic views depicting refrigerant flow for each operation mode in a turbo compressor according to an embodiment. FIG. 8 is a flowchart illustrating a process of controlling a direction of flow of refrigerant in a turbo compressor according to an embodiment.

Referring to FIGS. 1 and 8, the measurement portion 1734*a* measures the pressure P, temperature T, and heat quantity Q of the refrigerant. The control portion 1734*b* may calculate a change ΔQ in flow which has occurred when refrigerant is additionally supplied to the first compressor portion 150 or the second compressor portion 160, based on values measured by the measurement portion 1734*a* (S11), calculate the range of operation based on the change in flow to determine whether a required load is out of the range of operation (S12), and fix the opening and closing direction of the refrigerant control valve 1733 if the required load is within the range of operation (S13), or adjust the opening and closing direction of the refrigerant control valve 1733 to control the flow based on the required load if the required load is out of the range of operation (S14).

For example, during a high-load operation, the refrigerant control valve 1733 may be opened to the first connecting pipe 1731 to supply a refrigerant passed through the motor housing 111 to the second compressor portion 160, as shown in FIG. 7A. The refrigerant passed through the motor housing 111 has a lower refrigerant temperature than the refrigerant compressed in the first stage in the first compressor portion 150. Then, the temperature of the refrigerant introduced into the second compressor portion 160 is lowered, thereby increasing the amount of refrigerant intake, and at the same time, energy required to run the second compressor portion 160 may be reduced, thereby improving compression efficiency.

However, the flow of refrigerant supplied to the second compressor portion 160 may be properly adjusted depending on the situation. For example, a minimum flow for running the compressor may be supplied in a surging state, and a possible maximum flow may be supplied in a choking state. For this, the opening or closing direction of the refrigerant control valve 1733 or/and the opening degree thereof may be controlled by a control method for the above-described valve control portion 1734.

On the other hand, during a low-load operation, the refrigerant control valve 1733 may be opened to the second connecting pipe 1732 to supply a refrigerant passed through the motor housing 111 to the first compressor portion 150, as shown in FIG. 7B. The refrigerant passed through the motor housing 111 has a higher refrigerant temperature than the intake refrigerant drawn into the first compressor portion 150. Then, the temperature of the intake refrigerant is raised, which causes an intake loss and leads to a moderate decrease in the cooling force of the compressor. In this case, too, the opening or closing direction of the refrigerant control valve 1733 or/and the opening degree thereof may be controlled by a control method for the above-described valve control portion 1734.

In a turbo compressor that rotates at a high speed of 40,000 rpm or above, as in this embodiment, if the rotational shaft is formed as an assembly type, assembly reliability of the rotational shaft may be lowered. Then, slip may occur between members or components constituting the rotational shaft, which may keep the rotational shaft from transferring enough torque to the impellers, thereby lowering motor efficiency or compression efficiency of the impellers. Also, alignment between the permanent magnet inserted into the rotational shaft and the rotational shaft becomes unstable, as well as alignment between the members or components constituting the rotational shaft, which may increase friction loss between the rotational shaft and the bearings supporting the rotational shaft or lowering motor efficiency. In a case in which the members or components constituting the rotational shaft are made of different materials, the materials have different thermal expansion coefficients, which may further decrease assembly reliability of the assembly-type rotational shaft. This also may decrease reliability of an apparatus employing the turbo compressor and cause secondary damage caused by malfunction of the apparatus.

In view of this, a conventional technique is known which increases a coupling force between the members or components of the rotational shaft by coupling them with fixing pins. However, this requires processing and assembly of separate fixing pins, and this may increase manufacturing costs.

In this regard, in this embodiment, the rotational shaft may be securely held in an assembled state without adding separate parts, such as fixing pins, thus increasing reliability of the assembly-type rotational shaft, and at the same time, the assembly process of the rotational shaft may be simplified, decreasing manufacturing costs.

Figure 9:
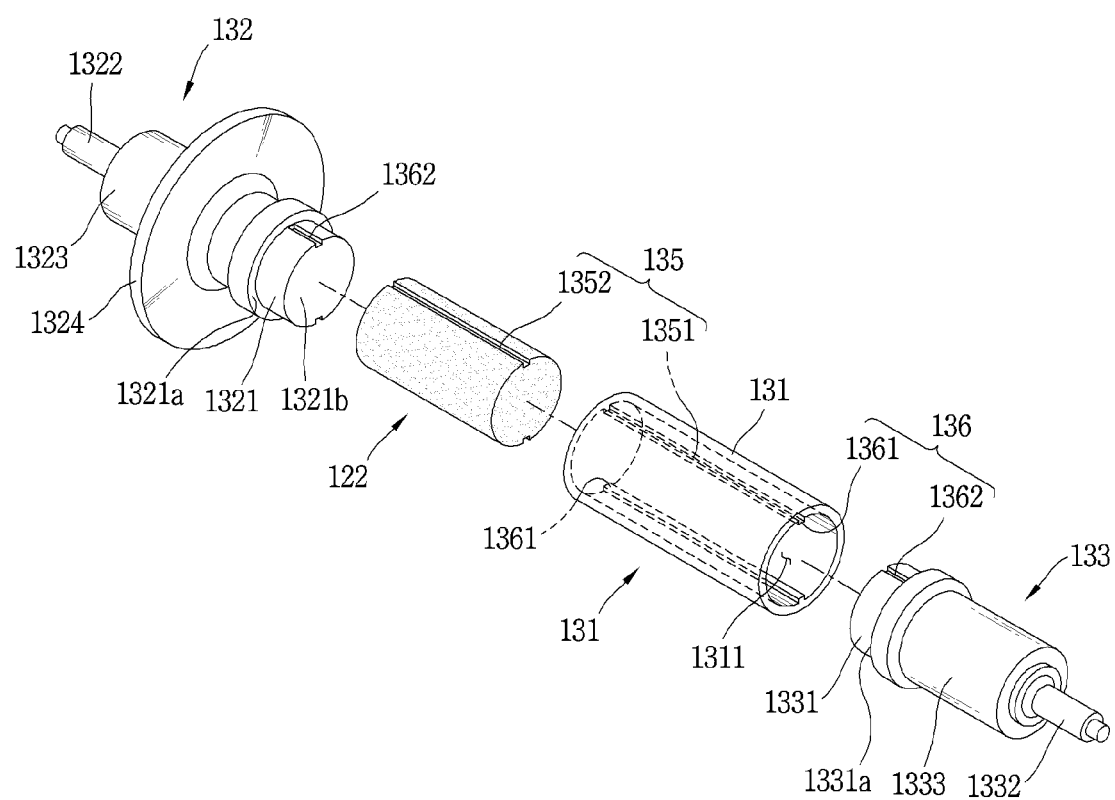
FIG. 9 is an exploded perspective view of an example of a rotational shaft of FIG. 2.
Figure 10:
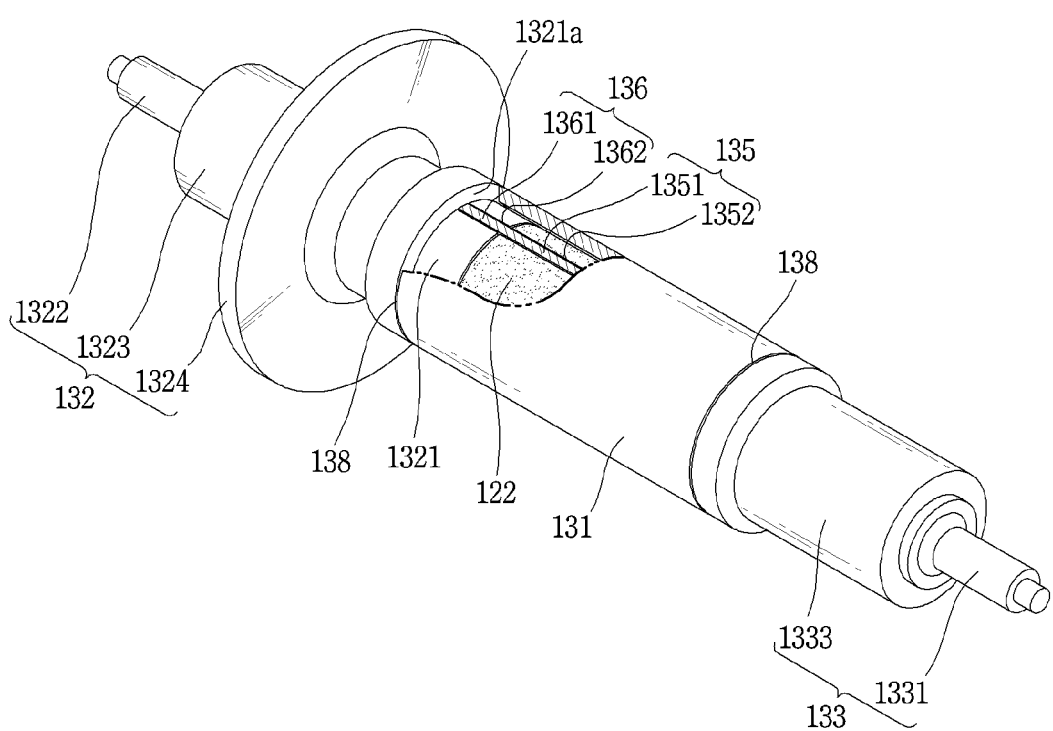
FIG. 10 is an assembled cutaway perspective view showing the rotational shaft of FIG. 9.
Figure 11:
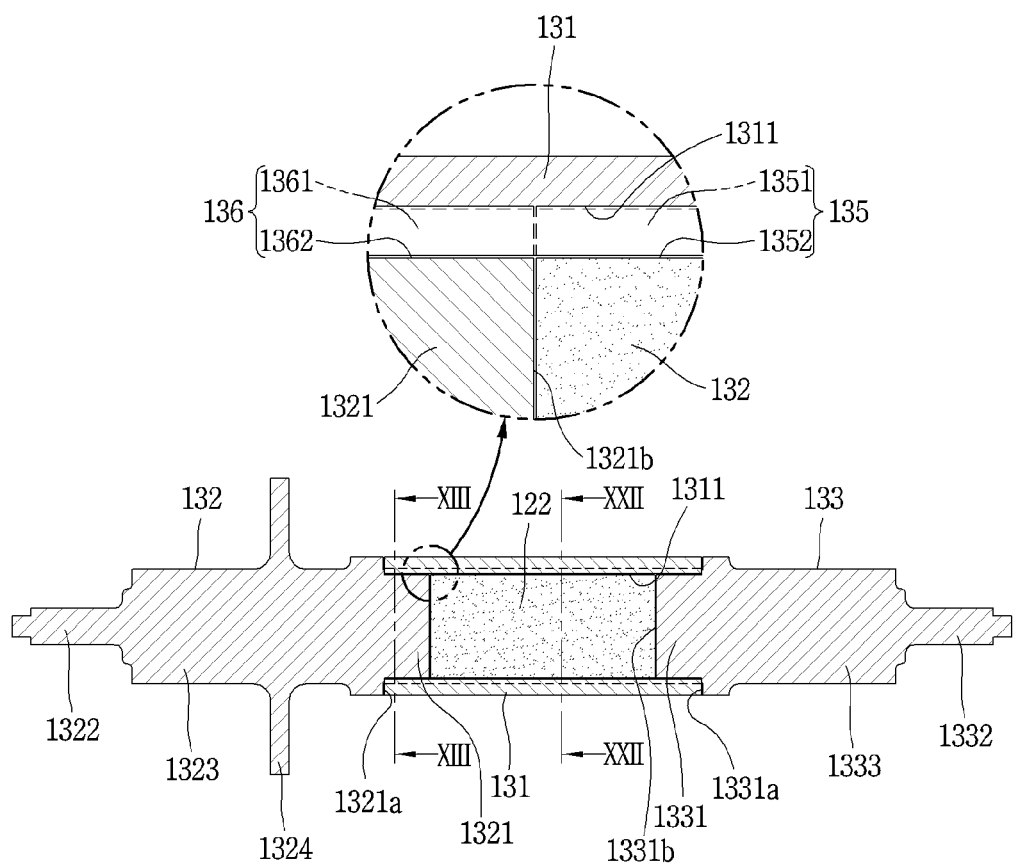
FIG. 11 is a cross-sectional view showing an inside of the rotational shaft of FIG. 10.
Figure 12:
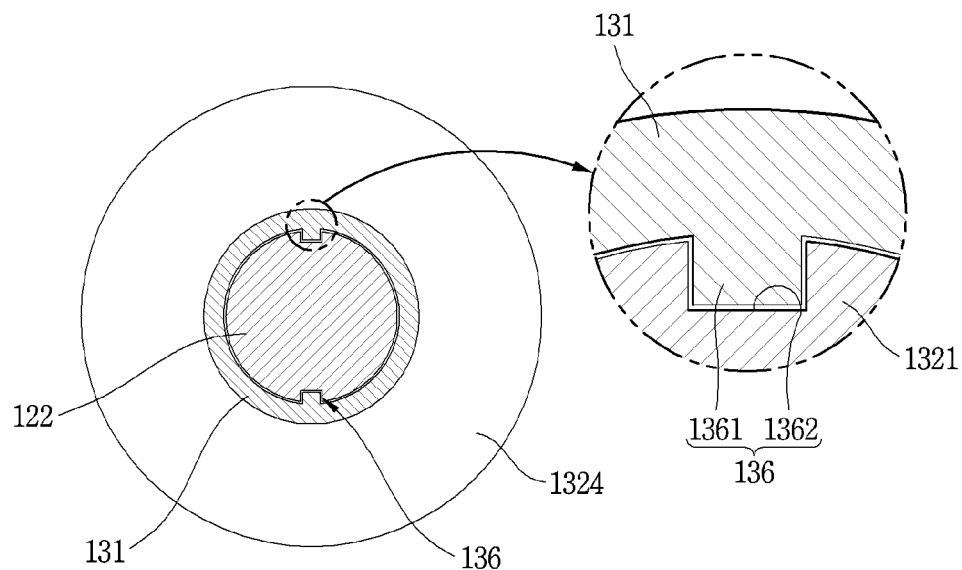
FIG. 12 is a cross-sectional view of FIG. 11, taken along line "XII-XII"
Figure 13:
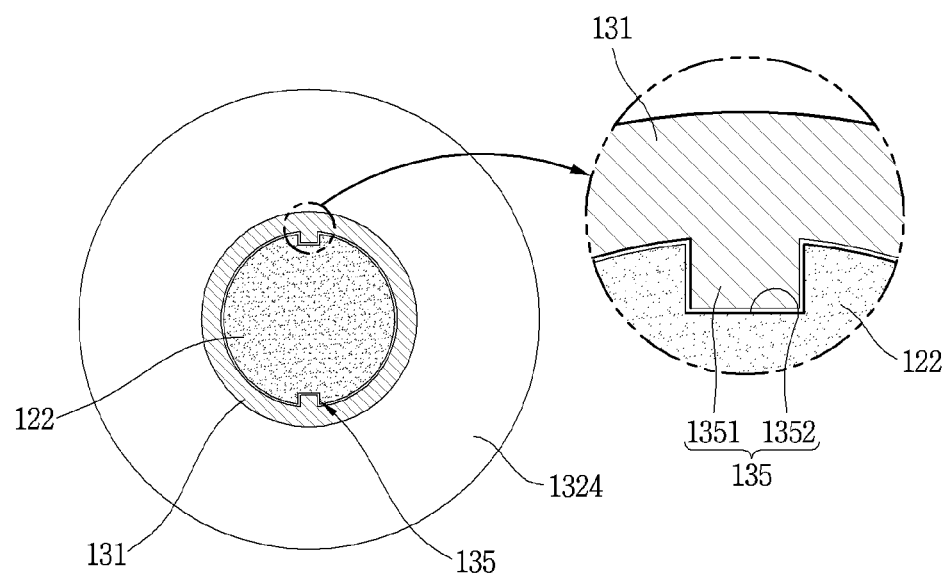
FIG. 13 is a cross-sectional view of FIG. 11, taken along line "XIII-XIII"

FIG. 9 is an exploded perspective view of a rotational shaft of FIG. 2 according to an embodiment. FIG. 10 is an assembled cutaway perspective view showing the rotational shaft of FIG. 9. FIG. 11 is a cross-sectional view showing an inside of the rotational shaft of FIG. 10. FIG. 12 is a cross-sectional view of FIG. 11, taken along e line "XII-XII". FIG. 13 is a cross-sectional view of FIG. 11, taken along line "XIII-XIII".

Referring to FIGS. 9 to 13, the rotational shaft 130 according to this embodiment may include connecting sleeve 131, first impeller shaft 132, and second impeller shaft 133, as explained previously. A circular bar-shaped permanent magnet 122 constituting the rotor may be inserted into and fixed to an inside of the connecting sleeve 131, and the first impeller shaft 132 may be inserted into and coupled to a first end of the connecting sleeve 131, and the second impeller shaft 133 may be inserted into and coupled to a second end of the connecting sleeve 131.

The connecting sleeve 131 may be made of the same material as the first impeller shaft 132 or/and the second impeller shaft 133. In this case, even if the compressor rotates at high speed during operation, members or components have almost the same thermal expansion coefficient (or centrifugal expansion coefficient). Thus, the first impeller shaft 132 or/and the second impeller shaft 133 are not highly likely to be separated from the connecting sleeve 131. Accordingly, there is a wider allowable margin of error in the first locking portion 135 and second locking portion 136 described hereinafter, thereby facilitating the assembly process of the rotational shaft 130 and improving assembly reliability.

On the other hand, the connecting sleeve 131 may be made of a different material from the first impeller shaft 132 or/and the second impeller shaft 133. In this case, there may be fewer limitations in selecting the material of the rotational shaft 130, and in some cases, its material cost may be reduced or there may be some advantages when it is made lightweight.

More specifically, the connecting sleeve 131 may be formed in the shape of a hollow cylinder, and the connecting sleeve 131 may have a single inner diameter in the axial direction. Accordingly, the inner periphery of the connecting sleeve 131 may have a single inner diameter.

However, the connecting sleeve 131 may have two or more inner diameters in the axial direction. For example, an inner diameter of the connecting sleeve 131 at one end where the permanent magnet 122 is inserted may be larger than or almost equal to the outer diameter of the permanent magnet 122, and the inner diameter of the connecting sleeve 131 at the other end where the permanent magnet 122 is axially supported may be smaller than the outer diameter of the permanent magnet 122. Accordingly, a stepped, magnet supporting surface 1311a described hereinafter may be formed on the inner periphery of the connecting sleeve 131, so that one end of the permanent magnet 122 may be axially supported. However, this embodiment will be described with an example in which the inner periphery of the connecting sleeve 131 has a single diameter.

The inner diameter of the connecting sleeve 131 may be larger than or equal to the outer diameter of the permanent magnet 122 having the shape of a circular bar. For example, the inner diameter of the connecting sleeve 131 may be slightly larger than the outer diameter of the permanent magnet 122. Accordingly, the inner periphery of the connecting sleeve 131 and the outer periphery of the permanent magnet 122 are not securely attached to each other but spaced a minute distance apart from each other, thereby simplifying the assembly process of the permanent magnet 122.

However, a first locking projection 1351 may be formed on the inner periphery of the connecting sleeve 131, and a first locking groove 1352 may be formed on the outer periphery of the permanent magnet 122 facing the first locking projection 1351. The first locking projection 1351 may radially protrude to a preset or predetermined height toward the permanent magnet 122 from the inner periphery of the connecting sleeve 131, and the first locking groove 1352 may be radially recessed to a preset or predetermined depth from the outer periphery of the permanent magnet 122.

For example, the first locking projection 1351 may extend longitudinally along the axis from the center of the inner periphery of the connecting sleeve 131, approximately as long as the axial length of the permanent magnet 122. However, the first locking projection 1351 is not necessarily equal to the axial length of the permanent magnet 122. In other words, the first locking projection 1351 may be shorter than the axial length of the permanent magnet 122.

Moreover, the first locking projection 1351 may be formed as a single unit along the axis, but in some cases, may be formed in a plurality of parts or components. Thus, the weight of the connecting sleeve 131 may be reduced.

In addition, the first locking projection 1351 may be the same shape along the axis, but in some cases, may be formed into a plurality of different shapes. Thus, axial movement of the permanent magnet 122 may be restricted.

Further, the first locking projection 1351 may extend on the same axis line as second locking projections 1361 on opposite sides described hereinafter. In this case, the first locking projection 1351 may be formed as a single unit that connects between the two second constraining projections 1361, or may be formed in such a way as to extend from one of the second locking projections 1361 and be spaced apart from the other second locking projection 1361, or in such a way as to be spaced apart from both of the second locking projections 1361. This embodiment will be described with an example in which the first locking projection 1351 extends and connects between the two second locking projections 1361.

The first locking projection 1351 according to this embodiment may be formed as a single unit with a single shape along the axis, in such a way as to connect to the second locking projection 1361 described hereinafter on the same axis line. Accordingly, the second locking projection 1361 described hereinafter, as well as the first locking projection 1351, may be easily formed.

Only one first locking projection 1351 may be formed on either end, or in some cases, a plurality of first locking projections 1351 may be formed at preset or predetermined intervals along the circumference. This embodiment will be described with an example in which two first locking projections 1351 are provided. In this case, the first locking projections 1351 may be formed at an interval of approximately 180° along the circumference. Accordingly, both of the first locking projections 1351 receive the same torque and transfer it to the first locking groove 1352 described hereinafter, thereby improving reliability of the first locking projections 1351.

Although not shown in the drawings, three or more first locking projections 1351 may be formed. In a case in which three or more first locking projections 1351 are formed, the first locking projections 1351 may be formed at equal intervals along the circumference.

The first locking projection 1351 may be formed in such a shape in which it has a preset or predetermined height from the inner periphery of the connecting sleeve 131, for example, in such a shape in which it extends in the shape of a rectangular cross-section when axially projected. This widens a contact area between a circumferential side of the first locking projection 1351 and a circumferential side of the first locking groove 1352 facing it described hereinafter, thus facilitating transfer of torque from the permanent magnet 122 to the connecting sleeve 131.

The first locking groove 1352 is formed on the outer periphery of the permanent magnet 122. The first locking groove 1352, together with the above-described first locking projection 1351, constitutes the first locking portion 135.

The first locking groove 1352 may extend axially from the outer periphery of the permanent magnet 122, in such a way as to correspond to the first locking projection 1351. For example, two first locking grooves 1352 may be formed along the circumference, equally spaced apart from each other. Thus, the first locking projections 1351 may be equally spaced apart from each other along the circumference, and the first locking grooves 1352 also may be equally spaced apart from each other along the circumference, and therefore the first locking projections 1351 may be inserted into the first locking grooves 1352, respectively.

The first locking groove 1352 may be formed to extend between opposite ends of the permanent magnet 122 on the same axis line as the first locking projection 1351. Accordingly, when the permanent magnet 122 is inserted into the connecting sleeve 131, the first locking projection 1351 of the connecting sleeve 131 may smoothly slide into the first locking groove 1352 of the permanent magnet 122. However, if the first locking projection 1351 is not formed on the connecting sleeve 131 or is formed only on one end thereof, the first locking groove 1352 may be formed across one end of the permanent magnet 122 but blocked on the other end.

For example, the first locking groove 1352 may be formed in such a shape in which it has a preset or predetermined depth radially from the outer periphery of the permanent magnet 122 and a preset or predetermined width along the circumference, that is, in such a shape in which it extends in the shape of a rectangular cross-section when axially projected. The radial depth of the first locking groove 1352 may be greater than or equal to the radial height of the first locking projection 1351, namely, they may be almost the same. A circumferential width of the first locking groove 1352 may be greater than or equal to a circumferential width of the first locking projection 1351, namely, they may be almost the same. Accordingly, the first locking projection 1351 may be tightly attached in the circumferential direction while inserted in the first locking groove 1352, so that the first locking projection 1351 seldom slips off the first locking groove 1352. This allows for maintaining concentric alignment between the permanent magnet 122 and the connecting sleeve 131.

The second locking projection 1361 may be formed on an inner periphery of opposite ends of the connecting sleeve 131. As explained previously, the second locking projection 1361 may extend from the first locking projection 1351, or may be spaced apart from the first locking projection 1351. This embodiment will be described with an example in which the second locking projection 1361 extends from the first locking projection 1351.

The second locking projection 1361 may have the same shape as the first locking projection 1351. For example, an axial cross-sectional area and/or radial height of the second locking projection 1361 may correspond to an axial cross-sectional area and/or radial height of the first locking projection 1351.

However, the axial cross-sectional area and/or radial height of the second locking projection 1361 does not necessarily correspond to the axial cross-sectional area and/or radial height of the first locking projection 1351. For example, the axial cross-sectional area and/or radial height of the second locking projection 1361 may be larger or smaller than the axial cross-sectional area and/or radial height of the first locking projection 1351. Nonetheless, if the second locking projection 1361 is formed on the same axis line as the first locking projection 1351, the axial cross-sectional area and/or radial height of the second locking projection 1361 may be smaller than or at least equal to the axial cross-sectional area and/or radial height of the first locking projection 1351.

In a case in which the second locking projection 1361 is formed on the same axis line as the first locking projection 1351, and the axial cross-sectional area and/or radial height of the second locking projection 1361 is larger than the axial cross-sectional area and/or radial height of the first locking projection 1351, the axial cross-sectional area of the first locking groove 1352 becomes larger than the cross-sectional area of the first locking projection 1351 while in an inserted state. This widens the gap between the first locking projection 1351 and the first locking groove 1352, making it impossible to stably support the permanent magnet 122. Accordingly, if the second locking projection 1361 is formed on the same axis line as the first locking projection 1351, it may be made smaller or equal in size than the first locking projection 1351.

Moreover, the number of second locking projections 1361 and the number of first locking projections 1351 may be equal, but necessarily so. For example, in a case in which the connecting sleeve 131 and both of the impeller shafts 132 and 133 are coupled together by welding, apart from using the second locking projections 1361 and second locking grooves 1362, the connecting sleeve 131 and both of the impeller shafts 132 and 133 may be securely coupled to each other even if the number of second locking projections 1361 is smaller than the number of first locking projections 1351.

Referring to FIGS. 9 and 10, the second locking groove 1362 may be formed on the outer periphery of the first impeller shaft 132, more precisely, on an outer periphery of the first shaft fixing portion 1321. The second locking groove 1362, along with the above-described second locking projection 1361, constitute the second locking portion 136.

The second locking groove 1362 may be formed to correspond to the above-described second locking groove 1362. Two second locking grooves 1362 may be formed along the circumference, equally spaced apart from each other. Thus, the second locking projections 1361 may be equally spaced apart from each other along the circumference, and the second locking grooves 1362 also may be equally spaced apart from each other along the circumference, and therefore the second locking projections 1361 may be inserted into the second locking grooves 1362, respectively.

Moreover, the second locking groove 1362 may be formed in such a shape in which it has a preset or predetermined depth radially from an outer periphery of the second shaft fixing portion 1331 and a preset or predetermined width along the circumference, that is, in such a shape in which it extends in the shape of a rectangular cross-section when axially projected. For example, the radial depth of the second locking groove 1352 may be greater than or equal to the radial height of the second locking projection 1361, namely, they may be almost the same. The circumferential width of the second locking groove 1362 may be greater than or equal to the circumferential width of the second locking projection 1361, namely, they may be almost the same. Accordingly, the second locking projection 1361 may be tightly attached in the circumferential direction while inserted in the second locking groove 1362, so that the second locking projection 1361 seldom slips off the second locking groove 1362. This allows for maintaining concentric alignment between the connecting sleeve 131 and the first impeller shaft 132.

In addition, the second locking groove 1362 may extend axially the same length as the second locking projection 1361. For example, the second locking groove 1362 may be formed across the entire axial length of the first axial fixing portion 1321. Accordingly, one end of the second locking groove 1362 may extend as far as an end face of the first shaft fixing portion 1321 constituting an end face of the first impeller shaft 132, so that the second locking projection 1361 is axially and slidably inserted into the second locking groove 1362 when the first shaft fixing portion 1321 of the first impeller shaft 132 is inserted into the first end of the connecting sleeve 131. Due to this, even if the outer diameter of the first impeller shaft 132, that is, the outer diameter of the first shaft fixing portion 1321, and the inner diameter of the connecting sleeve 131 are almost equal, the first impeller shaft 132 may be easily coupled to the connecting sleeve 131.

Referring to FIGS. 9 and 10, the second locking groove 1362 may be formed to extend from the outer periphery of the second impeller shaft 133 according to this embodiment, more precisely, the outer periphery of the second shaft fixing portion 1331. The second locking groove 1362 extending from the outer periphery of the second shaft fixing portion 1331 may be formed in the same manner as the second locking groove 1362 extending from the outer periphery of the above-described first shaft fixing portion 1321. Accordingly, description of the second locking groove 1362 of the second shaft fixing portion 1331 will be replaced with the description of the second locking groove 1362 of the above-described first shaft fixing portion 1321.

In the drawings, unexplained reference numeral 138 denotes a welded surface.

As seen from above, in this embodiment, the permanent magnet 122 is inserted into the center of the inner periphery of the connecting sleeve 131, and the first impeller shaft 132 and the second impeller shaft 133 are respectively inserted into and coupled to opposite ends of the connecting sleeve 131. The connecting sleeve 131 and both of the impeller shafts 132 and 133 each are coupled together by welding, whereas the permanent magnet 122 is inserted into the connecting sleeve 131, with opposite ends of the permanent magnet 122 being tightly attached to the first impeller shaft 132 and the second impeller shaft 133 and supported in the axial direction.

In this instance, the first locking portion 135 is provided between the connecting sleeve 131 and the permanent magnet 122, and the second locking portion 136 is provided between the connecting sleeve 131 and both of the impeller shafts 132 and 133. Thus, the connecting sleeve 131 and both of the impeller shafts 132 and 133, as well as the connecting sleeve 131 and the permanent magnet 122, are mechanically held together, thereby preventing slip between these members or components. This allows for maintaining concentric alignment between the permanent magnet 122 and the connecting sleeve 131 and between the connecting sleeve 131 and the first impeller shaft 132.

In other words, the first locking projection 1351 is formed at the center of the inner periphery of the connecting sleeve 131, and the first locking groove 1352 is formed on the outer periphery of the permanent magnet 122 facing the first locking projection 1351, and the first locking projection 1351 is inserted into the first locking groove 1352 to restrict circumferential movement between the connecting sleeve 131 and the permanent magnet 122. Thus, the connecting sleeve 131 and the permanent magnet 122 constituting the rotor may be firmly attached together without a separate fixing member.

Moreover, the second locking projection 1361 is formed on opposite ends of the inner periphery of the connecting sleeve 131, and the second locking groove 1362 is formed on the outer periphery of both of the impeller shafts 132 and 132 facing the second locking projection 1361, and the second locking projection 1361 is inserted into the second locking groove 1362 to restrict circumferential movement between the connecting sleeve 131 and both of the impeller shafts 132 and 133. Thus, the connecting sleeve 131 and both of the impeller shafts 132 and 133 may be firmly attached together without a separate fixing member. Consequently, even if there is separation between the connecting sleeve 131 and the permanent magnet 122 and between the connecting sleeve 131 and both of the impeller shafts 132 and 133 during high-speed operation of the compressor, due to thermal expansion as well as centrifugal expansion, torque is smoothly transmitted without slip between the connecting sleeve 131 and the permanent magnet 122 and between the connecting sleeve 131 and both of the impeller shafts 132 and 133, thereby improving compressor performance.

As such, the turbo compressor according to this embodiment may have an assembly-type rotational shaft 130 with permanent magnet 122 embedded in it and improve coupling force between the connecting sleeve 131 of the rotational shaft 130 and the first impeller shaft 132 and second impeller shaft 133, as well as between the connecting sleeve 131 and the permanent magnet 122, thereby preventing slip between these parts or components. Moreover, the turbo compressor according to this embodiment may improve coupling force between the connecting sleeve 131 and the first impeller shaft 132 and second impeller shaft 133, as well as between the connecting sleeve 131 and the permanent magnet 122, without having a separate fixing member, thereby reducing the number of parts, simplifying the assembly process, and therefore lowering manufacturing costs. Further, the turbo compressor according to this embodiment may prevent separation between the connecting sleeve 131 and the permanent magnet 122 and between the connecting sleeve 131 and the first and second impeller shafts 132 and 133 during high-speed operation, due to thermal expansion as well as centrifugal expansion, without having a separate fixing member, and may improve compressor performance by making the rotational shaft 130 lightweight.

Although not shown, the first locking portion 1351, the first locking groove 1352, the second locking projection 1361, and the second locking groove 1362 may be formed in an opposite manner. For example, the first locking projection 1351 may be formed on the outer periphery of the permanent magnet 122, the second locking projection 1361 may be formed on the outer periphery of the first shaft fixing portion and the outer periphery of the second shaft fixing portion 1331, and the first locking groove 1352 and the second locking groove 1362 may be formed on the inner periphery of the connecting sleeve 131. In this case, too, basic constructions and operational effects of the first locking groove 1352, the second locking projection 1361, and the second locking groove 1362 are almost identical to those in the previous embodiment.

Another example of the rotational shaft may be provided as follows. That is, in the previous embodiment, a first locking portion formed with a projection and a groove may be provided between the connecting sleeve and the permanent magnet, and in some cases, the first locking portion between the connecting sleeve and the permanent magnet may be excluded.

Figure 14:
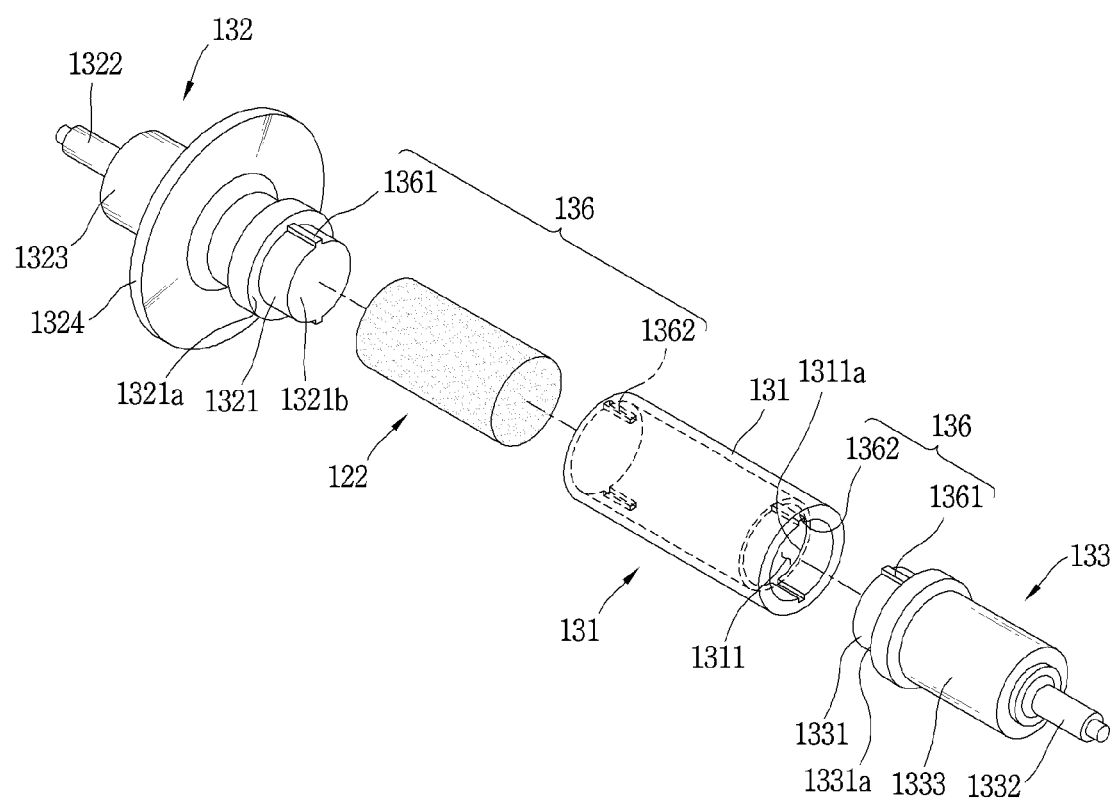
FIG. 14 is an exploded perspective view of the rotational shaft of FIG. 2 according to another embodiment.
Figure 15:
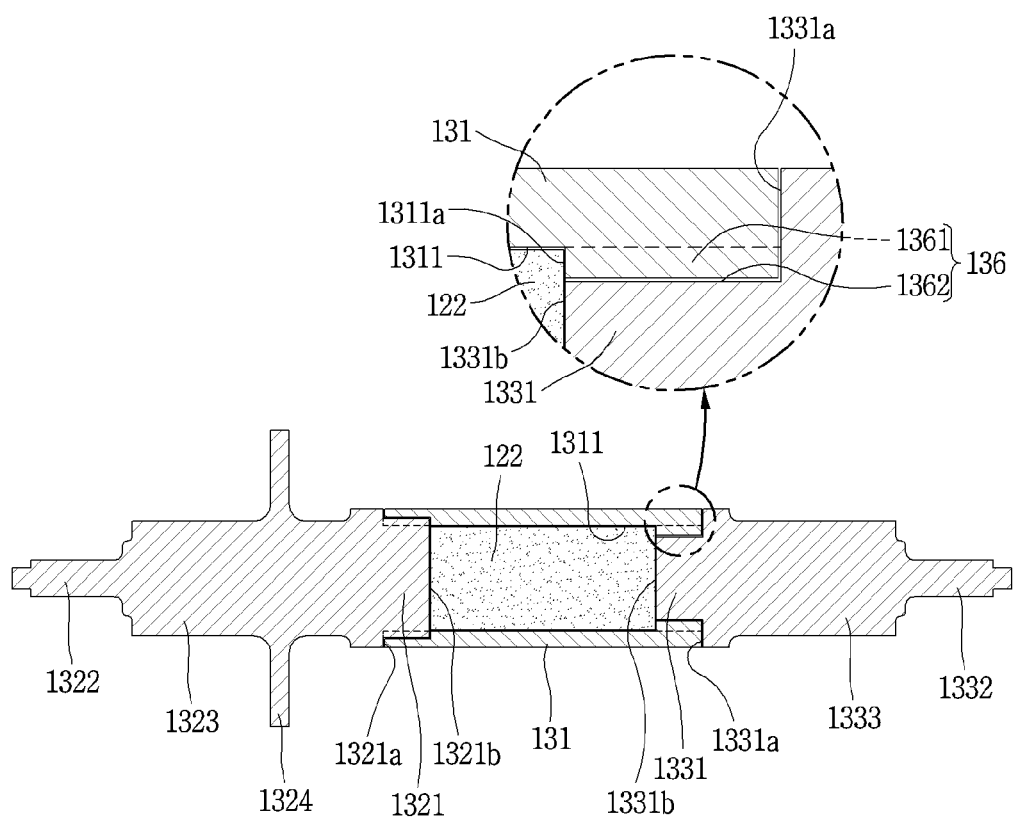
FIG. 15 is a cross-sectional view showing an inside of the rotational shaft of FIG. 14.

FIG. 14 is an exploded perspective view of another example of the rotational shaft of FIG. 2 according to another embodiment. FIG. 15 is a cross-sectional view showing an inside of the rotational shaft of FIG. 14.

Referring to FIGS. 14 and 15, the rotational shaft 130 according to this embodiment may include connecting sleeve 131, first impeller shaft 132, and second impeller shaft 133. Permanent magnet 122 constituting a rotor may be inserted into the connecting sleeve 131. Basic constructions and operational effects of the permanent magnet 122, the connecting sleeve 131 with the permanent magnet 122 inserted in it, and the first impeller shaft 132 and second impeller shaft 133 respectively coupled to opposite ends of the connecting sleeve 131 are almost identical to those in the previous embodiment, so description thereof will be replaced with the description of the previous embodiment.

However, in this embodiment, no mechanical fixing portion is formed between the inner periphery of the connecting sleeve 131 and the outer periphery of the permanent magnet 122, but the permanent magnet 122 may be inserted into and coupled to the connecting sleeve 131. For example, the permanent magnet 122 may be coupled to the connecting sleeve 131 by press-fitting.

In this case, the inner periphery of the connecting sleeve 131 may be formed in two or more tiers. For example, the inner diameter of the connecting sleeve 131 at one end where the permanent magnet 122 is inserted may be larger than the outer diameter of the permanent magnet 122, and the inner diameter of the connecting sleeve 131 at the other end where the permanent magnet 122 is axially supported may be smaller than the outer diameter of the permanent magnet 122. Accordingly, a stepped, magnet supporting surface 1311a may be formed on the inner periphery of the connecting sleeve 131, which, when the permanent magnet 122 is inserted, may restrict the depth to which the permanent magnet 122 is inserted and at the same time, axially support one end of the permanent magnet 122. This embodiment is illustrated with an example in which the inner periphery of the connecting sleeve 131 is formed in two tiers. Although not shown in the drawings, the outer periphery of the permanent magnet 122 may be formed in multiple tiers, corresponding to the inner periphery of the connecting sleeve 131.

Moreover, in this embodiment, no first locking portion (not shown) is formed between the outer periphery of the permanent magnet 122 and the inner periphery of the connecting sleeve 131 facing that outer periphery, but a second locking portion 136 may be formed only between two opposite ends of the connecting sleeve 131 and both of the impellers 132 and 133 facing them. As in the previous embodiment, the second locking portion 136 may include a second locking projection 1361 and a second locking groove 1362. For example, the second locking projection 1361 may be formed on the impeller shafts 132 and 133, as opposed to the previous embodiment, and the second locking groove 1362 into which the second locking projection 1361 is inserted may be formed on the inner periphery of opposite ends of the connecting sleeve 131. In particular, the second locking groove 1362 which engages the second locking projection 1361 provided on the outer periphery of the second impeller shaft 133 may be formed on the inner periphery of a protruding portion constituting the magnet supporting surface 1311a.

Basic shapes and operational effects of the second locking projection 1361 and the second locking groove 1362 according to this embodiment are identical to those in the previous embodiment, so description thereof will be replaced with the description of the previous embodiment.

As seen above, the second locking projection 1361 and the second locking groove 1362 which engage each other may be provided between the connecting sleeve 131 and both of the impeller shafts 132 and 133, so as to mechanically lock them against each other, whereas the connecting sleeve 131 and the permanent magnet 122 may be coupled by press-fitting with no mechanical locking portion interposed between them, thus allowing for easy machining of the permanent magnet 122. In other words, the permanent magnet 122 may be fixed to the connecting sleeve 131 by press-fitting without forming a fixing groove on the outer periphery of the permanent magnet 122, thereby allowing for easy machining of the permanent magnet 122.

Another example of the rotational shaft may be provided as follows. That is, in the previous embodiments, a second locking portion including a projection and a groove may be provided between either end of the inner periphery of the connecting sleeve and the outer periphery of each of the impeller shafts facing them. In some cases, however, the second locking portion formed with a projection and a groove is not formed between the inner periphery of the connecting sleeve and the outer periphery of both of the impeller shafts, but instead the connecting sleeve and the impeller shafts may be coupled together by welding or press-fitting.

Figure 16:
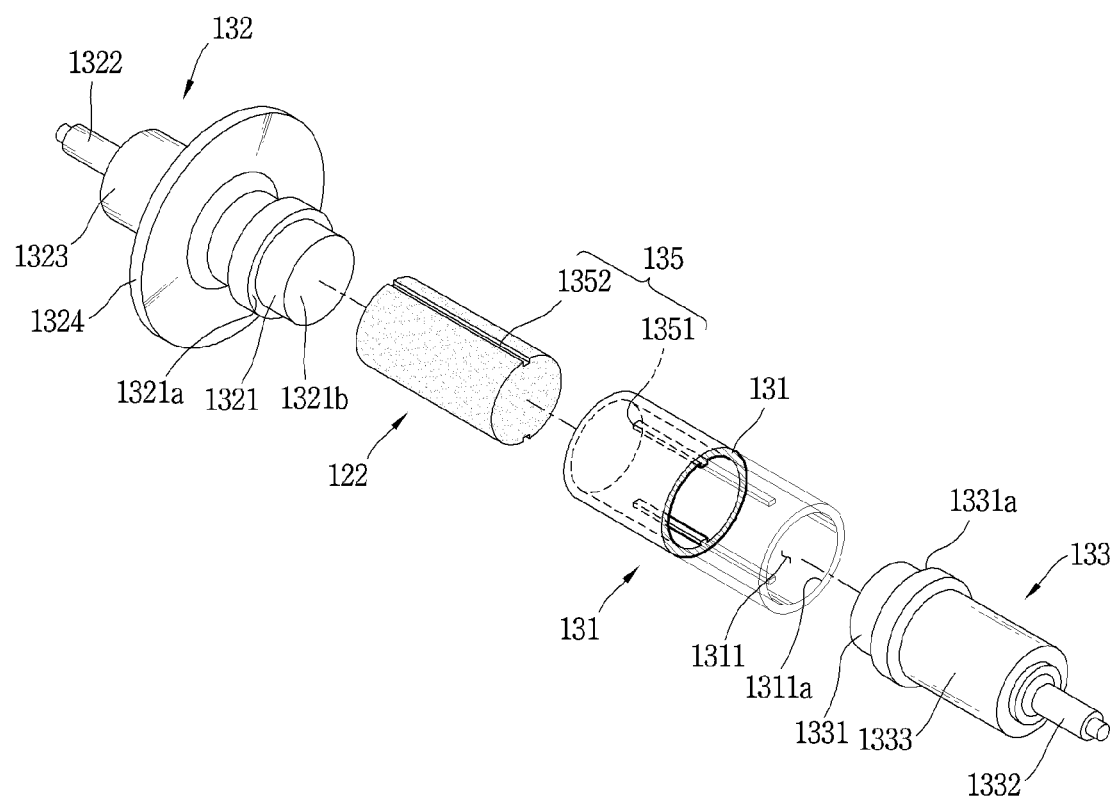
FIG. 16 is an exploded perspective view of the rotational shaft of FIG. 2 according to yet another embodiment.
Figure 17:
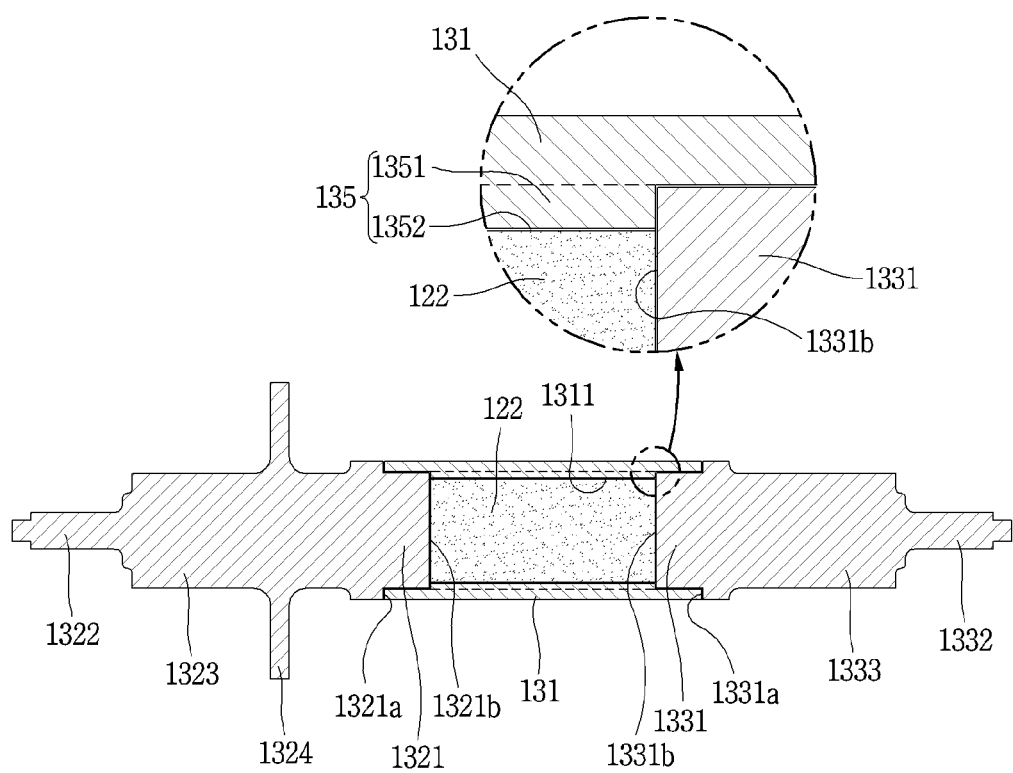
FIG. 17 is a cross-sectional view showing an inside of the rotational shaft of FIG. 16.

FIG. 16 is an exploded perspective view of the rotational shaft of FIG. 2 according to yet another embodiment. FIG. 17 is a cross-sectional view showing an inside of the rotational shaft of FIG. 16.

Referring to FIGS. 16 and 17, the rotational shaft 130 according to this embodiment may include connecting sleeve 131, first impeller shaft 132, and second impeller shaft 133. Permanent magnet 122 constituting a rotor may be inserted into the connecting sleeve 131. Basic constructions and operational effects of the permanent magnet 122, the connecting sleeve 131 with the permanent magnet 122 inserted in it, and the first impeller shaft 132 and second impeller shaft 133 respectively coupled to opposite ends of the connecting sleeve 131 are almost identical to those in the previous embodiment, so description thereof will be replaced with the description of the previous embodiment.

Moreover, basic shapes and operational effects of a first locking projection (or first locking groove) 1351 provided in the center of the inner periphery of the connecting sleeve 131 and a first locking groove (or first locking projection) 1352 provided on the outer periphery of the permanent magnet 122 facing the center of the inner periphery of the connecting sleeve 131 are identical to those in the previous embodiment, so description thereof will be replaced with the description of the previous embodiment.

It should be noted that, in this embodiment, the inner periphery of opposite ends of the connecting sleeve 131 and the outer periphery of the first shaft fixing portion 1321 of the first impeller shaft 132 and the outer periphery of the second shaft fixing portion 1331 of the second impeller shaft 133, which face the inner periphery of opposite ends of the connecting sleeve 131, may be formed smoothly in the shape of a smooth tube. In this case, the first impeller shaft 132 and the second impeller shaft 133 may be coupled to opposite ends of the connecting sleeve 131 by pressing them together by a method, such as shrink-fitting, or may be coupled to them by welding while inserted therein.

In a case in which the first impeller shaft 132 and the second impeller shaft 133 are coupled to opposite ends of the connecting sleeve 131 by press-fitting or welding, there is no need to form a projection (second locking projection) and a groove (second locking groove) on the inner periphery of opposite ends of the connecting sleeve 131 and the outer periphery of the first impeller shaft 132 and second impeller shaft 133 facing them, which allows for easy machining of both of the impeller shafts 132 and 133. Moreover, in this case, machining and assembly are done in such a way that only the first locking projection 1351 provided at the center of the inner periphery of the connecting sleeve 131 and the first locking groove 1352 provided on the outer periphery of the permanent magnet 122 may engage each other, and as such, machining error or/and assembly error may be reduced. In other words, when the second locking projection 1361 and first locking projection 1351 on the connecting sleeve 131 are formed on the same axis line, and the second locking groove 1362 is formed on both of the impeller shafts 132 and 133 facing the second locking projection 1361 and the first locking projection 1351 and the first locking groove 1352 is formed on the permanent magnet 122, it is necessary for the second locking groove 1362 and the first locking groove 1352 to be formed in equal size in the same position so as to be accurately assembled to the second locking projection 1361 and the first locking projection 1361 and the first locking projection 1351. This is to minimize machining error or/and assembly error and may lead to an increase in manufacturing costs. However, in a case in which the inner periphery of the connecting sleeve 131 and the outer periphery of both of the impeller shafts 132 and 133 are coupled together by press-fitting or welding, without mechanical assembling of projections and grooves, for example, there is no need to consider machining error or/and assembly error in the connecting sleeve 131 and both of the impeller shafts 132 and 133, thereby reducing the manufacturing costs.

Another example of the rotational shaft may be provided as follows. That is, in the previous embodiments, a second locking portion formed with a projection and a groove may be formed between the inner periphery of the connecting sleeve and the outer periphery of both of the impeller shafts, or the connecting sleeve and both of the impeller shafts may be coupled together by press-fitting or welding. In some cases, however, the second constraining portion may be formed with a projection and a groove between an end surface of the connecting sleeve and a stepped surface (or the outer periphery connected to the stepped surface) of both of the impeller shafts facing the end surface, which may be then welded together.

Figure 18:
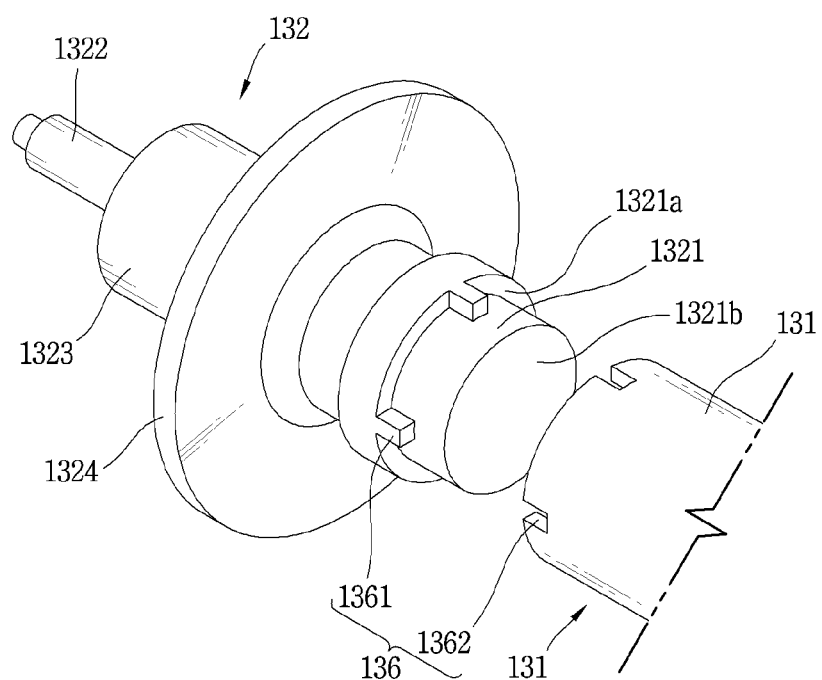
FIG. 18 is an exploded perspective view of essential components of the rotational shaft of FIG. 2 according to still another embodiment.
Figure 19:
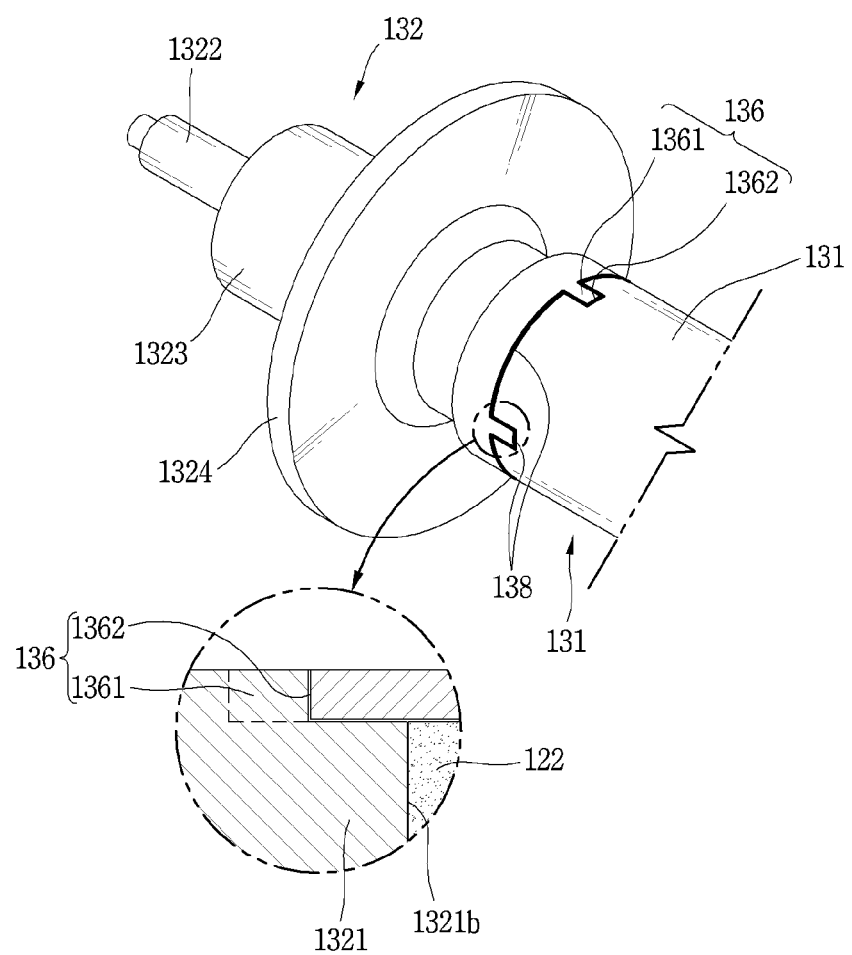
FIG. 19 is an assembled perspective view of the rotational shaft of FIG. 18.

FIG. 18 is an exploded perspective view of essential parts or components of the rotational shaft of FIG. 2 according to yet another embodiment. FIG. 19 is an assembled perspective view of the rotational shaft of FIG. 18.

Referring to FIGS. 18 and 19, the rotational shaft 130 according to this embodiment may include connecting sleeve 131, first impeller shaft 132, and second impeller shaft 133. Permanent magnet 122 constituting a rotor may be inserted into the connecting sleeve 131. Basic constructions and operational effects of the connecting sleeve 131, the first impeller shaft 132, the second impeller shaft 133, and the permanent magnet 122 are almost identical to those in the previous embodiment, so description thereof will be replaced with the description of the previous embodiment. Moreover, basic shapes and operational effects of first locking projection (or first locking groove) 1351 provided in the center of the inner periphery of the connecting sleeve 131, which constitutes the first locking portion 135, and first locking groove (or first locking projection) 1352 provided on the outer periphery of the permanent magnet 122 facing the center of the inner periphery of the connecting sleeve 131, which constitutes the first locking portion 135, are identical to those in the previous embodiment, so description thereof will be replaced with the description of the previous embodiment.

It should be noted that, in this embodiment, second locking projection 1361 axially extending along the circumference may be formed on one end surface of the connecting sleeve 131, and second locking groove 1362 axially recessed along the circumference may be formed on a stepped surface (or the outer periphery of the first shaft fixing portion extending from the stepped surface) of the first shaft fixing portion 1321 of the first impeller shaft 132 facing the one end surface of the connecting sleeve 131. It is also possible that the above second locking portion 136 is formed between the other end surface of the connecting sleeve 131 and the second impeller shaft 133 facing it. Also, the second locking projection 1361 and the second locking groove 1362 may be positioned the other way around from each other.

The second locking projection 1361 and the second locking groove 1362 may correspond in shape and be coupled together by engaging each other. Accordingly, the second locking projection 1361 and the second locking groove 1362 may have almost the same dimensions, for example, an axial height and circumferential width of the second locking projection 1361 and an axial height and circumferential width of the second locking groove 1362 may be almost equal.

As above, in a case in which the second locking projection 1361 and the second locking groove 1362 are coupled together by engaging each other, between an end surface of the connecting sleeve 131 and a stepped surface of both of the impeller shafts 132 and 133, and therefore the end surface and the stepped surface are welded together, the connecting sleeve 131 and both of the impeller shafts 132 and 133 may be coupled together more firmly.

Moreover, in this embodiment, a welding material is filled between the second locking projection 1361 and the second locking groove 1362, which makes the second locking groove 1362 even larger than the second locking projection 1361. Thus, it is possible to reduce machining error and/or assembly error in the second locking projection 1361 and the second locking groove 1362.

Another example of the rotational shaft may be provided as follows. That is, in the previous embodiments, the permanent magnet may be press-fitted to the inner periphery of the connecting sleeve, or the first locking portion may be formed between the inner periphery of the connecting sleeve and the outer periphery of the permanent magnet. In some cases, however, a third locking portion may be formed between one or either side of the permanent magnet and one or either side facing it.

Figure 20:
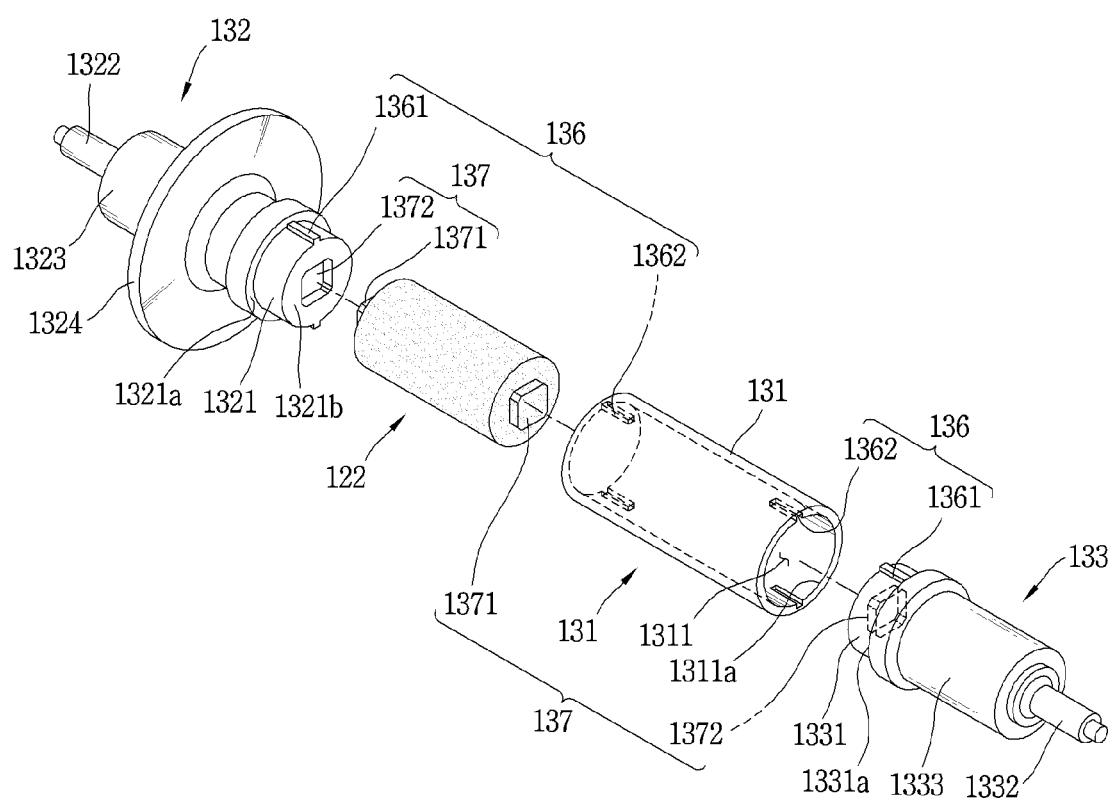
FIG. 20 is an exploded perspective view of another example of the rotational shaft of FIG. 2.
Figure 21:
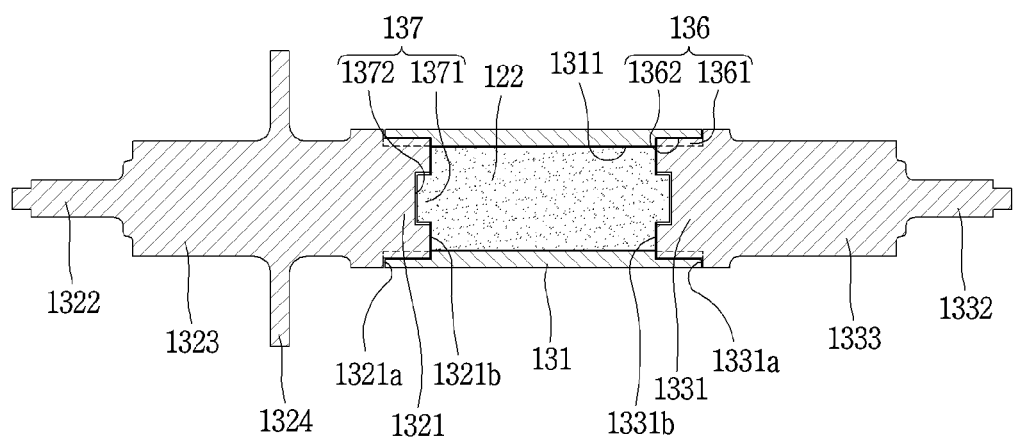
FIG. 21 is a cross-sectional view showing an inside of the rotational shaft of FIG. 20.

FIG. 20 is an exploded perspective view of the rotational shaft of FIG. 2 according to still another embodiment. FIG. 21 is a cross-sectional view showing an inside of the rotational shaft of FIG. 20.

Referring to FIGS. 20 and 21, the rotational shaft 130 according to this embodiment may include connecting sleeve 131, first impeller shaft 132, and second impeller shaft 133. Permanent magnet 122 constituting a rotor may be inserted into the connecting sleeve 131. Basic constructions and operational effects of the connecting sleeve 131, the first impeller shaft 132, the second impeller shaft 133, and the permanent magnet 122 are almost identical to those in the previous embodiment, so description thereof will be replaced with the description of the previous embodiment.

Moreover, basic shapes and operational effects of second locking projection (or second locking groove) 1361 provided on the outer periphery of the first impeller shaft 132 and second impeller shaft 133 facing the inner periphery of opposite ends of the connecting sleeve 131 and second locking groove (or second locking projection) 1362 provided on the inner periphery of opposite ends of the connecting sleeve 131 and constituting the second locking portion 136 are identical to those in the previous embodiment of FIG. 14, so description thereof will be replaced with the description of the previous embodiment. In addition, although not shown in the drawings, the second locking projection (or second locking groove) 1361 may be formed on opposite end surfaces of the connecting sleeve 131, and the second locking groove (or second locking projection) 1362 may be formed on stepped surfaces 1321a and 1331a constituting the shaft fixing portions 1321 and 1331 of both of the impeller shafts 132 and 133, so that both of the impeller shafts 132 and 133 may be, for example, welded to the connecting sleeve 131. Also, both of the impeller shafts 132 and 133 may be, for example, press-fitted or welded to the connecting sleeve 131, without the second locking projection 1361 and the second locking groove 1362 formed thereon. This embodiment is identical to the embodiment of FIG. 18, so description thereof will be replaced with the description of the previous embodiment.

It should be noted that, in this embodiment, third locking portion 137 may be formed between each axial side of the permanent magnet 122 and an end surface 1321b of the first impeller shaft 132 and/or an end surface 1331b of the second impeller shaft 133 facing the opposite axial sides. The following description will be given with an example in which third locking portion 137 is provided on either end surface of the permanent magnet 122.

The third locking portion 137 may include a third locking projection 1371 and a third locking groove 1372. The third locking projection 1371 and the third locking groove 1372 may correspond to each other.

The third locking projection 1371 may extend axially to a preset or predetermined height from one end surface of the permanent magnet 122. For example, the third locking projection 1371 may be formed in an angular shape, more specifically, a rectangular cross-sectional shape or in a D-cut cross-sectional shape, when axially projected.

The third locking groove 1372 may be recessed axially to a preset or predetermined depth from the end surface 1321b of the first impeller shaft 132 facing opposite end faces of the permanent magnet 122. For example, the third locking groove 1372 may correspond in shape to the third locking projection 1371. Accordingly, when the first shaft fixing portion 1321 and the second shaft fixing portion 1331 of the second impeller shaft 133 are inserted into opposite ends of the connecting sleeve 131 where the permanent magnet 122 is inserted, the third locking projection 1371 on one side of the permanent magnet 122 may be inserted into and coupled to the third locking groove 1372 of the first impeller shaft 132, and the third locking groove 1371 on the other side of the permanent magnet 122 may be inserted into and coupled to the third locking groove 1372 of the second impeller shaft 133.

As seen from above, in a case in which the second locking portion 136 is provided between the connecting sleeve 131 and both of the impeller shafts 132 and 133, and the third locking portion 137 is provided between both of the impeller shafts 132 and 133 and the permanent magnet 122, the connecting sleeve 131, both of the impeller shafts 132 and 133, and the permanent magnet 122 are mechanically held together, and therefore no slip occurs between these members. Moreover, in this case, the first locking groove (not shown) is not formed on the outer periphery of the permanent magnet 122, so that the permanent magnet 122 maintains a circular shape within a range along which it radially faces the stator 121, thus keeping an area of a magnetic path of the permanent magnet 122 constant in the circumferential direction. Consequently, the area of the magnetic path is not reduced, and therefore a reduction in motor efficiency may be prevented.

Although not shown, the above-described first locking portion 135 may be further provided between the outer periphery of the permanent magnet 122 and the inner periphery of the connecting sleeve 131. In this case, even if the third locking portion 137 is small in size or a large assembly error is generated, a direct coupling force between the connecting sleeve 131 and the permanent magnet 122 may be increased.

Although not shown, the locking projection 1371 and the locking groove 1372 may be positioned the other way around from each other. For example, the third locking projection 1371 may axially protrude to a preset or predetermined height from the end surface 1321b of the first impeller shaft 132 facing opposite end faces of the permanent magnet 122, and the third locking groove 1372 may be axially recessed to a preset or predetermined depth from one end face of the permanent magnet 122. In this case, too, a basic construction and operational effects of the third locking portion may be almost the same.

Another example of the rotational shaft may be provided as follows. That is, in the previous embodiments, the impeller shafts may be in the shape of a rod an inside of which is solid, whereas, in some cases, the impeller shafts may be in the shape of a cavity which is hollow inside.

Figure 22:
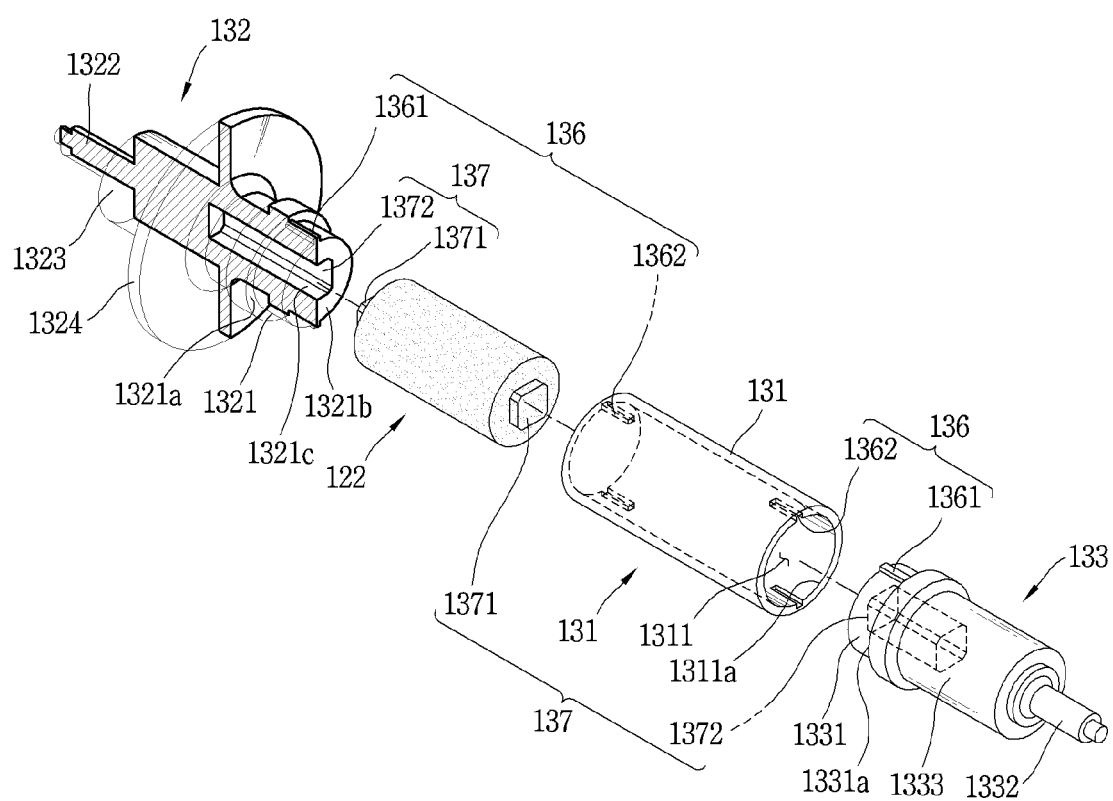
FIG. 22 is an exploded perspective view of essential components of the rotational shaft of FIG. 20 according to still another embodiment.
Figure 23:
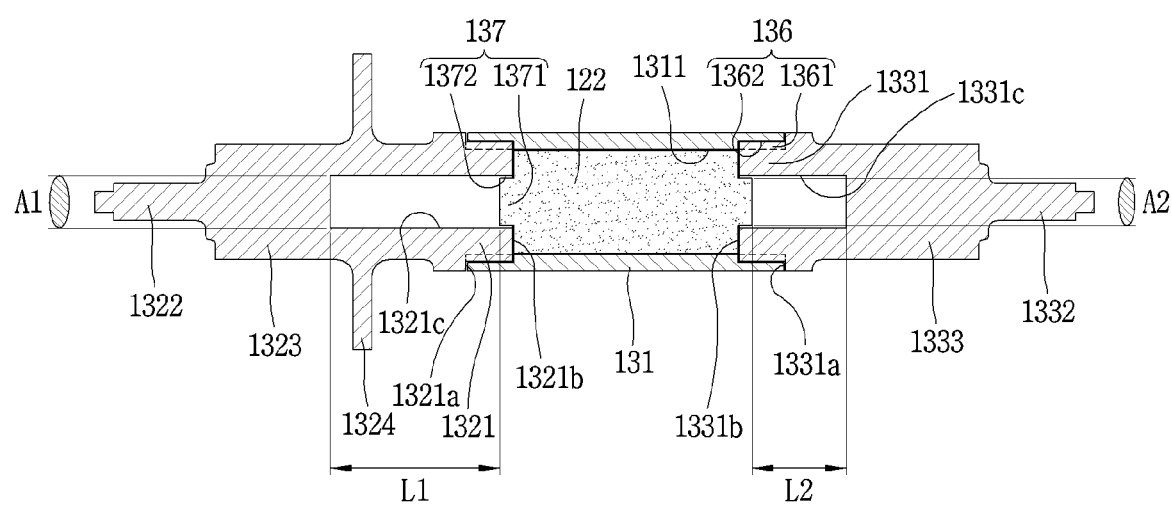
FIG. 23 is a cross-sectional view showing an inside of the rotational shaft of FIG. 22.
Figure 24:
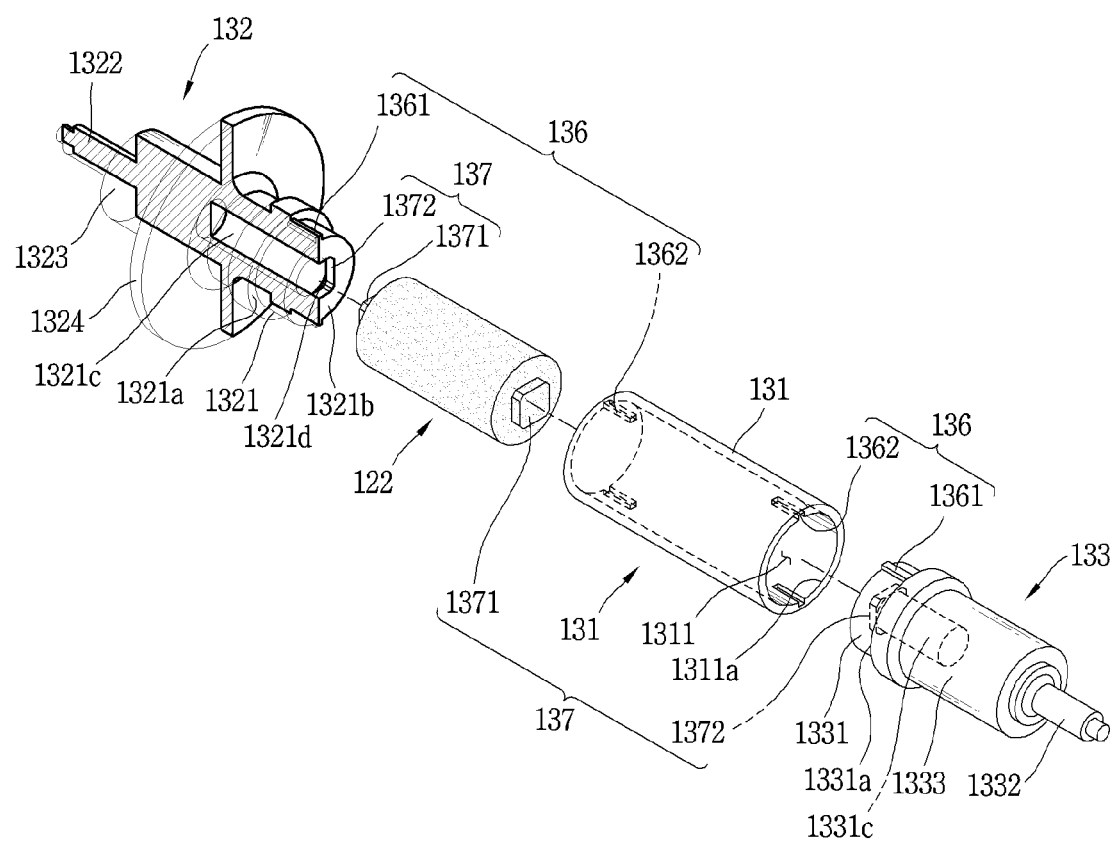
FIG. 24 is an exploded perspective view of essential components of the rotational shaft of FIG. 20 according to still another embodiment.
Figure 25:
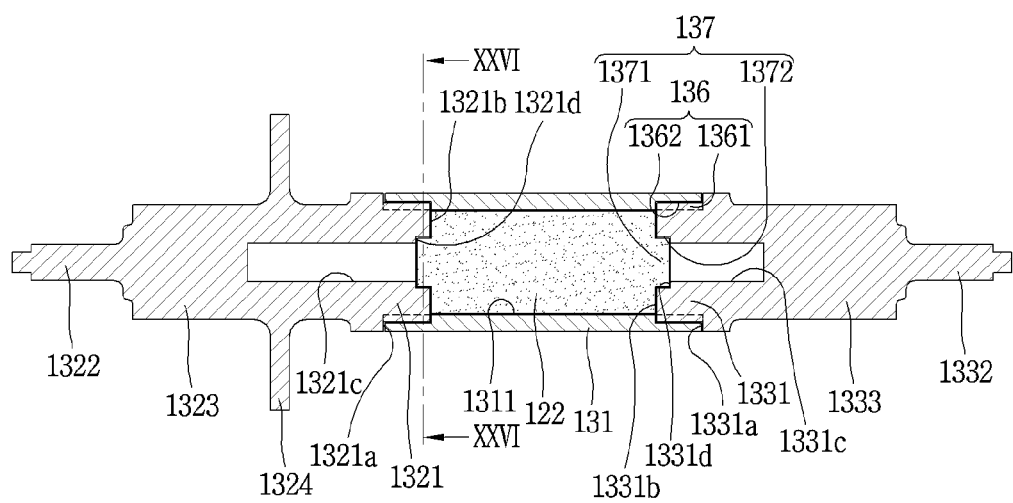
FIG. 25 is a cross-sectional view showing an inside of the rotational shaft of FIG. 24.
Figure 26:
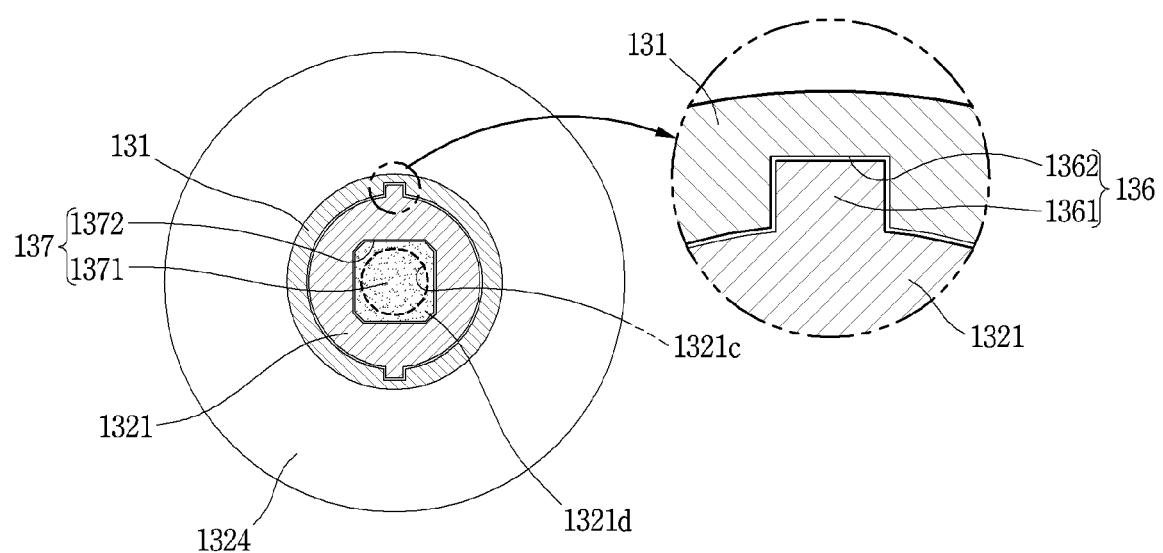
FIG. 26 is a cross-sectional view of FIG. 25, taken along line "XXV-XXV".

FIG. 23 is a cross-sectional view of an inside of the rotational shaft of FIG. 22. FIG. 24 is an exploded perspective view of essential parts or components of the rotational shaft of FIG. 20 according to another embodiment. FIG. 25 is a cross-sectional view of an inside of the rotational shaft of FIG. 24. FIG. 26 is a cross-sectional view of FIG. 25, taken along line "XXV-XXV".

Referring to FIGS. 22 to 25, the rotational shaft 130 according to this embodiment may include connecting sleeve 131, first impeller shaft 132, and second impeller shaft 133. Permanent magnet 122 constituting a rotor may be inserted into the connecting sleeve 131. Basic constructions and operational effects of the connecting sleeve 131, the first impeller shaft 132, the second impeller shaft 133, and the permanent magnet 122 are almost identical to those in the previous embodiment, so description thereof will be replaced with the description of the previous embodiment.

Moreover, basic shapes and operational effects of second locking projection (or second locking groove) 1361 provided on the outer periphery of the first impeller shaft 132 and second impeller shaft 133 and second locking groove (or second locking projection) 1362 provided on the inner periphery of opposite ends of the connecting sleeve 131 and constituting the second locking portion 136 are identical to those in the previous embodiment of FIG. 20, so description thereof will be replaced with the description of the previous embodiment. In addition, although not shown, the second locking portion 136 may be formed between opposite end faces of the connecting sleeve 131 and the stepped surfaces 1321a and 1331a of the two impeller shafts 132 and 133 facing the opposite end faces, or the opposite end faces of the connecting sleeve 131 and the stepped surfaces 1321a and 1331a of the two impeller shafts 132 and 133 may be coupled together by welding, without the second locking portion 136 interposed between them. These embodiments are identical to those explained with reference to the previous embodiment of FIG. 20, so description thereof will be omitted.

Further, the above-described first locking portion 135 may be provided between the center of the inner periphery of the connecting sleeve 131 and the outer periphery of the permanent magnet 122 facing it. description of this will be replaced with the description of the previous embodiment of FIG. 20. However, this embodiment will be described with an example in which the first locking portion 135 is omitted and instead the third locking portion 137 described hereinafter is formed.

Furthermore, the third locking portion 137 may be provided between opposite sides of the permanent magnet 122 and sides of both of the impeller shafts 132 and 133 facing them. Description of this will be replaced with the description of the previous embodiment of FIG. 20. It should be noted that, in this embodiment, the third locking portion 137 may be omitted, and instead a hollow portion may be axially recessed to a preset or predetermined depth, from the sides of both of the impeller shafts 132 and 133, that is, the end surfaces 1321b and 1331b of the shaft fixing portions 1321 and 1331, toward the opposite ends, or the above-explained hollow portion may extend further from the third locking groove 1372 constituting the third locking portion 137. The following description will be given with an example in which the third locking portion 137 is provided and the cavity portion extends from the third locking portion 1372 constituting the third locking portion 137.

The third locking portion 137 according to this embodiment may include third locking projection 1371 and third locking groove 1372. Basic constructions and operational effects of the third locking projection 1371 and the third locking groove 1372 are almost identical to those in the previous embodiment of FIG. 20, so description thereof will be replaced with the description of the embodiment of FIG. 16.

It should be noted that the above-explained hollow portion may extend on an inner surface of the third locking groove 1372. For example, a first hollow portion 1321c may extend from the third locking groove 1372 of the first impeller shaft 132, and a second hollow portion 1331c may extend from the third locking groove 1372 of the second impeller shaft 133. However, the hollow portion 1321c and 1331c may be formed in only one of the impeller shafts 132 and 133 but not in the other impeller shaft 133 and 132.

For example, the hollow portion (first hollow portion) 1321c may be formed in the first impeller shaft 132 which has the thrust runner 1324, whereas the hollow portion (second hollow portion) 1331c may not be formed in the second impeller shaft 133 which does not include a thrust runner. The following description will be given with an example in which the hollow portions 1321c and 1331c are formed in the first impeller shaft 132 and the second impeller shaft 133, respectively.

A volume of the first hollow portion 1321c and a volume of the second hollow portion 1331c may be equal. For example, a cross-sectional area A1 of the first hollow portion 1321c and a cross-sectional area A2 of the second hollow portion 1331c may be equal, or/and a length L1 of the first hollow portion 1321c and a length L2 of the second hollow portion 1331c may be equal.

In this embodiment, however, the thrust runner 1324 is provided on the first impeller shaft 132, but no thrust runner (not shown) is provided on the second impeller shaft 133. With that in mind, the volume of the first hollow portion 1321c provided on the first impeller shaft 132 may be larger than the volume of the second hollow portion 1331c provided on the second impeller shaft 133, for example, the cross-sectional area A1 of the first hollow portion 1321c may be larger than the cross-sectional area A2 of the second hollow portion 1331c, or/and the length L1 of the first hollow portion 1321c may be larger than the length L2 of the second hollow portion 1331c. In other words, the cross-sectional areas A1 and A2 or/and lengths L1 and L2 or/and volumes of the two hollow portions 1321c and 1331c may be adjusted in consideration of the center of gravity of the hollow portions 1321c and 1331c with respect to the center of the rotational shaft 130.

It should be noted that, as the shapes and operational effects of the first hollow portion 1321c and the second hollow portion 1331c are almost identical, the shape of the hollow portions will be described with respect to the first hollow portion 1321c and description of the second hollow portion 1331c will be replaced with the description of the first hollow portion 1321c. Referring to FIGS. 22 and 23, the first hollow portion 1321c according to this embodiment may extend in such a way as to have a same axial cross-sectional area as the third locking groove 1372 of the first impeller shaft 132 as described above. For example, the first hollow portion 1321c may be formed in a rectangular cross-sectional shape like the third locking groove 1372, and an axial cross-sectional area of the first hollow portion 1321c may be equal to an axial cross-sectional area of the third locking groove 1372. Once the first hollow portion 1321c and the third locking groove 1372 are formed with the same dimensions as described above, the first hollow portion 1321c and the third locking groove 1372 may be simultaneously machined, thereby simplifying the manufacturing process and lowering manufacturing costs.

Referring to FIGS. 24 to 26, the first hollow portion 1321c according to this embodiment may be formed differently from the third locking groove 1372. For example, the third locking groove 1372 may be formed in a shape corresponding to the third locking projection 1371, that is, a rectangular cross-sectional shape, whereas the first hollow portion 1321c may be formed in a circular cross-sectional shape on an inner surface of the third locking groove 1372.

In this case, an inner diameter of the first hollow portion 1321c is smaller than the axial cross-sectional area (or the length of one side of) the third locking groove 1372, and this creates a first axial supporting surface 1321d on a corner of the third locking groove 1372 which does not form the first hollow portion 1321c when the third locking groove 1372 is axially projected. An axial side of the third locking projection 1371 may be axially and tightly attached to and supported on the first axial supporting surface 1321d. Accordingly, opposite sides of the permanent magnet 122 are axially supported on sides of both of the impeller shafts (specifically, axial fixing portions) 132 and 133, and at the same time, an axial side of the third locking projection 1371 may be axially supported on the above-described first axial supporting surface 1321d, thereby allowing the permanent magnet 122 to be fixed more firmly in the axial direction.

Moreover, in a case in which the first hollow portion 1321c and the third locking groove 1372 are formed in different shapes as in this embodiment, the third locking grooves 1372 on opposite sides may have the same shape and size, but the first hollow portion 1321c and the second hollow portion 1331c may have different shapes or/and sizes. For example, if the axial cross-sectional area A1 of the first hollow portion 1321c is larger than the axial cross-sectional area A2 of the second hollow portion 1331c, the third locking groove 1372 of the first impeller shaft 132 and the third locking groove 1372 of the second impeller shaft 133 may have the same shape and the same size. Consequently, the first locking projection 1351 and the second locking projection 1361 may have the same cross-sectional area, and therefore circumferential movement of the permanent magnet 122 may be stably restricted, thereby preventing slip.

Embodiments disclosed herein provide a turbo compressor having an assembly-type rotational shaft, capable of improving coupling force between parts constituting the rotational shaft. Embodiments disclosed herein further provide a turbo compressor capable of reducing the number of parts, simplifying an assembly process, and therefore reducing manufacturing costs by improving coupling force between parts while excluding a separate fixing member from an assembly-type rotational shaft.

Embodiments disclosed herein furthermore provide a turbo compressor capable of preventing separation between parts due to centrifugal expansion or thermal expansion during a high-speed rotation while excluding a separate fixing member from an assembly-type rotational shaft, and also capable of making the rotational shaft lightweight.

Embodiments disclosed herein provide a turbo compressor having a rotational shaft with an embedded magnet, capable of keeping the magnet in an assembled position. Embodiments disclosed herein also provide a turbo compressor capable of securely fixing a magnet by providing a mechanical fixing portion between the magnet and a member covering the magnet, thus providing an advantage in concentrically aligning the magnet.

Embodiments disclosed herein provide a turbo compressor capable of reducing a weight of a rotational shaft by forming a hollow portion in the rotational shaft, and fixing a magnet in place using the hollow portion.

Embodiments disclosed herein also provide a turbo compressor capable of quickly releasing heat generated from a motor housing.

Embodiments disclosed herein provide a turbo compressor capable of stably supporting a rotational shaft when the rotational shaft rotates at high speed. Embodiments disclosed herein additionally provide a turbo compressor capable of maximizing compressor performance depending on load.

Embodiments disclosed herein provide a turbo compressor that may include a connecting sleeve formed in a cylindrical shape; an impeller shaft inserted into an end of the connecting sleeve, to which an impeller may be coupled; and a permanent magnet inserted into the connecting sleeve. A first locking projection may be formed on either an inner periphery of the connecting sleeve or an outer periphery of the permanent magnet, and a first locking groove may be formed on the other, into which the first locking projection is inserted to restrict circumferential movement. Thus, the permanent magnet constituting a rotor may be easily coupled into the rotational shaft, and the permanent may be effectively prevented from slipping. Moreover, a magnet embedded in the rotational shaft may be securely fixed so that it is held in a position where it is assembled, thus providing an advantage in concentrically aligning the magnet.

For example, the first locking projection or the first locking groove extends axially between opposite ends of the permanent magnet. Thus, the permanent magnet may be easily inserted into and coupled to the rotational shaft.

For another example, a plurality of first locking projections and a plurality of first locking grooves are formed at preset or predetermined intervals along the circumference, wherein the plurality of first locking projections and the plurality of first locking grooves are formed at equal intervals along the circumference. Thus, torque from the permanent magnet is transmitted uniformly throughout the connecting sleeve during a high-speed operation, thereby improving reliability, and the area of a magnetic path of the permanent magnet may be kept constant, thereby preventing a reduction in motor efficiency.

For another example, a second locking projection and a second locking groove extend axially on one end of the connecting sleeve and the impeller shaft facing the one end, respectively, so as to engage each other and be locked in a circumferential direction. Thus, the connecting sleeve with the permanent magnet inserted in it may be easily coupled to the impeller shaft, and slip between the connecting sleeve and the impeller shaft may be effectively prevented.

More specifically, the second locking projection and the second locking groove may be formed on an inner periphery of the connecting sleeve and an outer periphery of the impeller shaft facing the connecting sleeve, respectively. Thus, the locking projection and the locking groove engage in a process of inserting the impeller shaft into the connecting sleeve, and therefore the connecting sleeve and the impeller shaft may be mechanically and firmly locked together.

Further, the second locking projection and the second locking groove may be axially formed on an end surface of the connecting sleeve and a stepped surface of the impeller shaft facing the end surface of the connecting sleeve in such a way as to engage each other. Thus, the inner periphery of the connecting sleeve may be formed in the shape of a smooth tube, thereby making it easy to insert the permanent magnet into the connecting sleeve and assemble the permanent magnet thereto.

More specifically, a welded surface for welding the connecting sleeve and the impeller shaft may be formed along a surface where the second locking projection and the second locking groove about each other. Thus, a welding area between the connecting sleeve and the impeller shaft may be increased, thereby stably coupling these two members together.

Further, the impeller shaft may be formed with an annular stepped shaft fixing portion so as to insert the connecting sleeve therein. The second locking projection or the second locking groove may be formed on an outer periphery of the shaft fixing portion. Thus, it is possible to prevent an increase in outer diameter of the impeller shaft while inserting the impeller shaft into the connecting sleeve, thereby reducing an area of friction with a bearing member supporting the impeller shaft.

Furthermore, the second locking projection may be formed on the same axis line as the first locking projection, and the second locking groove may be formed on the same axis line as the first locking groove. Thus, the permanent magnet and the impeller shaft may be coupled together on the same axis line, thereby simplifying assembly of the permanent magnet and the impeller shaft to the connecting sleeve.

More specifically, the second locking projection may extend integrally from the first locking projection. Thus, a locking projection for locking the permanent magnet and the impeller shaft may be easily formed.

The connecting sleeve may be formed of a material whose thermal expansion coefficient is higher than or equal to that of the impeller shaft or the permanent magnet. This allows for a high degree of freedom for selection of materials of the connecting sleeve, the impeller shaft, and the permanent magnet, and even if these members are formed of different materials, the members coupled to the connecting sleeve may be prevented from moving apart from each other during high-speed rotation, thereby improving reliability.

Embodiments disclosed herein also provide a turbo compressor that may include a connecting sleeve formed in a hollow shape and coupled to a rotor; a first impeller shaft inserted into one end of the connecting sleeve, to which a first impeller is coupled; and a second impeller shaft inserted into the other end of the connecting sleeve, to which a second impeller is coupled. A second locking groove and a second locking projection may be formed on one end of the connecting sleeve and the first impeller shaft facing the one end, respectively, and also on the other end of the connecting sleeve and the second impeller shaft facing the other end, respectively, so as to engage each other and be locked in a circumferential direction. Thus, the assembly structure of the connecting sleeve and the impeller shafts coupled to it may be simplified, and a coupling force between the connecting sleeve and the impeller shafts may be increased, thereby ensuring reliability of the rotational shaft during high-speed rotation. Moreover, the connecting sleeve and the impeller shafts, which constitute an assembly-type rotational shaft, may be held in a position in which they are assembled, thus providing an advantage in concentrically aligning the rotational shaft.

For example, the second locking groove and the second locking projection may be formed on an inner periphery of the connecting sleeve and an outer periphery of the first impeller shaft or second impeller shaft facing the connecting sleeve, respectively. Thus, the locking projection and the locking groove engage in a process of inserting the impeller shaft into the connecting sleeve, and therefore the connecting sleeve and the impeller shaft may be mechanically and firmly locked together.

For another example, the second locking groove is formed by cutting an end surface of the connecting sleeve axially to a preset or predetermined depth, and the second locking projection may be formed on the outer periphery of the first impeller shaft or the outer periphery of the second impeller shaft. Thus, the inner periphery of the connecting sleeve may be formed in the shape of a smooth tube, thereby making it easy to insert the permanent magnet into the connecting sleeve and assemble the permanent magnet thereto.

For another example, the turbo compressor may include a permanent magnet inserted into the connecting sleeve. A third locking projection, which extends axially, may be formed on opposite end faces of the permanent magnet, and a third locking groove, which is axially recessed, may be formed on an end surface of the first impeller shaft and an end surface of the second impeller shaft. The third locking projection and the third locking groove may be formed in the shape of a non-circular cross-section so as to engage each other and be locked in the circumferential direction. Thus, the permanent magnet may be locked against the impeller shafts, thereby easily and stably restricting rotation of the permanent magnet.

More specifically, the first impeller shaft may be formed with a first hollow portion that extends axially from the third locking groove, and the second impeller shaft may be formed with a second hollow portion that extends axially from the third locking groove. The first hollow portion and the second hollow portion may have a same cross-sectional shape as the third locking groove. Thus, the permanent magnet may be locked against the impeller shafts, and at the same time a weight of the rotational shaft may be reduced.

Further, the first impeller shaft may be formed with a first hollow portion that extends axially from the third locking groove, and the second impeller shaft may be formed with a second hollow portion that extends axially from the third locking groove. The first hollow portion and the second hollow portion may have a different cross-sectional shape from the third locking groove, so that an axial supporting surface may be formed between the first and second hollow portions and the third locking groove from which the first hollow portion and the second hollow portion extend, so as to axially support the third locking projection. Thus, it is possible to reduce the weight of the rotational shaft and at the same time to provide an area where the permanent magnet is axially supported, thereby supporting the permanent magnet more stably.

Furthermore, the first impeller shaft may be formed with a first hollow portion that extends axially from the third locking groove, and the second impeller shaft is formed with a second hollow portion that extends axially from the third locking groove. The first impeller shaft may be formed with a thrust runner that extends radially, and a volume of the first hollow portion is higher than or equal to a volume of the second hollow portion. Thus, the center of gravity of the rotational shaft including the permanent magnet may be positioned in the center of the length the rotational shaft, thereby supporting the rotational shaft stably.

For another example, the connecting sleeve may be formed of a material whose thermal expansion coefficient is higher than or equal to that of the first impeller shaft or the second impeller shaft. This allows for a high degree of freedom for selection of materials of the connecting sleeve, the impeller shaft, and the permanent magnet, and even if these members are formed of different materials, the members coupled to the connecting sleeve may be prevented from moving apart from each other during a high-speed rotation, thereby improving reliability.

Embodiments disclosed herein further provide a turbo compressor that may include a connecting sleeve formed in a hollow shape; an impeller shaft inserted into one end of the connecting sleeve, to which an impeller is coupled; and a permanent magnet inserted into the connecting sleeve. A third locking groove and a third locking projection may be formed on one end of the impeller shaft and the permanent magnet facing the one end, respectively, so as to engage each other and be locked in a circumferential direction. The third locking projection and the third locking groove may be formed in the shape of a non-circular cross-section so as to engage each other and be locked in the circumferential direction. Thus, the permanent magnet may be locked against the impeller shaft, thereby easily and stably preventing the permanent magnet from slipping off the impeller shafts during high-speed rotation.

For example, the impeller shaft may be formed with a hollow portion that extends axially from the third locking groove. The hollow portion has a same cross-sectional shape as the third locking groove. Thus, the permanent magnet may be locked against the impeller shaft, and at the same time, the weight of the rotational shaft may be reduced, and the locking groove and the hollow portion may be machined in a single process, thereby allowing easy formation of the locking groove and the hollow portion.

For another example, the impeller shaft may be formed with a hollow portion that extends axially from the third locking groove. The hollow portion may have a different cross-sectional shape from the third locking groove, so that an axial supporting surface is formed between the hollow portion and the third locking groove so as to axially support the third locking projection. Thus, the permanent magnet may be supported more stably in the axial direction.

For another example, the impeller shaft may include a first impeller shaft and a second impeller shaft which are respectively coupled to opposite ends of the connecting sleeve. The first impeller shaft may be formed with a first hollow portion that extends axially from the third locking groove, and the second impeller shaft may be formed with a second hollow portion that extends axially from the third locking groove. The first impeller shaft may be formed with a thrust runner that extends radially, and a volume of the first hollow portion is higher than or equal to a volume of the second hollow portion. Thus, the center of gravity of the rotational shaft including the permanent magnet may be positioned in the center of the length the rotational shaft, thereby supporting the rotational shaft stably.

For another example, the connecting sleeve may be formed of a material whose thermal expansion coefficient is higher than or equal to that of the first impeller shaft or the permanent magnet. This allows for a high degree of freedom for selection of materials of the connecting sleeve, the impeller shaft, and the permanent magnet, and even if these members are formed of different materials, the members coupled to the connecting sleeve may be prevented from moving apart from each other during a high-speed rotation, thereby improving reliability.

Embodiments disclosed herein also provide a turbo compressor that may include a housing with a motor chamber; a drive motor provided in the motor chamber of the housing, that generates torque; a rotational shaft coupled to the drive motor, that transmits torque; a first compressor portion and a second compressor portion, respectively, provided on opposite ends of the rotational shaft; a connecting passage portion that connects an exit of the first compressor portion and an entrance of the second compressor portion; an inlet passage portion that communicates with an inside of the motor chamber by penetrating one side of the housing and directs a cooling fluid to the motor chamber; and an outlet passage portion that communicates with the inside of the motor chamber by penetrating the other side of the housing and directs the cooling fluid from the motor chamber to an outside of the housing. The rotational shaft may include a connecting sleeve formed in a hollow shape; a first impeller shaft provided on one end of the connecting sleeve and constituting the first compressor portion; a second impeller shaft provided on the other end of the connecting sleeve and constituting the second compressor portion; and a permanent magnet provided inside of the connecting sleeve and constituting a rotor. A locking portion for locking relative rotation of opposite members may be formed at at least one of the following positions: between the connecting sleeve and the permanent magnet, between the connecting sleeve and the first and impeller shafts, and between the first and second impeller shafts and the permanent magnet. The locking portion may include a locking projection and a locking groove which extend axially so as to be coupled together by engaging each other. Thus, it is possible to quickly operate a gas foil bearing provided in the motor chamber by supplying cooling fluid to the motor chamber, and at the same time, to quickly release heat generated from the motor chamber during high-speed operation, thereby improving efficiency of the turbo compressor and efficiency of a refrigeration cycle apparatus comprising the same. Moreover, the permanent magnet constituting a rotor may be easily coupled into the rotational shaft, and the permanent may be effectively prevented from slipping.

For example, the motor chamber may be divided into a first chamber and a second chamber on opposite axial sides, with the drive motor interposed therebetween, and the inlet passage portion may include: a first inlet passage portion communicating with the first chamber; and a second inlet passage portion communicating with the second chamber. The first inlet passage portion and the second inlet passage portion may communicate with the motor chamber on the same axis line. Thus, the first inlet passage portion and the second inlet passage portion may be easily connected to the housing, and at the same time, refrigerant may circulate long through the motor chamber, thereby improving a cooling effect of the motor chamber.

More specifically, the outlet passage portion may be positioned farthest from the first inlet passage portion or the second inlet passage portion in the circumferential direction. Thus, refrigerant may circulate long through the motor chamber for a long time.

Further, an inner diameter of the first inlet passage portion may be larger than or equal to an inner diameter of the second inlet passage portion. Thus, a large amount of refrigerant may be supplied to the first chamber, and therefore a bearing provided in the first space may be operated more quickly and cooled quickly.

For another example, the motor chamber divided into a first chamber and a second chamber on opposite axial sides, with the drive motor interposed therebetween. An axial support portion may be provided in the first chamber to axially support the rotational shaft, and the outlet passage portion may communicate with the second chamber. Thus, refrigerant introduced into the first chamber may be smoothly circulated through the first chamber, thereby increasing a bearing force of a bearing provided in the first space and further increasing the cooling effect of the rotational shaft.

More specifically, the outlet passage portion may include a first connecting passage one end of which communicates with the second chamber, and the other end of which communicates with the connecting passage portion; a second connecting passage one end of which communicates with the connecting passage portion, and the other end of which communicates with an entrance of the first compressor portion; and a refrigerant control valve that controls a direction of flow of a refrigerant passed through the motor chamber toward the first connecting passage or the second connecting passage. Thus, refrigerant passed through the motor chamber may be properly directed to the first compressor portion or the second compressor portion depending on an operation mode of the compressor, thereby optimizing compression efficiency.

More specifically, the refrigerant control valve may include a valve control portion that controls an opening or closing direction thereof according to a preset or predetermined condition. The valve control portion allows the second chamber to communicate with the entrance of the second compressor portion under a high-load condition, and allows the second chamber to communicate with the entrance of the first compressor portion under a low-load condition. Thus, compression efficiency may be increased by lowering enthalpy of refrigerant supplied to the second compressor portion under a high-load condition, and cooling force may be lowered by increasing a temperature of refrigerant supplied to the first compressor portion under a low-load condition.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope, the drawings and the appended claims. In addition to variations and modifications in the component parts and/or arrangements, alternative uses will also be apparent to those skilled in the art.

What is claimed is:

1. A rotational shaft for a turbo compressor, comprising:
   a connecting sleeve formed in a hollow shape;
   an impeller shaft inserted into an end of the connecting sleeve, to which an impeller is coupled, wherein the impeller shaft is configured to receive the connecting sleeve inserted thereon to overlap the impeller shaft; and
   a permanent magnet inserted into the connecting sleeve, wherein at least one first locking projection is formed on either an inner periphery of the connecting sleeve or an outer periphery of the permanent magnet, and at least one first locking groove is formed on the other of the inner periphery of the connecting sleeve or the outer periphery of the permanent magnet, into which the at least one first locking projection is inserted to restrict circumferential movement, wherein at least one second locking projection is formed on one of the inner periphery of the connecting sleeve or an outer periphery of the impeller shaft and at least one second locking groove is formed on the other of the inner periphery of the connecting sleeve or the outer periphery of the impeller shaft of the impeller shaft facing the connecting sleeve, respectively, wherein the at least one first locking projection or the at least one first locking groove extends between opposite ends of the permanent magnet in a lengthwise direction of the rotational shaft, wherein the at least one second locking projection and the at least one second locking groove extend on one end of the connecting sleeve or the impeller shaft facing the one end in the lengthwise direction of the rotational shaft, respectively, so as to engage each other and be locked in a circumferential direction, wherein the at least one second locking projection is formed on a same line as the at least one first locking projection at one side of the at least one first locking projection in the lengthwise direction of the rotational shaft, wherein the at least one second locking groove is formed on a same line as the at least one first locking groove at one side of the at least one first locking groove in the lengthwise direction of the rotational shaft, wherein the impeller shaft includes a shaft fixing portion provided at a first end of the impeller shaft to which the connecting sleeve is coupled, an impeller fixing portion provided at a second end of the impeller shaft to which the impeller is coupled, and a bearing surface portion provided between the shaft fixing portion and the impeller fixing portion, inserted into a radial bearing, and supported in a radial direction by the radial bearing, wherein an outer diameter of the shaft fixing portion is smaller than an outer diameter of the bearing surface portion, and a stepped surface is formed in an annular shape between the shaft fixing portion and the bearing surface portion to support an end of the connecting sleeve in the lengthwise direction of the rotational shaft, and wherein the at least one second locking protrusion or the at least one second locking groove is formed between an end surface of the impeller shaft and the stepped surface.

2. The rotational shaft of claim 1, wherein the at least one first locking projection and the at least one first locking groove comprise a plurality of first locking projections and a plurality of first locking grooves formed at predetermined intervals along a circumference of the respective one of the inner periphery of the connecting sleeve or the outer periphery of the permanent magnet, and wherein the predetermined intervals are equal.

3. The rotational shaft of claim 1, wherein the at least one second locking projection and the at least one second locking groove are axially formed on the end surface of the connecting sleeve and the stepped surface of the impeller shaft facing the end surface of the connecting sleeve in such a way as to engage each other.

4. The rotational shaft of claim 3, wherein a welded surface for welding the connecting sleeve and the impeller shaft is formed along a surface at which the at least one second locking projection and the at least one second locking groove engage each other.

5. The rotational shaft of claim 1, wherein the at least one second locking projection extends integrally from the at least one first locking projection.

6. The rotational shaft of claim 1, wherein the connecting sleeve is formed of a material a thermal expansion coefficient of which is higher than or equal to a thermal expansion coefficient of the impeller shaft or the permanent magnet.

7. A turbo compressor comprising the rotational shaft of claim 1.

* * * * *